United States Patent
Gao et al.

(10) Patent No.: US 12,513,297 B2
(45) Date of Patent: Dec. 30, 2025

(54) METHOD FOR CHROMA SUBSAMPLED FORMATS HANDLING IN MACHINE-LEARNING-BASED PICTURE CODING

(71) Applicant: HUAWEI TECHNOLOGIES CO., LTD., Guangdong (CN)

(72) Inventors: Han Gao, Shenzhen (CN); Elena Alexandrovna Alshina, Munich (DE); Semih Esenlik, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 18/320,221

(22) Filed: May 19, 2023

(65) Prior Publication Data

US 2023/0336736 A1    Oct. 19, 2023

Related U.S. Application Data

(63) Continuation of application No. PCT/EP2020/082769, filed on Nov. 19, 2020.

(51) Int. Cl.
*H04N 11/02* (2006.01)
*H04N 19/132* (2014.01)
(Continued)

(52) U.S. Cl.
CPC ......... *H04N 19/132* (2014.11); *H04N 19/147* (2014.11); *H04N 19/172* (2014.11); *H04N 19/184* (2014.11); *H04N 19/186* (2014.11)

(58) Field of Classification Search
CPC .................................................. H04N 19/132
(Continued)

(56) References Cited

U.S. PATENT DOCUMENTS 9,565,428 B2 * 2/2017 Guo .................. H04N 19/433
10,291,915 B2   5/2019 Kim et al.
(Continued)

FOREIGN PATENT DOCUMENTS

WO       2017036370 A1    3/2017

OTHER PUBLICATIONS

Johannes Ball et al: Variational image compression with a scale hyperprior, arXiv:1802.01436, Feb. 1, 2018, total 23 pages.
(Continued)

*Primary Examiner* — Leron Beck

(57) ABSTRACT

The present disclosure relates to picture or video encoding and decoding. A picture portion includes a luma component and a chroma component with a resolution lower than a resolution of the luma component. To obtain matching resolution of the luma component and the chroma component, a selection is performed between a down-sampling processing of the luma component and an up-sampling processing of the chroma component. Then, the selected processing is applied to a picture portion. The bitstream is then generated based on the selected processing, and includes encoding the processed picture portion. The selection between chroma up-sampling and luma down-sampling enables adaption of the input picture portion for the desired application. For example, some applications may aim at reducing complexity or bitrate in which case the luma down-sampling may be more favorable, whereas other application may aim at higher quality in which case chroma up-sampling may be more favorable.

22 Claims, 29 Drawing Sheets

(51) Int. Cl.
*H04N 19/147* (2014.01)
*H04N 19/172* (2014.01)
*H04N 19/184* (2014.01)
*H04N 19/186* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 10,410,322 B2 | 9/2019 | Viswanathan et al. | |
| 2009/0175338 A1* | 7/2009 | Segall | H04N 19/30 |
| | | | 375/240.14 |
| 2011/0164677 A1* | 7/2011 | Lu | H04N 19/147 |
| | | | 375/E7.126 |
| 2011/0317757 A1* | 12/2011 | Coban | H04N 19/96 |
| | | | 375/E7.126 |
| 2012/0195378 A1* | 8/2012 | Zheng | H04N 19/105 |
| | | | 375/E7.243 |
| 2013/0322523 A1* | 12/2013 | Huang | H04N 19/134 |
| | | | 375/240.02 |
| 2015/0016522 A1* | 1/2015 | Sato | H04N 19/187 |
| | | | 375/240.12 |
| 2017/0006299 A1* | 1/2017 | Chiu | H04N 19/426 |
| 2017/0019672 A1* | 1/2017 | Kim | H04N 19/126 |
| 2017/0230656 A1* | 8/2017 | Leontaris | H04N 19/117 |
| 2019/0297338 A1 | 9/2019 | Tourapis et al. | |
| 2020/0154118 A1 | 5/2020 | Yang et al. | |
| 2020/0252654 A1* | 8/2020 | Su | H04N 19/176 |
| 2020/0286256 A1 | 9/2020 | Houts et al. | |
| 2020/0288135 A1* | 9/2020 | Laroche | H04N 19/105 |
| 2021/0150812 A1* | 5/2021 | Su | G06T 9/001 |
| 2021/0168405 A1* | 6/2021 | Hsiao | H04N 19/70 |
| 2022/0012858 A1* | 1/2022 | Pardeshi | G06N 3/045 |

OTHER PUBLICATIONS

Ankitesh K. et al: [DNNVC] A study of handling YUV420 input format for DNN-based video coding, International Organisation for Standardisation Organisation Internationale De Normalisation ISO/IEC JTC1/SC29/WG 2 MPEG Technical Requirements, m55267, Qualcomm Inc., Oct. 2020, total 8 pages.

* cited by examiner

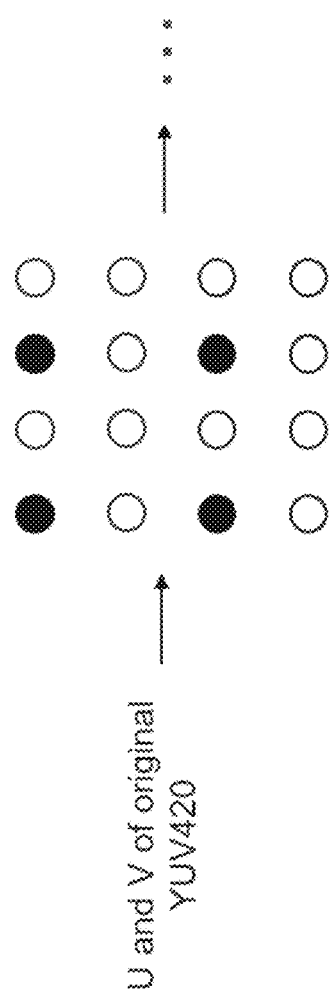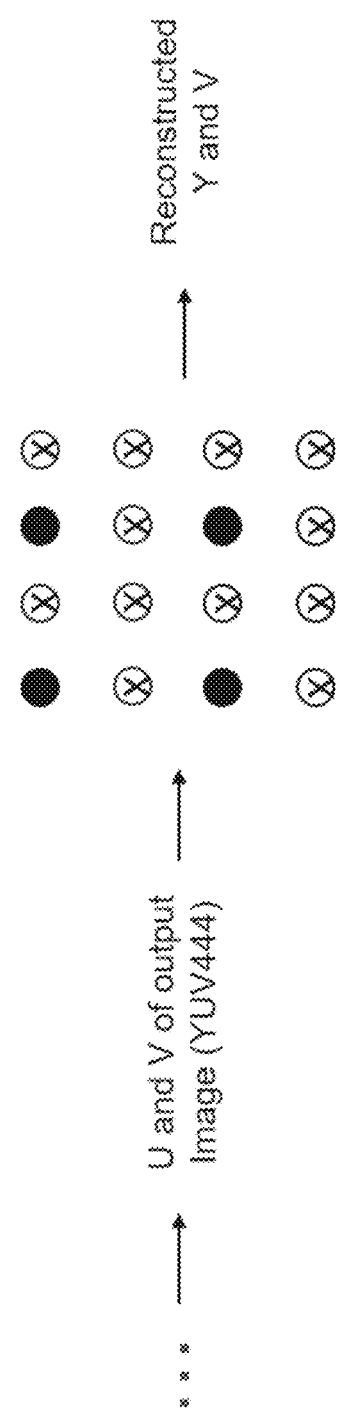

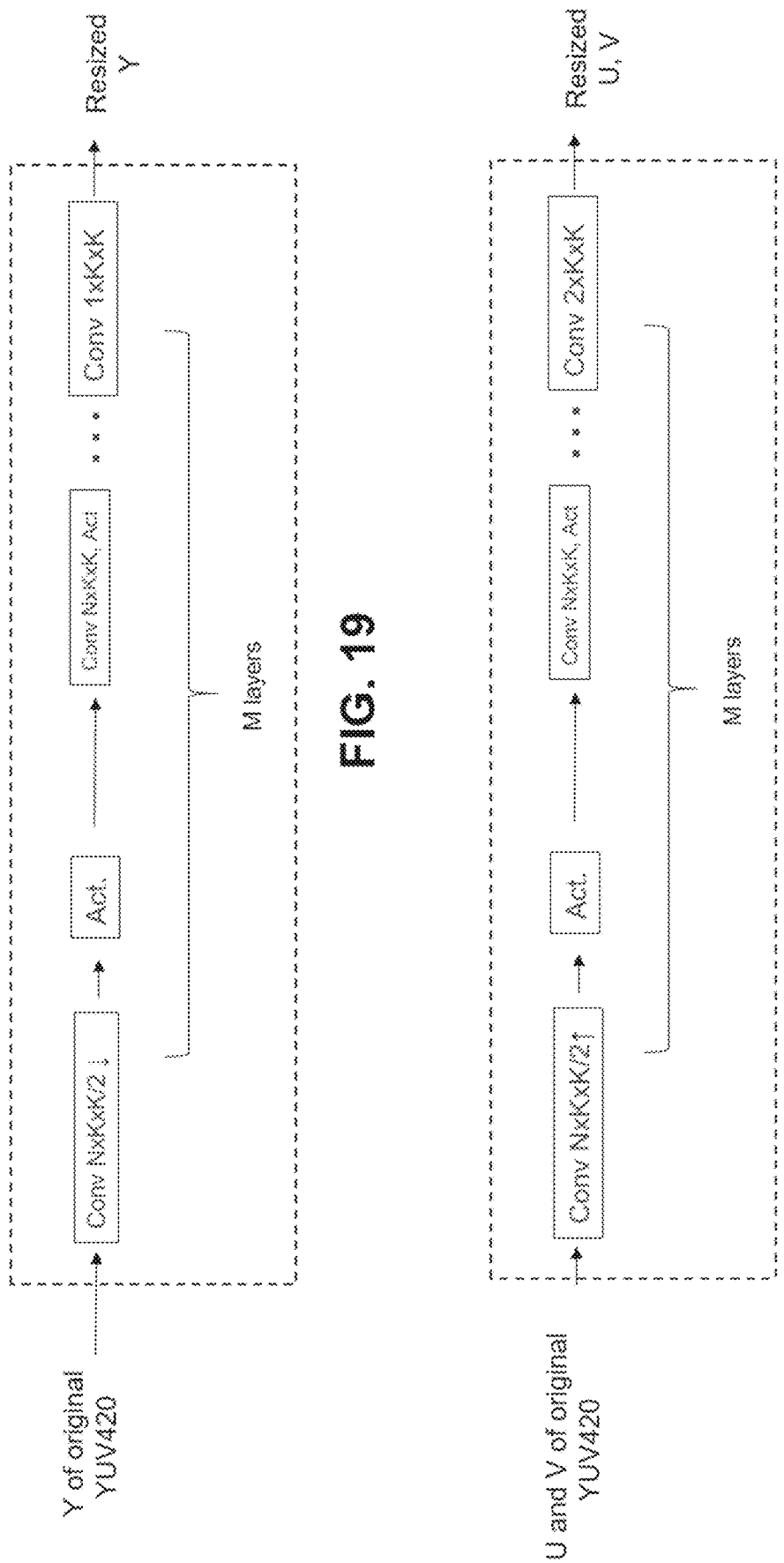

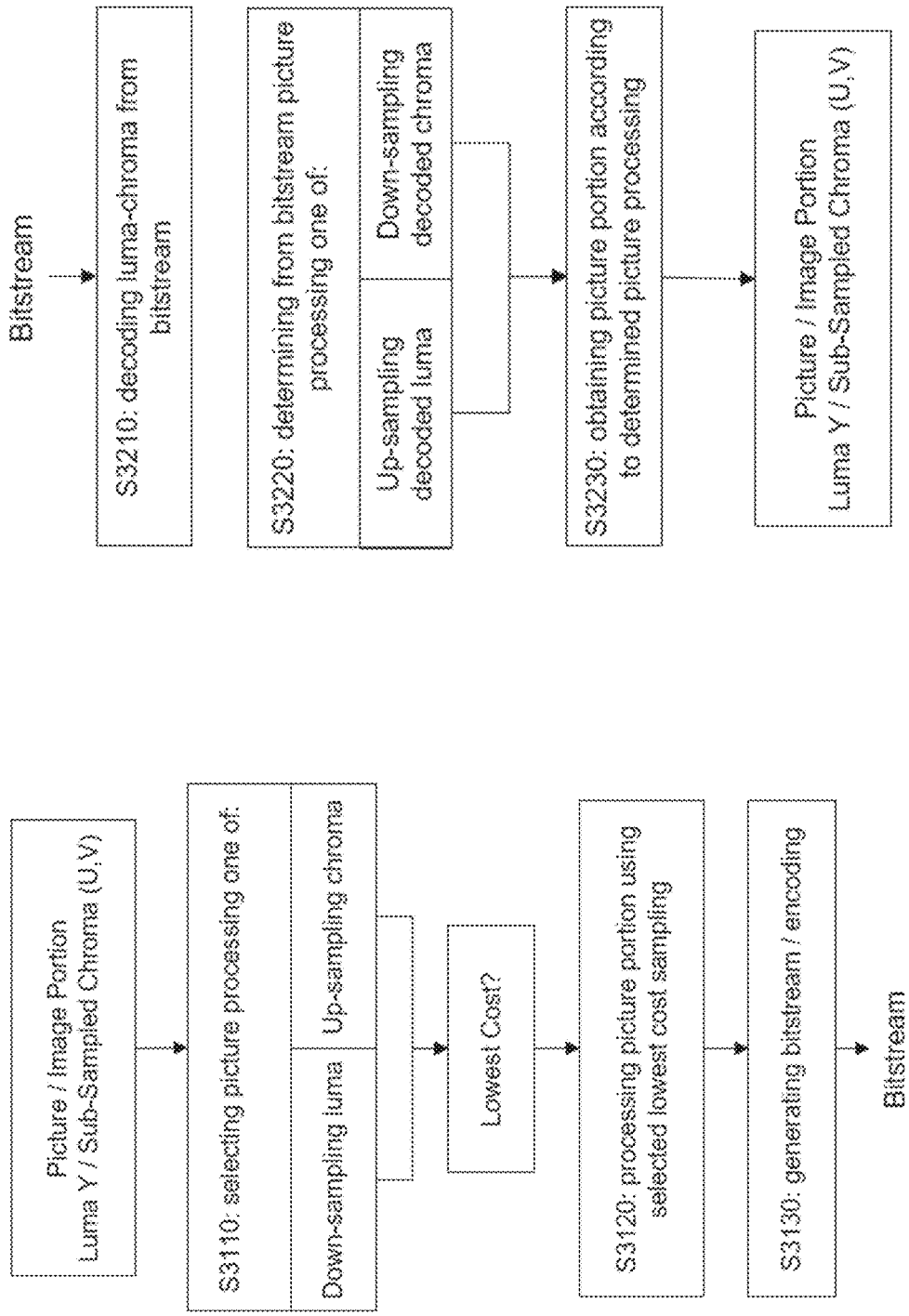

METHOD FOR CHROMA SUBSAMPLED FORMATS HANDLING IN MACHINE-LEARNING-BASED PICTURE CODING

CROSS-REFERENCE TO RELATED APPLICATIONS

This application is a continuation of International Application No. PCT/EP2020/082769, filed on Nov. 19, 2020, the disclosure of which is hereby incorporated by reference in its entirety.

TECHNICAL FIELD

Embodiments of the present disclosure generally relate to the field of picture or video encoding and decoding, and in particular to handling of color formats with subsampled chroma in video coding based on trained networks.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in picture quality are desirable.

Recently, machine learning (ML) has been applied to image and video coding. In general, machine learning can be applied in various different ways to the image and video coding. For example, some end-to-end optimized image or video coding schemes have been discussed. More broadly, machine learning is a subset of artificial intelligence, where models—in general network models—are built on sample data, often referred to as training data. Once trained, such ML-based approaches then make predictions or decisions based on input data that may have not been used as training data. This means that, after training, the ML network is trained, referred to as trained network.

A plethora of network models that are based on ML approaches exists, and include support vector machines (SVM), neural networks (NN), artificial neural networks (ANN), full connected neural networks (FCN), convolutional neural networks (CNN) etc. just to name a few examples. These kinds of networks have often in common that their network structure entails multiple layers (i.e., at least one layer) of network nodes. Thereby, some of the nodes or all of the nodes of one layer may be connected to some of the nodes of all of the nodes of the layer(s) preceding or following said one layer.

It is desirable to further improve efficiency of such picture coding (video coding or still picture coding) based on trained networks.

SUMMARY

Some embodiments of the present disclosure provide methods and apparatuses for encoding and decoding of picture portions having as an input a luma component and a sub-sampled chroma component. The luma component may be processed by down-sampling, so that the encoding-decoding processing may be performed more quickly with a low bitrate, resulting in a lower resolution. The chroma component may be processed by chroma up-sampling, providing high-resolution results. The spatial correlation between the luma and chroma may be also preserved in this way. In either case, the resized luma-chroma components have a matched resolution, and the encoding by the trained network is applied to the matched components. The encoder may adaptively select between the luma down-sampling and the chroma up-sampling, with the decoder performing the reverse picture processing of luma up-sampling and chroma down-sampling. Thus, the encoding-decoding processing may provide either low resolution or high-resolution pictures or images dependent on the selected picture processing.

The foregoing and other objects are achieved by the subject matter of the independent claims. Further implementation forms are apparent from the dependent claims, the description, and the figures.

According to an aspect of the present disclosure, a method for encoding a picture portion, the picture portion including a luma component and a chroma component with a resolution lower than a resolution of the luma component, the method comprising: selecting as a picture processing of the picture portion one of: down-sampling the luma component so as to obtain a down-sampled luma component matching the resolution of the chroma component; and up-sampling the chroma component so as to obtain an up-sampled chroma component matching the resolution of the luma component; processing the picture portion according to the selected processing; and generating a bitstream according to the selected processing, wherein the generating includes encoding the processed picture portion.

This provides as output an equal-sized luma-chroma output, irrespective of whether the luma component is down-sampled or the chroma component is up-sampled. Thus, said output may then be handled by a trained network (e.g., within machine learning framework) with a similar structure, and in particular same input resolution. If the resolution for all color components is the same, the machine-learning framework is then able to utilize cross-color correlation in a same way in all sample locations. In one of the picture processes, the luma channel may remain unaffected, in which case there is no quality loss.

Down-sampling luma is beneficial for small resolutions to save bitrate, while up-sampling chroma is beneficial for large resolution to preserve luma information. Thus, the adaptive switching enables a selection of the sampling mode in dependence on the demands and/or restrictions on bitrate or picture quality. Since in either case of the selected picture processing of the picture portion the processed luma-chroma components have a matched resolution, the output may be handled within a VAE framework or another framework allowing for an efficient encoding.

In some exemplary implementations, the selecting includes evaluation of a cost function of rate and distortion. Thus, the selecting of a sampling mode (i.e., luma down-sampling and chroma up-sampling) is based on a cost.

According to an exemplary implementation of the method, the selecting includes: down-sampling the luma component, thereby obtaining an intermediate down-sampled luma component, and up-sampling the chroma component, thereby obtaining an intermediate up-sampled chroma component. The selecting of the sampling mode, including luma down-sampling and chroma up-sampling provides in either case intermediate luma and intermediate chroma components each having matched resolution (i.e., size). The equal-sized luma-chroma components may then be subject to further processing by a VAE, for example.

In a further implementation example of the method, the selecting includes: determining, according to said cost function, a cost for the intermediate down-sampled luma component and the chroma component, respectively for the luma component and the intermediate up-sampled chroma-component, wherein in the selecting, the picture processing of the picture portion is selected, for which the determined cost is lower. Thus, the overall encoding of a luma component and a sub-sampled chroma component is performed efficiently by using a sampling mode (i.e., luma down-sampling or chroma up-sampling) for which the cost is lowest.

According to an implementation example of the method, the determining includes: encoding the intermediate down-sampled luma component and the chroma component into a first bit stream, encoding the luma component and the intermediate up-sampled chroma component into a second bitstream, and determining the cost for the first bitstream and the second bitstream according to said cost function. Thus, the actual cost may be determined accurately as it is based on the actual encoded first and second bitstream.

In one example of the method, the generating of the bitstream includes encoding into the bitstream a selection indicator indicating the selected picture processing. This provides a low-complexity signaling of the picture processing that has been performed for the bitstream.

In another example, the generating of the bitstream includes encoding into the bitstream an indication of a width W and/or a height H of the luma component. Thus, the width and height of the original picture portion may be signaled to the encoder.

According to an exemplary implementation of the method, the up-sampling and/or the down-sampling is performed by a trained network. Coding which employs trained networks may provide for an improved performance thanks to a possibility of training such network with the desired data.

According to an example, the encoding of the processed picture portion is performed by a variational autoencoder (VAE). VAEs may be advantageous for performing tasks related to image and/or picture encoding and/or decoding in a very efficient manner, with a good compromise between needed bitrate and quality of the reconstructed image or picture.

According to an aspect of the present disclosure, a method is provided for reconstructing a picture portion from a bitstream, the picture portion including a luma component and a chroma component having a resolution lower than a resolution of the luma component, the method comprising: decoding a luma component and a chroma component having the same resolution from the bitstream, and determining from the bitstream, as a picture processing, one of: up-sampling the decoded luma component and obtaining a reconstructed picture portion including said decoded chroma component and the up-sampled luma component; and down-sampling the decoded chroma component and obtaining a reconstructed picture portion including said decoded luma component and the down-sampled chroma component; and obtaining said picture portion according to the determined picture processing.

Hence, the determined picture processing of one of luma up-sampling and chroma down-sampling provides in either case resized luma or chroma components such that they have different size corresponding to the components that have been input for the encoding (original picture components). Therefore, the picture portion is reconstructed to its original color format, with the chroma having a lower resolution than the chroma. As a result, the encoded equal-sized luma-chroma channels may be handled within a common VAE framework, irrespective of the determined picture processing. In general, the advantages provided at the decoding side may be similar to those provided at the encoder side by the corresponding additional features of the respective encoding methods.

According to an implementation example of the method, the determining further includes: decoding from the bitstream a selection indicator indicating a picture processing; and determining as said picture processing the processing indicated by the selection indicator. This allows for an efficient signaling of the picture processing. Accordingly, the decoding side may determine quickly which picture processing has been used on the encoder side (i.e., luma down-sampling or chroma up-sampling) based on a simple indicator included in the bitstream.

According to another exemplary implementation, the determining further includes decoding from the bitstream a width W and/or a height H of the luma component of the picture portion. This allows determining the picture processing based on the width and height of the luma channel of the picture portion. In other words, the channel carrying important information of the picture portion is used as a reference for said determining.

In one example, the determining further includes: determining whether the width W and the height H are same as a respective width $\hat{W}$ and height $\hat{H}$ of the decoded luma component; down-sampling the decoded chroma component, if as a result of the determining W and H are same as $\hat{W}$ and $\hat{H}$; and up-sampling the decoded luma component, if as the result of the determining any of W and H are not same as $\hat{W}$ and/or $\hat{H}$. By deriving the processing to be applied from the width and height it is possible to save rate by not including an explicit selection indicator. Further, the picture processing may be easily determined on the encoding side by a simple comparison of the W and H of the luma with the respective width $\hat{W}$ and height $\hat{H}$ of the decoded luma. Information on the (decoded) chroma may not be used, and hence reduces overhead in the determining of the picture processing.

According to a further implementation example, the determining includes: determining a size S of the bitstream; decoding, from the bitstream, a latent representation $\hat{y}$ of the picture portion, the latent representation having a width $w_{\hat{y}}$ and/or height $h_{\hat{y}}$; determining the picture processing based on comparing a function of the size of the bitstream and the width $w_{\hat{y}}$ and/height $h_{\hat{y}}$ with a pre-defined threshold T. This allows determining of the picture processing based on the latent representation $\hat{y}$. The latent representation may be based on a feature map. Thus, the picture processing determining is more accurate as it utilizes the latent representation along with a feature map.

In one exemplary implementation, the determining includes: determining whether a ratio of the size S and $w_{\hat{y}}*h_{\hat{y}}$ is equal to or larger than the pre-defined threshold; down-sampling the decoded chroma component, if as a result of the determining the ratio is equal to or larger than the pre-defined threshold; and up-sampling the decoded luma component, if as the result of the determining the ratio is smaller than the pre-defined threshold. Accordingly, the picture processing to be performed by the decoder may be simply determined using a ratio of the bitstream size S and a size $w_{\hat{y}}*h_{\hat{y}}$ of the latent space. Moreover, by simply thresholding the ratio of the bitstream size and the size $w_{\hat{y}}*h_{\hat{y}}$ of the latent space, a fast determining of the picture processing is facilitated. This makes the picture processing determining more efficient since only the bitstream and the latent space are used. This reduces further the overhead in the determining of the picture processing.

According to another implementation example, the determining includes: decoding a latent representation $\hat{y}$ from the bitstream; and determining the picture processing as an output of a classifying neural network fed with the decoded latent representation, wherein the output is one of a first class and a second class, the first class indicating up-sampling of the decoded luma component and the second class indicating down-sampling of the decoded chroma component. This allows exploiting a neural network for determining the picture processing determining. This makes the picture processing determining more flexible. Moreover, it may be combined with classification of features for said determining as the latent space may be based on a feature map. Accordingly, the determining of the picture processing may be performed more accurately. Furthermore, the up-sampling or down-sampling methods may be obtained at the decoder side without parsing any side information from the bitstream, which reduces the bitrate costs.

According to an exemplary implementation, the up-sampling and/or the down-sampling is performed by a trained network. By providing a bitstream based on the down-sampled luma or the up-sampled chroma, the decoding side may reconstruct a picture (still or video) with higher quality and/or lower rate. Trained networks may provide for an adaptive and efficient coding and thus to an improved quality at the same rate or improved rate at the same quality.

For example, the decoding of the processed picture portion is performed by a variational auto encoder, VAE. Thus, the decoding may be performed efficiently, with a good compromise between required bitrate and/or quality of the reconstructed picture or image.

According to an aspect of the present disclosure, provided is a computer program stored on a non-transitory medium comprising code which when executed on one or more processors performs steps of any of the methods referred above.

According to an aspect of the present disclosure, an encoder is provided for encoding a picture portion, the picture portion including a luma component and a chroma component with a resolution lower than a resolution of the luma component, the encoder comprising: one or more processors; and a non-transitory computer-readable storage medium coupled to the one or more processors and storing programming for execution by the one or more processors, wherein the programming, when executed by the one or more processors, configures the encoder to carry out the encoding method referred above.

According to an aspect of the present disclosure, a decoder is provided for reconstructing a picture portion from a bitstream, the picture portion including a luma component and a chroma component having a resolution lower than a resolution of the luma component, the decoder comprising: one or more processors; and a non-transitory computer-readable storage medium coupled to the one or more processors and storing programming for execution by the one or more processors, wherein the programming, when executed by the one or more processors, configures the decoder to carry out the decoding method referred above.

According to an aspect of the present disclosure, an encoder is provided for encoding a picture portion, the picture portion including a luma component and a chroma component with a resolution lower than a resolution of the luma component, the encoder comprising a processing circuitry configured to perform steps of the encoding method referred above.

According to an aspect of the preset disclosure, a decoder for reconstructing a picture portion from a bitstream, the picture portion including a luma component and a chroma component having a resolution lower than a resolution of the luma component, the decoder comprising a processing circuitry configured to perform steps of the decoding method referred above.

According to an aspect of the present disclosure, an encoder is provided for encoding a picture portion, the picture portion including a luma component and a chroma component with a resolution lower than a resolution of the luma component, the encoder comprising: a selecting module configured to select as a picture processing of the picture portion one of: down-sampling the luma component so as to obtain a down-sampled luma component matching the resolution of the chroma component; and up-sampling the chroma component so as to obtain an up-sampled chroma component matching the resolution of the luma component; a processing module configured to process the picture portion according to the selected picture processing; and a generating module configured to generate a bitstream according to the selected picture processing, wherein the generating includes encoding the processed picture portion.

According to an aspect of the present disclosure, a decoder is provided for reconstructing a picture portion from a bitstream, the picture portion including a luma component and a chroma component having a resolution lower than a resolution of the luma component, the decoder comprising: a decoding module configured to decode a luma component and a chroma component having the same resolution from the bitstream; and a determining module configured to determine from the bitstream, as a picture processing, one of: up-sampling the decoded luma component and obtaining a reconstructed picture portion including said decoded chroma component and the up-sampled luma component; and down-sampling the decoded chroma component and obtaining a reconstructed picture portion including said decoded luma component and the down-sampled chroma component; and a obtaining module configured to obtain said picture portion according to the determined picture processing.

The embodiments enable adaptively switching between chroma up-sampling and luma down-sampling of the input picture portion dependent on the desired application. For example, some applications may aim at reducing complexity or bitrate in which case the luma down-sampling may be more favorable, whereas other applications may aim at higher quality in which case chroma up-sampling may be more favorable. Accordingly, a picture portion having a luma component and a sub-sampled chroma component may be efficiently encoded and/or decoded in any of the sampling modes of the picture processing, including luma down-sampling and chroma up-sampling.

It is noted that the present disclosure is not limited to a particular framework. Moreover, the present disclosure is not restricted to image or video compression, and may be applied to object detection, image generation, and recognition systems as well.

The disclosure can be implemented in hardware and/or software.

For the purpose of clarity, any one of the foregoing embodiments may be combined with any one or more of the other foregoing embodiments to create a new embodiment within the scope of the present disclosure.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIG. 9 shows an example for chroma up-sampling by inserting zeros at the odd-row and odd columns.

FIG. 10 shows an example for chroma down-sampling by removing zeros at the odd-row and odd columns.

FIG. 19 shows a schematic drawing of a size-equalizing network for the luma down-sampling on the encoder side of the VAE architecture, without using chroma component(s) as side information.

FIG. 20 shows a schematic drawing of a size-equalizing network for the chroma up-sampling on the encoder side of the VAE architecture, without using the luma component as side information.

FIG. 31 shows a flowchart of the encoding method, including selecting one of a picture processing (luma down-sampling or chroma up-sampling) based on the lowest cost and generating a bitstream from the processed picture portion.

FIG. 32 shows a flowchart of the decoding method, including decoding luma-chroma from the bitstream, and determining one of a picture processing (luma up-sampling or chroma down-sampling) to reconstruct from the processed picture portion the original picture portion.

DESCRIPTION

Figure 1:
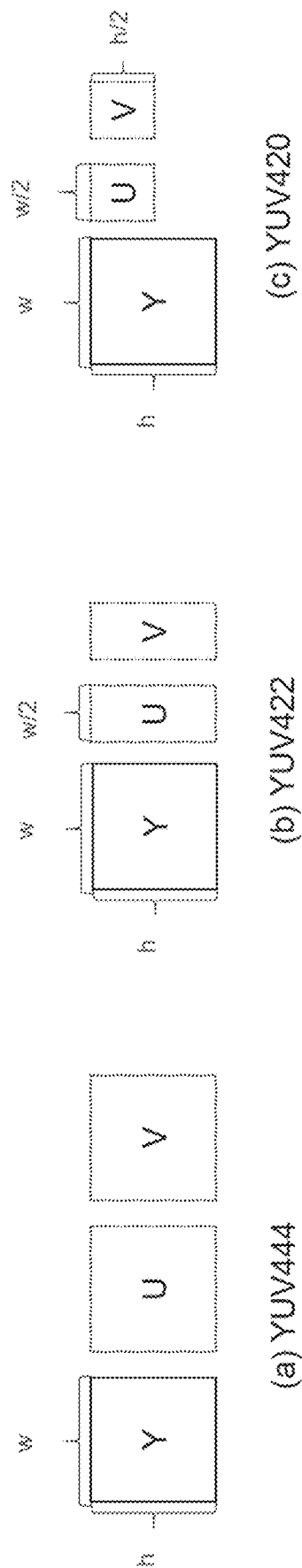
FIG. 1 shows examples of luma-chroma YUV formats, including (a) YUV444, (b) YUV422, and (c) YUV420.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

In the following, we provide a brief overview of some of the technical terms used throughout the present disclosure.

Color formats of video sequences: color formats describes the specific organization of colors in a video sequence. Usually, the color formats are represented as a mathematical model describing the way colors can be represented, for example, as tuples of numbers. For example, the RGB format describes that a frame (picture or image) is combined with a red (R), a green (G), and a blue (B) color component. In turn, the YUV format describes that a frame is combined with one luma component (Y) and two chroma components (U, V). Thereby, the luma refers to the luminance component of a sample, pixel, or a group of samples/pixels such as a picture or a picture portion. In general, a color format may have one or more color components.

RGB: the RGB color format is an additive color model, which contains red (R), green (G), and blue (B) components. A picture in the RGB color space has usually components having the same sizes in terms of their respective width and height, such as the width and height of the frame corresponding to the number of samples or pixels, and thus to resolution. These RGB components may be added in various ways to represent a broad array of colors.

YUV: the YUV color format contains three components, where the luma component Y refers to the brightness information (i.e. luminance) and the chroma components U (blue projection) and V (red projection) refer the chrominance or color information. In digital encoding of the color information, the YUV can be directly converted from RGB by a linear matrix, as exemplified below.

$$\begin{bmatrix} Y' \\ U \\ V \end{bmatrix} = \begin{bmatrix} 0.299 & 0.587 & 0.114 \\ -0.14713 & -0.28886 & 0.436 \\ 0.615 & -0.51499 & -0.10001 \end{bmatrix} \begin{bmatrix} R \\ G \\ B \end{bmatrix},$$

In other words, each of the YUV components may be written by a linear combination of RGB components. Consequently, after such a conversion, the three components of YUV also have same sizes (width and height).

Chroma subsampling: Chroma sub-sampling is the practice of encoding images by implementing less resolution for the chroma information (U, V) than for the luma information (Y). The reason for sub-sampling the chroma components lies in taking advantage of the human visual system's lower acuity for color differences than for luminance. Thus, as far as the luma visual system is concerned, the luma component may be viewed as the most important channel, when using YUV (or YCbCr) formats.

The chroma subsampling may significantly reduce the chroma component signals. The commonly used chroma sub-sampling formats are briefly described in the following:

YUV 4:4:4 (or short YUV444) refers to no chroma sub-sampling, i.e., the Y, U, and V components have the same sizes (width and height), as shown in FIG. 1(a).

YUV 4:2:2 (or short YUV422) refers to sub-sampling the chroma components (U and V) by a factor 2 horizontally, as shown in FIG. 1(b). For example, when the luma component has a size of w×h, where w denotes the width and h denotes the height of the luma component, the chroma components U and V in YUV 4:2:2 each have a size of w/2×h (half of the width, i.e. w/2, and the same height h as the luma component, e.g. in terms of the number of samples or pixels). In this case, each chroma component has a rectangular shape.

YUV 4:2:0 (or short YUV420) refers to sub-sampling the chroma components (U and V) by a factor 2 both horizontally and vertically, as shown in FIG. 1(c). For example, when the luma component has a size of w×h, where w denotes the weight and h denotes the height of the luma component, the chroma components of YUV 4:2:0 each have a size of w/2×h/2 (half of the width, i.e. w/2, and half of the height, i.e. h/2, of the luma component, e.g., in terms of the number of samples or pixels). In this case, each chroma component has a squared shape.

Note that the YUV 4:2:0 chroma subsampling is the most commonly used chroma subsampling method in video coding. The subsampling may, in general, be a consequence of the construction of the image sensor which captures the picture. For example, some sensors provide more pixels for capturing certain color components. However, the subsampling may also be consequence of further processing of the captured picture.

The above YUV formats are used in the present disclosure as examples for luma-chroma components (channels), with the respective chroma having a different resolution (i.e. a different size) as the luma channel. It should be noted that, in general, also only one of the two chroma components may be subject to sub-sampling, whereas the other one maintains its size. Further, instead of sub-sampling a chroma component only horizontally as shown FIG. 1(b), said chroma component(s) may be instead sub-sampled vertically.

Artificial Neural Networks

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

Convolutional Neural Networks

The name "convolutional neural network" (CNN) indicates that the network employs a mathematical operation called convolution. Convolution is a specialized kind of linear operation. Convolutional networks are simply neural networks that use convolution in place of general matrix multiplication in at least one of their layers.

Figure 2A:
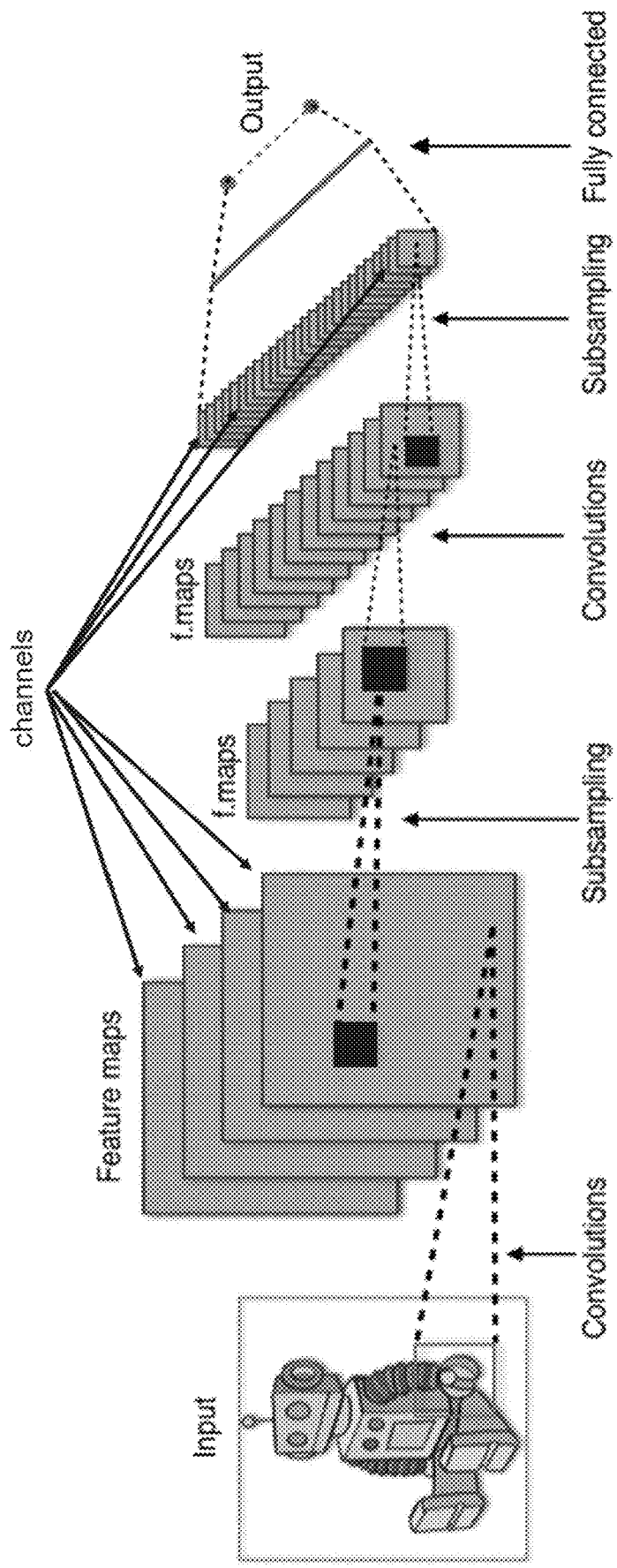
FIG. 2A is a schematic drawing illustrating inputs and outputs of layer processing in an artificial neural network.

FIG. 2A schematically illustrates a general concept of processing by a neural network such as the CNN. A convolutional neural network consists of an input and an output layer, as well as multiple hidden layers. Input layer is the layer to which the input (such as a portion of an image as shown in FIG. 2A) is provided for processing. The hidden layers of a CNN typically consist of a series of convolutional layers that convolve with a multiplication or other dot product. The result of a layer is one or more feature maps (f.maps in FIG. 2A), sometimes also referred to as channels. There may be a subsampling involved in some or all of the layers. As a consequence, the feature maps may become smaller, as illustrated in FIG. 2A. The activation function in a CNN is usually a RELU (Rectified Linear Unit) layer, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point.

When programming a CNN for processing images, as shown in FIG. 2A, the input is a tensor with shape (number of images)×(image width)×(image height)×(image depth). Then after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. MLPs are also referred to a fully connected neural networks (FCN). However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Hence, the MLP/FCN are often prone to overfitting of data. Since each node (perceptron) of a layer takes as input the output of all the nodes of the neighboring layer, the network architecture of a FCN does not take into account the spatial structure of data (e.g. across the node of a layer), treating input pixels which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. These models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 down-samples at every depth slice in the input by 2 along both width and height, discarding 75% of the activations. In this case, every max operation is over 4 numbers. The depth dimension remains unchanged.

In addition to max pooling, pooling units can use other functions, such as average pooling or l2-norm pooling. Average pooling was often used historically but has recently fallen out of favour compared to max pooling, which performs better in practice. Due to the aggressive reduction in the size of the representation, there is a recent trend towards using smaller filters or discarding pooling layers altogether.

"Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

Autoencoders and Unsupervised Learning

Figure 2B:
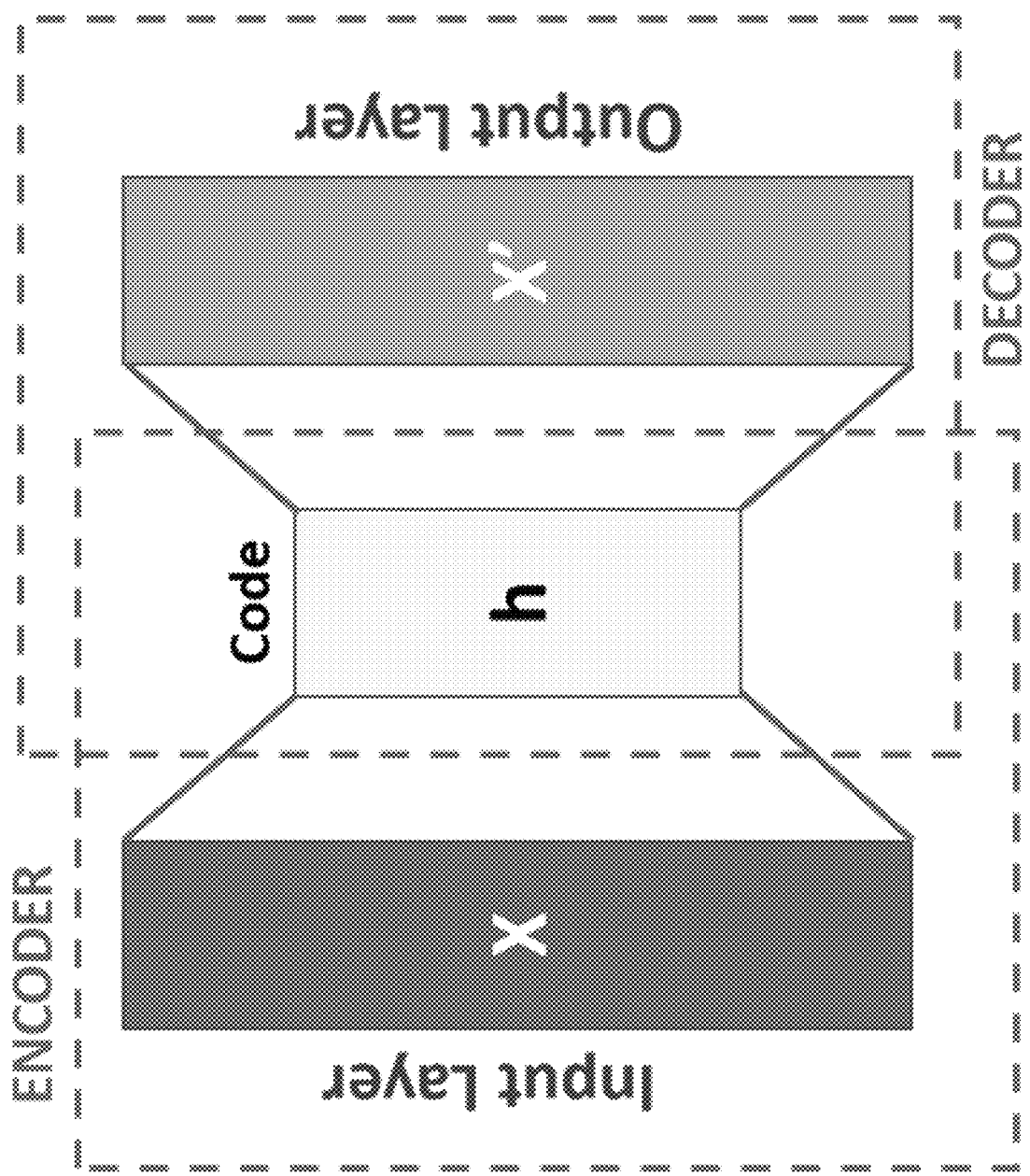
FIG. 2B is a block diagram illustrating parts of an exemplary autoencoder.

An autoencoder is a type of an artificial neural network, used to learn efficient data codings in an unsupervised manner. A schematic drawing thereof is shown in FIG. 2B. The aim of an autoencoder is to learn a representation (encoding) for a set of data, typically for dimensionality reduction, by training the network to ignore signal "noise". Along with the reduction side, a reconstructing side is learned, where the autoencoder tries to generate from the reduced encoding a representation as close as possible to its original input, hence its name. In the simplest case, given one hidden layer, the encoder stage of an autoencoder takes the input x and maps it to h $$h=\sigma(Wx+b).$$

This image h is usually referred to as code, latent variables, or latent representation. Here, σ is an element-wise activation function, such as a sigmoid function or a rectified linear unit. W is a weight matrix b is a bias vector. Weights and biases are usually initialized randomly, and then updated iteratively during training through Backpropagation. After that, the decoder stage of the autoencoder maps h to the reconstruction x' of the same shape as x:

$$x'=\sigma'(W'h'+b')$$

where σ', W' and b' for the decoder may be unrelated to the corresponding σ, W and b for the encoder.

Variational autoencoder models make strong assumptions concerning the distribution of latent variables. They use a variational approach for latent representation learning, which results in an additional loss component and a specific estimator for the training algorithm called the Stochastic Gradient Variational Bayes (SGVB) estimator. It assumes that the data are generated by a directed graphical model $p_\theta(x|h)$ and that the encoder is learning an approximation $q_\phi(h|x)$ to the posterior distribution $p_\theta(h|x)$ where $\phi$ and $\theta$ denote the parameters of the encoder (recognition model) and decoder (generative model) respectively. The probability distribution of the latent vector of a VAE typically matches that of the training data much closer than a standard autoencoder. The objective of VAE has the following form:

$$\mathcal{L}(\phi,\theta,x) = D_{KL}(q_\phi(h|x)\|p_\theta(h)) - E_{q_\phi(h|x)}(\log p_\theta(x|h))$$

Here, $D_{KL}$ stands for the Kullback-Leibler divergence. The prior over the latent variables is usually set to be the centered isotropic multivariate Gaussian $p_\theta(h) = \mathcal{N}(0, I)$. Commonly, the shape of the variational and the likelihood distributions are chosen such that they are factorized Gaussians:

$$q_\phi(h|x) = \mathcal{N}(\rho(x), \omega^2(x)I)$$

$$p_\phi(x|h) = \mathcal{N}(\mu(h), \sigma^2(h)I)$$

where $\rho(x)$ and $\omega^2(x)$ are the encoder output, while $\mu(h)$ and $\sigma^2(h)$ are the decoder outputs.

Recent progress in artificial neural networks area and especially in convolutional neural networks enables researchers' interest of applying neural networks based technologies to the task of image and video compression. For example, End-to-End Optimized Image Compression has been proposed, which uses a network based on variational autoencoder. Accordingly, data compression is considered as a fundamental and well-studied problem in engineering, and is commonly formulated with the goal of designing codes for a given discrete data ensemble with minimal entropy. The solution relies heavily on knowledge of the probabilistic structure of the data, and thus the problem is closely related to probabilistic source modeling. However, since all practical codes must have finite entropy, continuous-valued data (such as vectors of image pixel intensities) must be quantized to a finite set of discrete values, which introduces error. In this context, known as the lossy compression problem, one must trade off two competing costs: the entropy of the discretized representation (rate) and the error arising from the quantization (distortion). Different compression applications, such as data storage or transmission over limited-capacity channels, demand different rate-distortion trade-offs. Joint optimization of rate and distortion is difficult. Without further constraints, the general problem of optimal quantization in high-dimensional spaces is intractable. For this reason, most existing image compression methods operate by linearly transforming the data vector into a suitable continuous-valued representation, quantizing its elements independently, and then encoding the resulting discrete representation using a lossless entropy code. This scheme is called transform coding due to the central role of the transformation. For example, JPEG uses a discrete cosine transform on blocks of pixels, and JPEG 2000 uses a multi-scale orthogonal wavelet decomposition. Typically, the three components of transform coding methods—transform, quantizer, and entropy code—are separately optimized (often through manual parameter adjustment). Modern video compression standards like HEVC, VVC and EVC also use transformed representation to code residual signal after prediction. The several transforms are used for that purpose such as discrete cosine and sine transforms (DCT, DST), as well as low frequency non-separable manually optimized transforms (LFNST).

Among the mentioned kind of networks, CNNs have been shown to be advantageous for video/image (de) coding, and implemented in variational autoencoders (VAE), as discussed by J. Balle in "*Variational image compression with a scale hyperior*" (*arXiv preprint arXiv:* 1802.01436 (2018)). In the following, we refer to this document by "J. Balle."

The VAE structure is designed for deep learning-based image compression, and constitutes a quite efficient structure. Because the color format of images, input to the VAE, is usually RGB without subsampling, the three components/channels have same sizes (width and height). Consequently, RGB color format images provided as input to the VAE structure may be directly processed and reconstructed.

In J. Balle, an end-to-end trainable model for image compression based on variational autoencoders (VAE) is described. The model incorporates a hyperprior to effectively capture spatial dependencies in the latent representation. This hyperprior relates to side information also transmitted to decoding side, a concept universal to virtually all modern image codecs, but largely unexplored in image compression using ANNs. Unlike existing autoencoder compression methods, this model trains a complex prior jointly with the underlying autoencoder.

The VAE framework can be considered as a nonlinear transforming coding model. The transforming process can be mainly divided into four parts. This is exemplified in FIG. 2C showing a VAE framework.

Figure 2C:
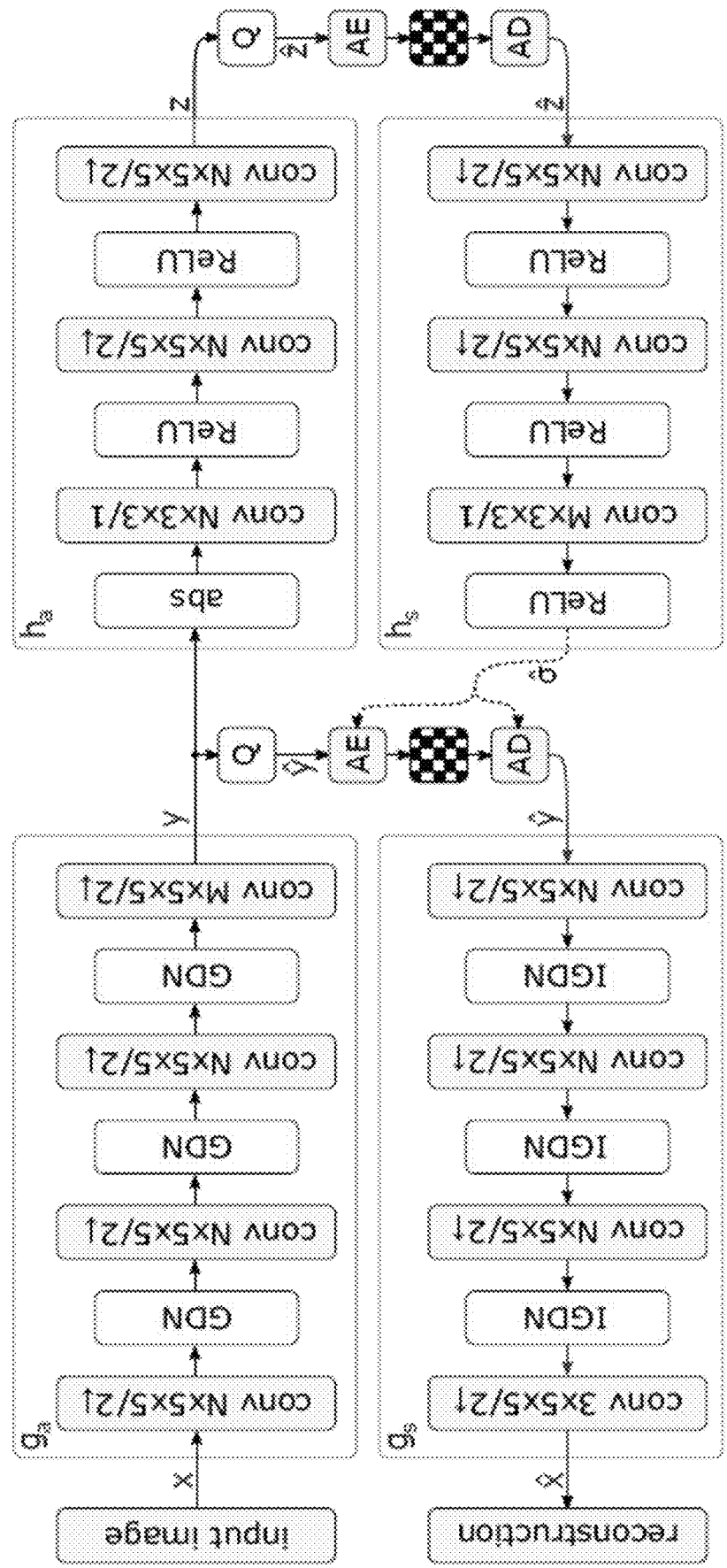
FIG. 2C is a schematic drawing illustrating a variational autoencoder architecture including a hyperprior model.

FIG. 2C shows a network architecture including a hyperprior model. The left side ($g_a$, $g_s$) shows an image autoencoder architecture (VAE), the right side ($h_a$, $h_s$) corresponds to the autoencoder implementing the hyperprior. The factorized-prior model uses the identical architecture for the analysis and synthesis transforms $g_a$ and $g_s$. Q represents quantization, and AE, AD represent arithmetic encoder and arithmetic decoder, respectively.

The encoder subjects the input image x to $g_a$, yielding the responses y (latent representation) with spatially varying standard deviations. The encoding $g_a$ includes a plurality of convolution layers with subsampling and, as an activation function, generalized divisive normalization (GDN). Specifically, the encoder $g_a$ (1) maps an image x into a latent representation y via the function y=f(x). The quantizer Q (2) that transforms the latent representation into the discrete values, ŷ=Q(y).

The responses are fed into $h_a$, summarizing the distribution of standard deviations in z. z is then quantized, compressed, and transmitted as side information. The entropy model, or the hyper encoder/decoder $h_a$ (also known as hyperprior) (3), estimates the distribution of ŷ to get the minimum rate achievable with lossless entropy source coding. A further side information for hyperprior is defined as z=$h_a$ (y), which is quantized as ẑ=Q (z). The encoder then uses the quantized vector ẑ to estimate σ̂, the spatial distribution of standard deviations which is used for obtaining probability values (or frequency values) for arithmetic coding (AE), and uses it to compress and transmit the quantized image representation ŷ (or latent representation). The ŷ and the side information ẑ of the hyperprior are included in a bitstream using arithmetic coding (AE).

At the decoder side of the VAE structure, i.e, $g_s$ and $h_s$, shown in FIG. 2C, the decoder first recovers ẑ from the compressed signal by parsing ẑ from the bitstream by arithmetic decoder. Then, the σ̂, which is used for the arithmetic decoder (AD) as a parameter in the VAE, is reconstructed as σ̂=$h_s$ (ẑ). Similarly, ŷ is parsed from the bitstream by arithmetic decoder, using σ̂ as an arithmetic decoder parameter, so as to provide it with the correct probability estimates ensuring a successful recovery of ŷ. Finally, the reconstructed image x̂ is generated by x̂=$g_s$ (ŷ).

The majority of Deep Learning-based image/video compression systems reduce the dimensionality of the signal before converting the signal into binary digits (bits). In the VAE framework for example, the encoder, which is a non-linear transform, maps the input image x into y, where y has a smaller width and height than x. Since the y has a smaller width and height, and hence a smaller size, the dimension of the signal is reduced. It is therefore easier to compress the signal y. The general principle of compression is has been exemplified in FIG. 2C. The latent space ŷ, which is the output of the encoder $g_a$ and the input of the decoder $g_s$, represents the compressed data. It is noted that the size of the latent space is typically much smaller than the input signal size.

The reduction in the size of the input signal is exemplified in the FIG. 2C, which represents a deep learning based encoder and decoder. As noted before, the input image x corresponds to the input data, which is the input of the Encoder shown in FIG. 2C. The transformed signal y corresponds to the latent space ŷ, which has a smaller dimensionality than the input signal. Each column of circles represents a layer in the processing chain of the encoder or decoder, respectively. The number of circles in each layer indicate the size or the dimensionality of the signal at that layer.

As evident from FIG. 2C, the encoding operation corresponds to a reduction in the size of the input signal, whereas the decoding operation corresponds to a reconstruction of the original size of the image.

At the input of the VAE structure, one convolutional network layer (conv N×5×5/2↓) is used. It is noted that "N×5×5/2↓" refers to a notation to specify a layer, here of a CNN. In this example, a CNN having 5×5 convolutional layer is defined having N channels as outputs. The outputs are down-sampled by a factor of 2 in both dimensions, as indicated by a down arrow. Because of this convolutional layer, the size of all three components of the input image is the same (for example RGB or YUV444). Otherwise, the convolutional network layer in this example does not take as input an image (or picture portions) having different size, as is the case, for example, for YUV422 or YUV 420 formats.

Similarly, as FIG. 2C illustrates, because of the last inverse convolutional network layer (conv 3×5×5/2↑) at the end of VAE structure, the size of the three components of the output image (reconstructed image) is the same.

Hence, there is the problem when using an existing VAE structure to compress the frames in a video sequence. For example, the VAE structure may not directly handle a chroma subsampled color format video frame (e.g., YUV 422, YUV420), because the size of the three components is not identical. As mentioned before, in some cases the input image may not be processed by the input convolutional network layer, with the result that the output image may not have the same size of the input image.

An MPEG proposal (Ankitesh K. Singh et al. "M55267: [DNNVC] A study of handling YUV420 input format for DNN-based video coding"), discusses methods to address in part the above-mentioned problem for the specific case of the YUV 420 color format frame of a video sequence.

Figure 3:
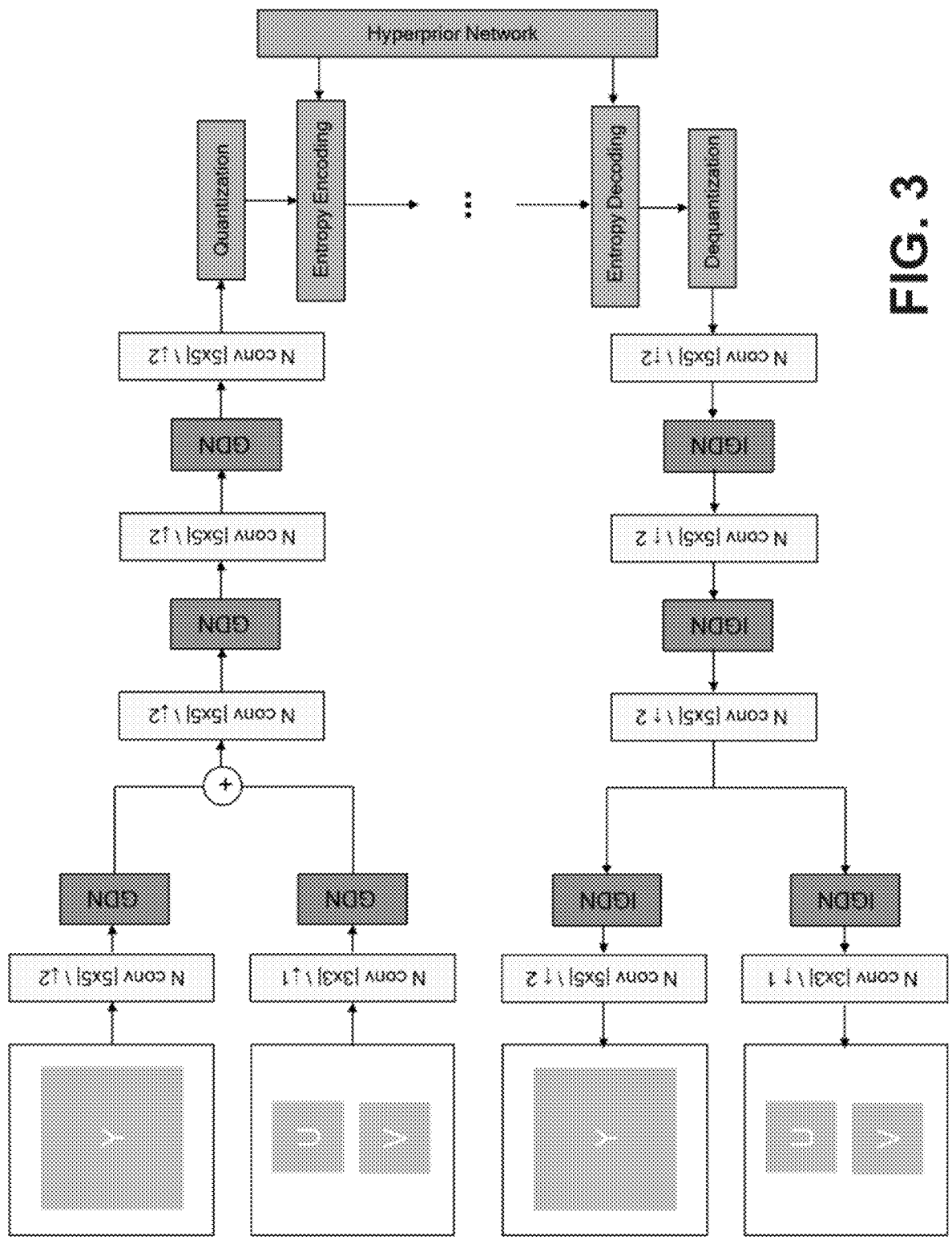
FIG. 3 shows a schematic drawing of a VAE structure including a hyperprior model, where a down-sampling of the luma component is performed.

FIG. 3 illustrates one method of the MPEG proposal. At the encoder side, the luma component is down-sampled both horizontally and vertically by a factor of 2, using a convolutional network layer conv N×5×5/2↓ (i.e., the convolutional kernel is 5×5, the output channels are N, and the outputs are down-sampled by 2 in both dimensions). The chroma components are processed by a convolutional network layer conv N×5×5/1↓ without down sampling (in terms of the CNN notation, this is indicated by "/1", i.e. a division by one). So that the output Y, U, and V have the same sizes and can be processed by the VAE structure. At the decoder side, the luma output Y component is up-sampled by a factor of 2 both horizontally and vertically using conv 1×5×5/2↑. In turn, the chroma components are processed by conv 2×5×5/1↑ without up-sampling. Hence, the final reconstructed images have the same size as the original input YUV420 image.

As is evident from the above processing, the method of FIG. 3 provides the luma and chroma components having the same size by down-sampling the luma component. In other words, the component that is the most important one for the human visual system and carries the most detailed information of a video frame is processed. This has the consequence that important luma information is discarded, which may lead to a quality loss.

However, once the components and/or channels of a frame have different resolution (i.e. size), the VAE structure is no longer able to compress this frame of a video sequence. In particular, the VAE structure cannot directly handle a chroma sub-sampled color format video frame (e.g. YUV 422, YUV420), because the size of the three components are not the same. As mentioned before, the input image (including picture portions thereof) cannot be processed by the input convolutional network layer and the output image does not have the same size of the input image.

First Embodiment

Some embodiments of the present disclosure may provide solution for the above-mentioned problem of handling sub-sampled chroma components that is suitable for existing ANN or VAE framework structures.

According to an embodiment of the present disclosure, a method is provided for encoding a picture portion, the picture portion including a luma component and a chroma component with a resolution lower than a resolution of the luma component.

The picture portion refers to a number of samples of a picture (image) with said number (amount) being smaller than the total number of the samples of said picture. It is noted that the terms picture and image herein have the same meaning. The picture portion may include some (one or more) or all samples of the picture. The terms sample and pixel herein have the same meaning. The picture may be a still image or a video picture, e.g. corresponding to a frame of a video sequence (motion picture).

The picture portion may include one or more color components, e.g. a luma component and one or more chroma components. For example, a picture portion in luma-chroma format YUV420 includes two chroma components U and V (also referred to as chroma channels), as mentioned above. The chroma resolution of the picture portion may be lower than the resolution of the luma channel with respect to the whole picture. Alternatively, the chroma resolution may be lower than the resolution of the luma channel with reference to a part of the image. In other words, a part of a scene captured in the picture may be represented by more luma samples than chroma samples (of the same chrominance). The resolution may be given by the size (dimensions) of the two-dimensional (2D) luma or by the size of the 2D chroma channel. This is typically given by the number of samples along the x-y direction of the luma or the chroma samples within the 2D image or by the total number of samples. A relative resolution may be specified as a ratio between the number of luminance and chrominance samples, as mentioned above, e.g. 4:2:0 or 4:2:2 or the like. It is noted that although some exemplary embodiments are described herein for luma channel and chroma channel(s), the present disclosure is not limited thereto. In general, in addition to or instead of one or more color components, other channels such as depth or the like may be processed as discussed in the present disclosure.

Figure 13:
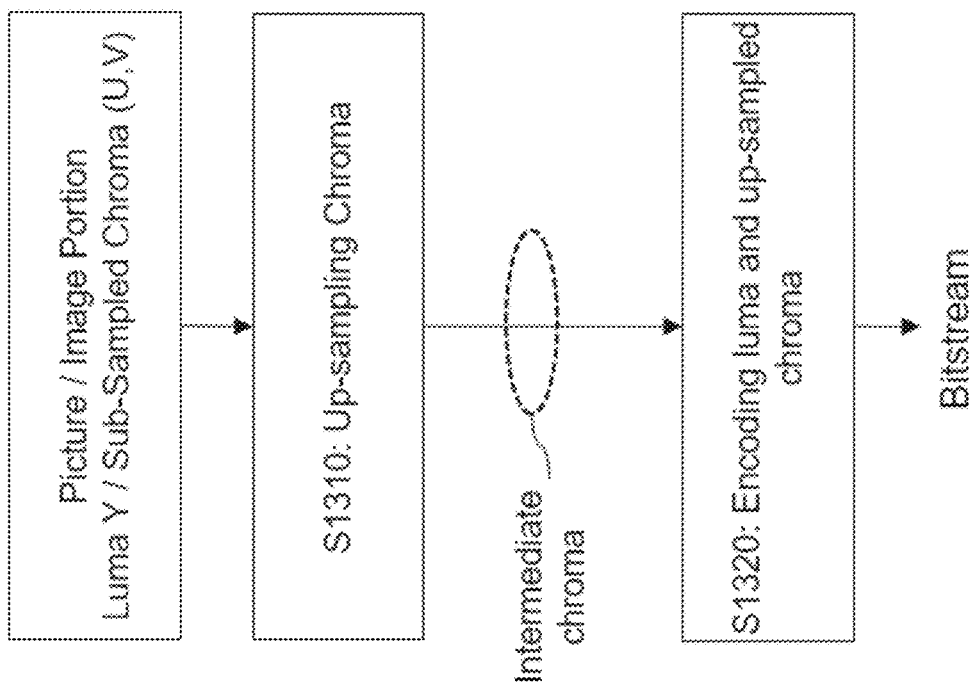
FIG. 13 shows a flowchart of the encoding method, including up-sampling of a sub-sampled chroma to an intermediate chroma having the same size as the luma.

The method is illustrated in FIG. 13 and comprises a step 1310 for up-sampling the chroma component to obtain an up-sampled chroma component matching a resolution of the luma component. The up-sampled chroma component is also referred to as intermediate chroma component. Matching of the resolution may correspond to matching the dimensions of the luma components. The method further includes a step 1320 for encoding the luma component and the up-sampled chroma component into a bitstream.

Prior to the up-sampling, the resolution of the luma component may be obtained. This may be done by determining the resolution by reading it from a memory or from a bitstream of an input picture or the like. The resolution of the chroma component may be obtained in a similar manner. The resolution of the respective picture portion that includes luma and chroma channels may be indicated together with the respective channel in a memory or, in general, in any kind of storage medium. The resolution of the respective channels may be provided in terms of the number of samples. Alternatively or in addition, the channel resolution may be provided in terms of a ratio with reference to the size of the picture (which may be indicated in a bitstream or obtained in another manner), i.e. all the samples of said picture.

The above encoding may be performed by a variational autoencoder, VAE. VAEs are known in the field for performing tasks related to picture encoding and decoding in an efficient manner, with a good compromise between needed bitrate and quality of the reconstructed image/picture. By up-sampling of sub-sampled chroma components (i.e. chroma having a lower resolution that a luma channel) such that the resized chroma has the same resolution as the luma, an original sub-sampled YUV color format may be subject to encoding by the VAE. The encoder part of the VAE shown in FIG. 2C may then process the respective equal-sized three-channel input in the manner as described before with reference to FIG. 2C. In that process, the luma channel remains unaffected, and hence the possibly important image information as provided by the luma may be preserved.

However, it is noted that the encoding by VAE is only one of possible advantageous implementations. It is not to limit the present disclosure, which may efficiently work also with other kinds of autoencoders, such as those having a structure as shown in FIG. 2B. Moreover, the present disclosure is not limited to autoencoders and it may be applied to any ANN based, or in general to any trained networks. In principle, the present disclosure is applicable to any kind of encoder or decoder.

In one exemplary implementation of the method, the up-sampling of the chroma component is based on a sample of the luma component. This means that said up-sampling is based on the value of the luma sample and thus content adaptive. A luma sample may refer to one or more luma samples. This includes using all luma samples for the up-sampling.

The chroma up-sampling may further include processing of the chroma component by a trained network. The size equalizing may include inputting the luma component and the chroma component to the trained network, and outputting, from the trained network, the up-sampled chroma component. The use of the luma component as an input of this trained network may preserve the cross-component information between the luma and the chroma channels.

The trained network of the encoding side may be any kind of network suitable for up-sampling. This includes, for example, an artificial neural networks (ANN) such as fully-connected or sparse neural networks, convolutional neural networks (CNN) or the like. In particular, CNNs have been successfully applied to image/picture processing tasks for picture encoding and decoding. The trained network used for the chroma up-sampling may be also referred to as size-equalizing network, as it provides as output a resized chroma component (i.e. the intermediate chroma component) having a resolution matched with the resolution of the luma channel. In other words, after the processing by the size-equalizing network, all the outputted luma-chroma channels have the same resolution (i.e. size). However, the present disclosure is not limited to such up-sampling. As will be shown later, there are several possible advantageous implementations of the up-sampling. The term trained refers to a type of networks which are pre-trained by a machine learning. Such network may be also a trainable network with an input for machine learning (supervised or unsupervised). However, the trained network may be provided by configuring the weights without performing the training of the same network, e.g. by obtaining the weights from a storage medium. The weights may be pre-obtained by training a similar network and stored. Alternatively, the weights (also referred to as coefficients) may be derived by use of mathematical filters, such as Wiener filter or Kalman filter or the like. Another option is to derive the weights by use of transformation layers, for example, a discrete cosine transform (DCT) or a discrete sine transform (DST). While the transformation layers may be included in the trained network, the respective weights may be fixed coefficients and may be considered as parameters. It is noted that the DCT and DST are mere examples and in general, any suitable known transformation such as orthogonal unitary transformation may be applied, e.g. Hadamard transformation, fast Fourier transformation (FFT), discrete Fourier transformation (DFT), or transformations obtained by modifying the above mentioned transformations to comply with some implementation constraints (such as number representation and bit depth), or the Karhunen-Loeve transformation or the like.

As further discussed below, the up-sampling that may be performed in a first layer of the trained network (or elsewhere) may use a bilinear filter or another kind of a linear or non-linear interpolation filter instead of the nearest-neighbor-based filtering method. The nearest-neighbor filtering may be viewed as a simplified version of an interpolation filter. Other super-resolution methods may be used in addition or alternatively.

As an example, at the encoder side, the chroma components of a sub-sampled color format video frame such as YUV420, YUV422 etc. are equalized to the size of luma component using the size-equalizing network layer.

In an exemplary implementation, the trained network comprises at least two processing layers. Among the two processing layers are a first layer for performing the up-sampling based on the input chroma component, and a second layer for performing processing of an output of said first layer together with the luma component. The terms "first" and "second" here are mere labels and do not necessarily correspond to the first and the second layer of the network in the sequence of layers. There may be some other one or more layers between said first and second layers.

In one implementation example, the processing of the output of the first layer together with the luma component includes element-wise adding the luma component and the up-sampled chroma component. Thus, the chroma up-sampling using luma as side information may be performed efficiently, since the "adding operation" has a low-complexity. The "joined"-based processing of the luma and chroma component may not be limited to the adding operation. In this example, the cross-component information is preserved. Therein, the term preserved means that the luma information, which includes details on high frequency information and sharp edges, is used in the chroma up-sampling operation. Compared with the prior art, the chroma component is deeply enhanced in this way.

Alternatively, the chroma may be concatenated with the luma. This typically results in the concatenated luma-chroma compound having a larger size than each of the luma and chroma component. Other kind of "join"-kind operations may be used instead and/or combined with the adding or concatenating, by which information of the luma is exploited for the up-sampling and/or processing of the sub-sampled chroma by the size-equalizing network.

The above processing may be exemplified by FIGS. 4 to 8, illustrating some embodiments of the present disclosure, covering both the encoder- and encoder-side.

Figure 4:
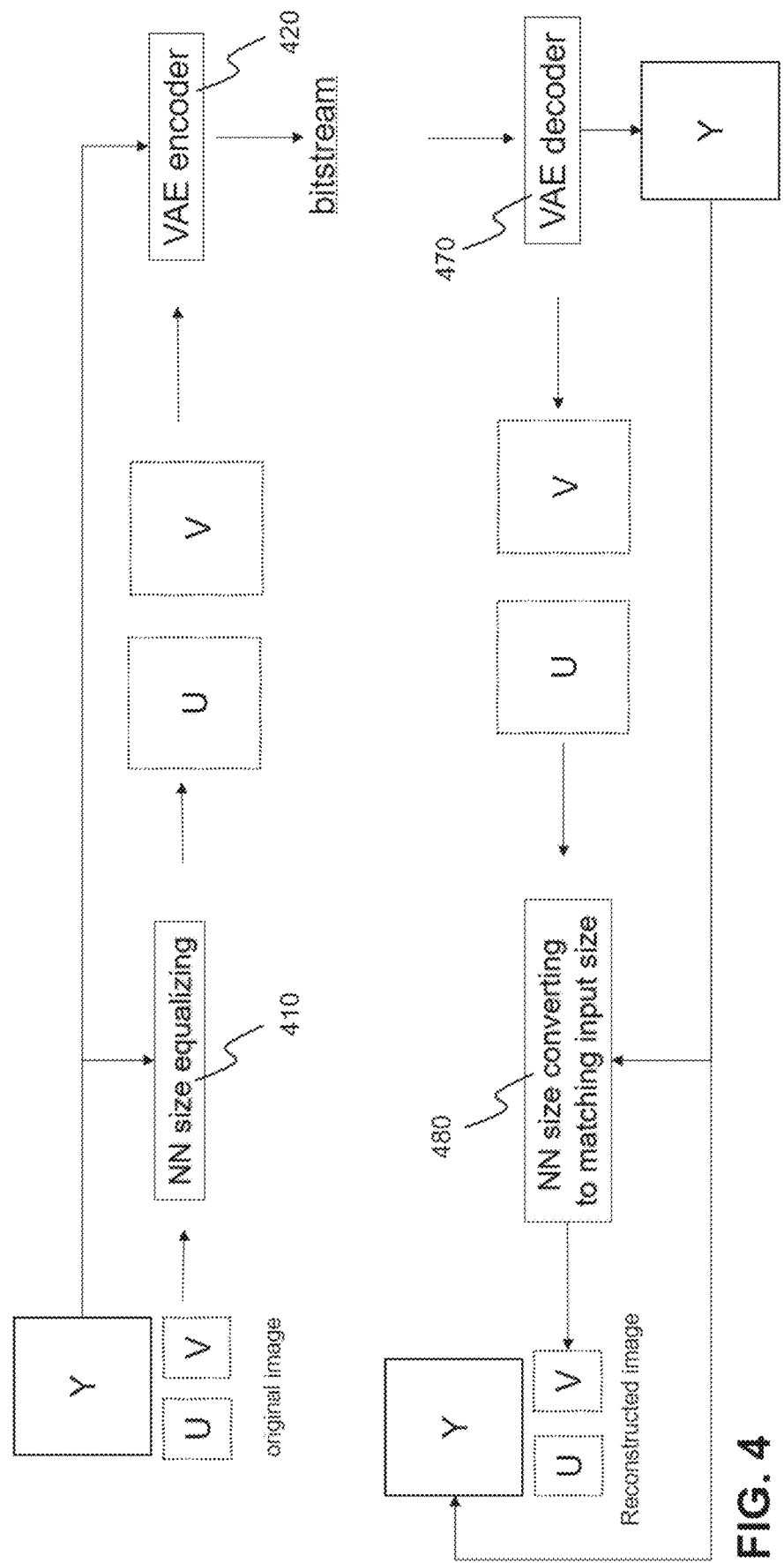
FIG. 4 shows a schematic drawing of VAE-based encoder-decoder architecture of the present disclosure, performing up-sampling and down-sampling of the chroma channels using the luma component as side information.

At the encoder side shown at the top of FIG. 4, includes an input for a luma component Y and chroma components U and V. In particular, chroma components U and V are input into a size equalizing network layer 410 up-converting the (sub-sampled-compared to the luma component Y) chroma component(s) to the size of the luma component. The term "up-converting" may be also referred to as up-sampling. As mentioned before, said up-conversion or up-sampling may be performed also using the luma component as an input information (i.e. side information) for the size-equalizing network, which is indicating in FIG. 4 by a third input to the NN size equalizing module 410. The output of the NN size equalizing module 410 are the intermediate chroma components U and V matching in dimensions the luma component Y. Both the luma component and the intermediate chroma components are input into a VAE encoder 420. The VAE encoder may be an encoder as shown in FIG. 2B or 2C or the like. The VAE encoder 420 outputs a bitstream in which the intermediate chroma components U, V and the luma component Y are included, e.g. compressed.

Correspondingly, the bottom portion of FIG. 4 shows an exemplary decoder side. In particular, an encoded bitstream (such as the bitstream encoded by the VAE 420) is input to a VAE decoder 470. The VAE decoder 470 may be a decoder such as the one shown in FIG. 2B or 2C or the like. The VAE decoder 470 outputs a luma component Y and intermediate chroma components U and V. These decoded luma component Y and the intermediate chroma components U and V are not necessarily the same as the luma and intermediate chroma components in the encoder side. This is because the VAE encoder 420 may compress the input in a lossy manner in some embodiments. Then, the decoded components Y, U, V which are matching in resolution are input to a down-sampling network 480 which performs a NN size converting back to the input size (resolution). The intermediate chroma components U and V are down-sampled to the dimensions of the chroma components. In the process of the down-sampling, the luma component Y may be used.

Figure 5:
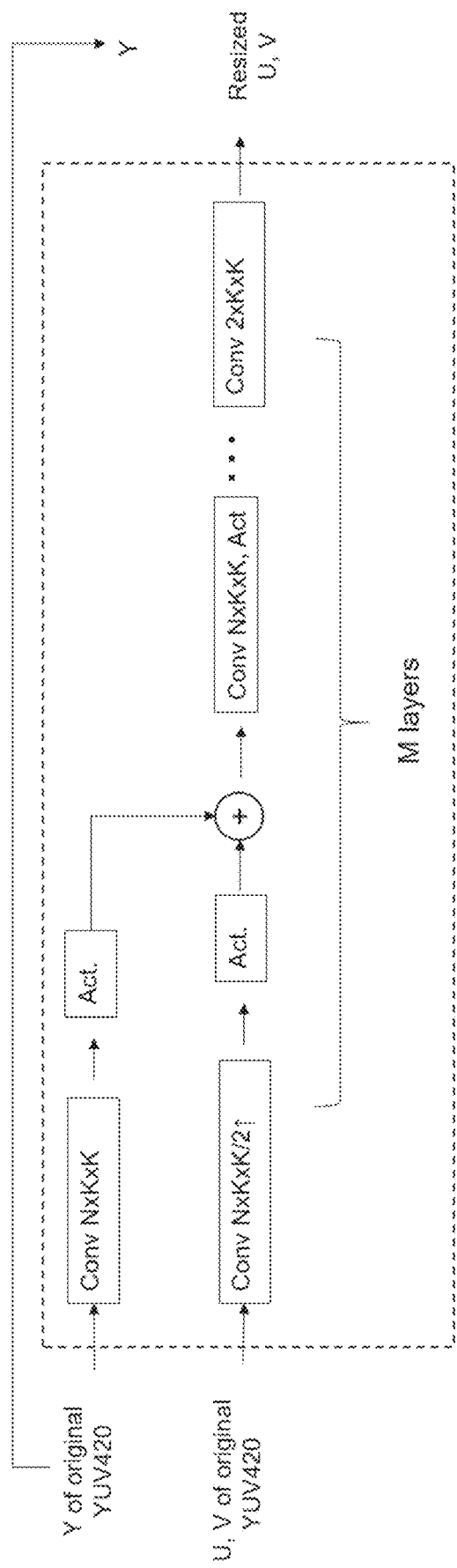
FIG. 5 shows a schematic drawing of the size-equalizing network for the chroma up-sampling on the encoder side of the VAE architecture, using the luma component as side information.

FIG. 5 shows an implementation example of the present disclosure for a size-equalizing network 410 on the encoder side. In this example, the respective layers belong to a convolutional neural network (CNN). With reference to FIG. 5, the convolutional network layers are defined as follows:

Conv N×K×K: denotes a convolutional network layer, having a kernel of convolution of K×K, with K being a positive integer. A typical number of K is 3 or 5. However, K is not limited to these numbers, and may take any other positive integer. In particular, larger values of K are possible. N is a positive integer and denotes the number of output channels of the convolutional neural network. A typical number of N is 128 or 192. However, any other number may be used, depending on the needs of output. In particular, N may be 1 or 2, i.e., conv 1×K×K or conv 2×K×K corresponding to a CNN layer having one or two output channels.

Act.: refers to an activation layer, which may be a non-linear activation function, for example, rectified linear unit (ReLU) or GDN discussed above. Said functions are used to activate the convolutional layers. Without activation, the convolutional layers would be a mere linear combination, which would be the same as without a convolution operation.

Conv N×K×K/2↑: denotes the same as Conv N×K×K, but further up-samples (up-converts) the output by a factor of 2 both horizontally and vertically (in this example). This is indicated by the "2" and the up-arrow.

Conv. N×K×K, Act: denotes a convolutional layer plus activation layer.

FIG. 5 shows an example for the encoder side for the case of the color format YUV420. This means that three channels, Y, U, and V are involved, and hence N=3.

For example, when the luma size is w×h, the chroma size is w/2×h/2, and the color format is YUV 420, the size equalizing network layer up-samples the chroma components U and V by a factor of 2, both horizontally and vertically. Here, w represents width and h the height of the of the luma component, e.g. counted in (integer) samples. The conv N×K×K/21 layer up-samples the U and V components each by the factor of 2 both horizontally and vertically. The output of this layer has N channels.

As evident from FIG. 5, the Y component is processed with a conv N×K×K layer without up-sampling, and hence preserves the resolution (dimensions) of the luma component. The output of this layer has also N channels as the size-equalizing layer conv N×K×K/2↑. Both output signals of the layers conv N×K×K/2↑ and conv N×K×K are processed with respective activation layer (i.e., non-linear activation function for example ReLU or GDN) outputting feature maps, which are then added (summed-up). In this example, a simple sum of signals is used. This means that the respective outputs are added element-wise (elements of the feature maps are summed). This is possible as the size (dimensions) of the outputs from the conv (olutional) layers are the same in terms of width and height.

Other kind of operations are possible for merge-based operations (combinations) of the chroma with luma. For example, a concatenation of the luma and chroma outputs is suitable. The adding may be one of the simplest solutions with only N channels in the resulting frame. This means that the sum operation preserves the number of channels. In contrast, concatenating introduces a latent representation with 2N channels. Thus, the sum operation provides a low-complexity for the up-sampling processing of the chroma with luma without further increase of the channels.

The combined signal is then processed by one or multiple convolution layers and activation layers, providing as output two chroma channels (resized U, V corresponding to up-sampled chroma components). The original Y signal is also provided to the next step which is the encoding 420 into the bitstream. The up-sampled chroma is also referred to as intermediate chroma component/channel. These equal-sized outputs (signals) are then used as the input to the VAE structure.

In the example of FIG. 5, the adding operation of Y and the up-sampled chroma U and V is placed after the first layer. However, said operation (and for that matter any other suitable operation for concatenating and/or merging signals) may be placed also after any other layer. The benefit of this design is that the Y features are mostly extracted by the convolutional layers that are arranged after the adding operation.

In another example, when the luma size is w×h, the chroma size is w/2×h, and the color format is YUV422, the size equalizing network layer up-samples the chroma components U and V by a factor of 2 horizontally. In this case, the up-sampled chroma components have a rectangular shape. In either case, the outputted up-sampled chroma components, U and V, of the size equalizing network layer have the same size as the original Y component. Thus, the output of said size-equalizing network layer may be used as an input for the VAE structure.

In one exemplary implementation, the up-sampling comprises inserting, after each n-th line of samples of the chroma component, an additional line of samples. Therein, a line refers to a row and/or column, and n is an integer equal to or greater than 1. This means that, for example, each odd row is an added row. In addition or alternatively, for example, each odd column in the resulting up-sampled component is an added column. Instead of odd, each even row and/or column may be added. These examples are for n=1—after (or before) each one row, an additional row is inserted. Such up-sampling is up-sampling by two. However, the present disclosure is not limited to this particular example. Rather, n may be larger, meaning that after an integer of rows, an additional row of samples is inserted. A similar approach is applicable for columns. The n may differ for rows and columns. Moreover, this allows a further adaptation of the chroma up-sampling by inserting line samples at specific rows and/or columns.

Moreover, the up-sampling may be performed by inserting, after each n-th line of samples of the chroma component, a line of samples with value zero. This may be referred to as zero-filling. This is a simple manner of performing the up-sampling by merely setting the respective line samples to zero. Hence, no further signaling or processing overhead is needed. Such approach is exemplified in FIG. 9, showing 4×4 samples of the up-sampled chroma. The solid bullets refer to samples of the original chroma. The open circles refer to samples having a zero value. In this example, the lines of zero-valued samples are inserted after each row and column of the chroma component. Further, in this example, the size-equalizing network are simplified to a one-layer network (M=1) with no further layers after the "addition" operation of FIG. 5. In FIG. 9 (encoder side), the up-sampling of U and V is simplified as filling zeros in the each row and column for the case of YUV420 color format. In case of YUV422 format, the filling of zeros is for each column). In this case, the network is not a convolutional neural network, but can be understood as a one layer of a fully-connected neural network (FCNN). This network itself is therefore not necessarily trainable However, it can be trained jointly with the VAE structure for better coding performance. Thus, the respective FCNN may refer also to a trained network.

In another implementation, the chroma up-sampling may be performed by inserting, after each n-th line of samples of the chroma component, a line of samples with a value equal to their respective nearest neighbor sample in the chroma component. The inserting of the value may, for example, be performed by copying the chroma value to the respective neighbor samples. As in case of the zero-filling mentioned above, this allows a further adaptation of the chroma up-sampling by inserting line samples at specific rows and/or columns. Further, using values for the inserted line samples with reference to the nearest neighbor sample of the chroma, the accuracy of the chroma up-sampling Is more accurate since neighboring information (as reflected by the neighbor chroma sample value) with reference to the original chroma is employed.

Figure 11:
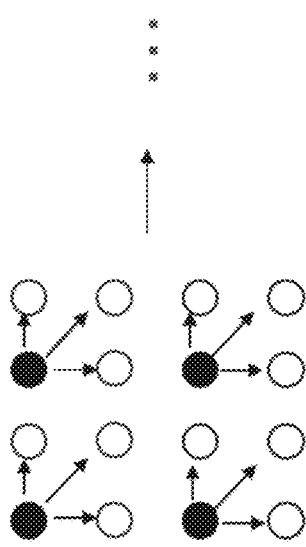
FIG. 11 shows another example for chroma up-sampling by inserting zeros at the odd-row and odd columns with a value equal to their respective nearest neighbor sample in the chroma component.

This is exemplified in FIG. 11, showing 4×4 samples of the up-sampled chroma. Again, the solid bullets refer to samples of the original chroma. The open circles refer now to samples having a value in accordance with their respective chroma neighbor sample. In FIG. 11, the inserting of the chroma value to its respective neighbor samples is indicated by arrows. In this example, the sample values are inserted after each one row and column of the chroma component. Further, in this example, the size-equalizing network are simplified to a one-layer network (M=1) with no further layers after the "addition" operation of FIG. 5, where the cross-component information from the luma to chroma is preserved by the "addition" operation. For example, if luma includes more information (since it has the higher original resolution), the additional information is added to the chroma samples at the correct positions when the luma and chroma have the same dimensions. In FIG. 11 (encoder side), the up-sampling of U and V is simplified as nearest-neighbor sample up-sampling in each row and column as shown for the YUV420 format in FIG. 11. In case of YUV422 format, the nearest-neighbor sample up-sampling is for each column. In the above examples for the chroma up-sampling, the network is not a convolutional neural network, but can be understood as a one-layer of a fully-connected network. This network itself is therefore not trainable, but it can be trained jointly with the VAE structure for better coding performance. Thus, the respective FCNN may refer also to a trained network. The nearest-neighbor up-sampling here means that value of a nearest sample (in a predefined direction) is copied into the newly added samples. In FIG. 11, the nearest neighbor to the left and on the top is taken. This is a convention which is not to limit the present disclosure. The nearest neighbor may be copied from the right hand side and from the bottom. There may be an interpolation involved (e.g. an average of the neighboring sample values) or other kinds of up-sampling.

The above-described up-sampling network is a mere example of a trained network for size-equalizing having one layer. It is clear for those skilled in the art that the size-equalizing layer may have more than one layers, as shown throughout FIGS. 5 and 7. In this case, the size-equalizing network may be trained to perform the chroma up-sampling.

Figures 7, 8:
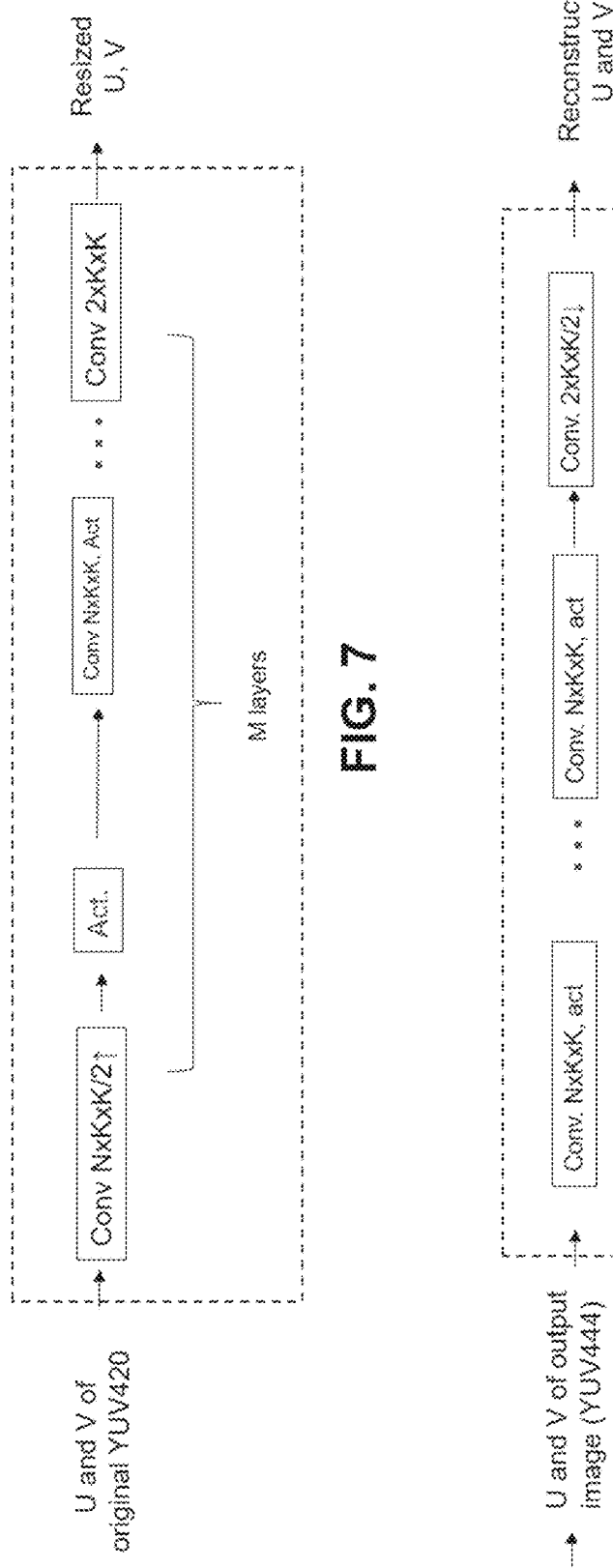
FIG. 7 shows a schematic drawing of the size-equalizing network for the chroma up-sampling on the encoder side of the VAE architecture, without using the luma component as side information.
FIG. 8 shows a schematic drawing of the size-converting network for the (intermediate) chroma down-sampling on the decoder side of the VAE architecture, without using the luma component as side information.

In the previous discussion, the luma component was used as side-information and inputted to the size-equalizing layer, so as to perform the up-sampling the sub-sampled chroma channels. In a further implementation example of the size-equalizing network as shown in FIG. 7, the up-sampling may be performed without further use of the luma. In other words, the luma channel is not input to the size-equalizing network at the encoder side. Otherwise, the processing of a sub-sampled chroma by the encoder is the same as already discussed for the case where the luma was used as side information for the chroma up-sampling. This allows for a simplified design of the size-equalizing network as it takes only the (one or more) chroma component(s) as an input.

According to an embodiment of the present disclosure, a method is provided for decoding a picture portion from a bitstream, the picture portion including a luma component, and a chroma component with a resolution lower than the resolution of the luma component. The picture portion refers to a number of samples of an image and/or picture with said number being smaller than the total number of the samples of said image/picture. The picture portion may also include all samples of the image or picture. The term sample may also refer to a pixel. The image may be a still or video picture. The picture portion may include one or more chroma components. For example, a picture portion in luma-chroma format YUV420 includes two chroma components U and V (also referred to as chroma channels). The chroma resolution of the picture portion may be lower than the resolution of the luma channel with respect to the whole picture/image. Alternatively, the chroma resolution may be lower than the resolution of the luma channel with reference to a part of the image. In this "partial" luma resolution case, the luma and chroma channel(s) related to the same part of the picture. The same part of the picture may also be referred to as a region of the picture.

Figure 14:
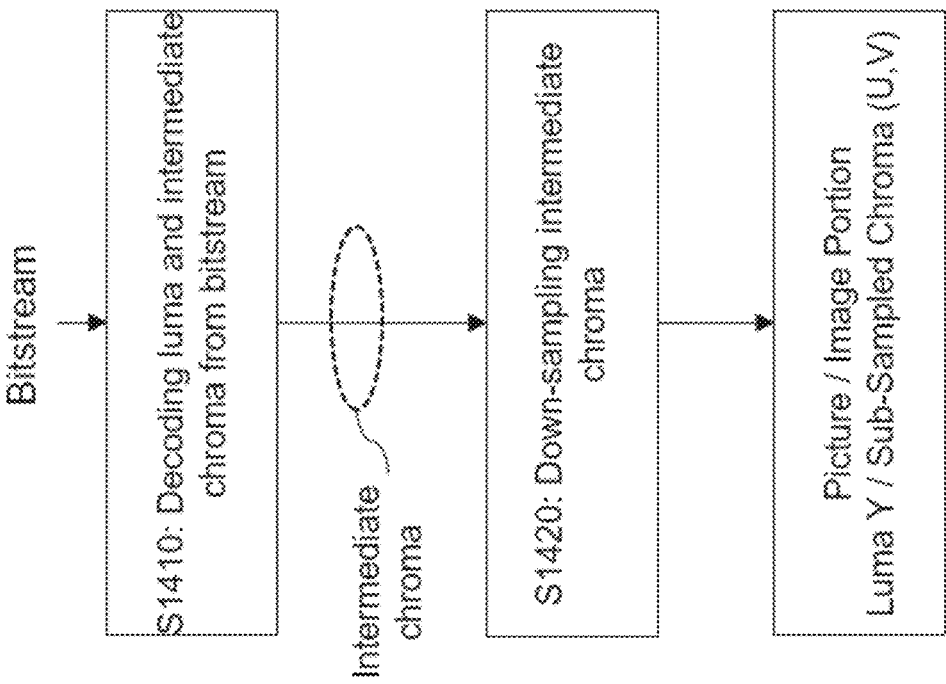
FIG. 14 shows a flowchart of the decoding method, including decoding the intermediate chroma from the bitstream and down-sampling the intermediate chroma to the sub-sampled chroma having a different size as the luma.

The method is illustrated in FIG. 14, and comprises a step 1410 for decoding the luma component and an intermediate chroma component matching the resolution of the chroma component from the bitstream. The intermediate chroma component is also referred to as up-sampled chroma component, reflecting that said intermediate component has been generated/obtained by up-sampling the chroma component. The resolution is given with respect to the size (i.e. dimension) of the two-dimensional (2D) luma or the chroma channel. This is typically given by the number of samples along the x-y direction of the 2D luma or chroma sample or by the total number of samples. The method further includes a step 1420 for down-sampling the intermediate chroma component so as to obtain the chroma component of said picture portion. The above decoding may be performed by a variational autoencoder, VAE. VAEs are known in the field for performing tasks related to image/picture encoding/decoding in a very efficient manner, with a good compromise between needed bitrate and quality of the reconstructed picture. The encoder part of the VAE shown in FIG. 2C may then process the respective equal-sized channel input, including the luma and the intermediate chroma, in the manner as described before with reference to FIG. 2C. In that process, the luma channel remains unaffected, and hence the most important image information provided by the luma is preserved, when decoding the luma component from the bitstream.

By down-sampling of the intermediate chroma component (i.e. chroma having the same resolution as the luma channel), the original chroma component (i.e. the sub-sampled chroma) may be reconstructed. In particular, the picture portion with the original luma-chroma format may be reconstructed with a high quality. Thus, the decoder is able to provide as output the picture portion in a chroma format, with the chroma having a lower resolution (i.e. size) that the luma.

In one exemplary implementation of the method, the down-sampling further includes processing the intermediate down-sampling chroma component by a trained network. This network may be referred to as size-converting network, reflecting its purpose for converting the input intermediate chroma (having the same size as the luma) to a size of the original chroma having a lower resolution (i.e. smaller size) than the luma.

The trained network of the decoding side may be any kind of network suitable for down-sampling. This includes, for example, artificial neural networks (ANN) such as neural networks, convolutional neural networks (CNN) or the like. In particular, CNNs have been successfully applied to image/picture processing tasks for picture encoding and decoding. The trained network used for the chroma down-sampling may be also referred to as size-converting network, as it provides as output a resized chroma component (i.e. the original sub-sampled chroma component) having a lower than the resolution of the luma channel. In other words, after the processing by the size-converting network, all the outputted luma-chroma channels have a different resolution (i.e. size).

In first exemplary implementation of the method, the processing by the trained network includes inputting, to the trained network, the intermediate chroma component, and outputting, from the trained network, the chroma component. This means that the trained network uses only the intermediate chroma as an input to perform the down-sampling of the intermediate chroma. Thus, in this example, no side information on the luma is used by the size-converting network layer. Therefore, the trained network may be designed with a low complexity, and provides a low processing overhead since no luma is used as side information.

This is exemplified in FIG. 8 showing that the luma component may not be used as input of the size-converting network at the decoder. In this example, the two chroma components, U and V, refer to the color format YUV444, with U and V having the same size as the luma Y. Otherwise, the processing of the intermediate chroma by the decoder is the same as already discussed with reference to FIG. 4. In an exemplary implementation of the trained network, the trained network comprises at least two processing layers. Among those at least two layers, is a first layer performing processing of the input intermediate chroma component; and a second layer among the at least two processing layers performs down-sampling of an output of said first layer.

In the example of FIG. 8, the size-converting network at the decoder side is constructed with multiple convolutional layers and activation layers Conv. N×K×K, act. The first Conv. N×K×K, Act. on the left takes the intermediate chroma components U and V as input. The last layer (Conv. 2×K×K/2↓) of the network down-samples the signal by a factor of 2 in both directions, horizontally and vertically, and outputs two channels. These two channels are used as the reconstructed U and V signal of the YUV420 format. When all the intermediate Conv. N×K×K, Act. layers are removed, the last Conv. 2×K×K/2↓ refers to the second layer.

In this example, the Y information is not down-sampled as compared to the approach of J. Balle. Therefore, the luma information and the spatial information of Y is mostly preserved. As discussed above, the chroma down-sampling may be performed without utilizing luma information as side information.

In another exemplary implementation, the down-sampling of the intermediate chroma component is based on a sample of the luma component. This means that said down-sampling is not based on the size, but rather on the content of the luma channel, i.e. the respective value of the luma sample. A luma sample may refer to one or more luma samples. This includes using all luma samples for the up-sampling.

When the chroma is processed by the trained network, the processing by the trained network includes inputting, to the trained network, the luma component. In one exemplary implementation, the first layer of the trained network performs processing of the intermediate chroma component together with the luma component. In other words, the luma is used as a side information for the chroma down-sampling processing. This preserves the cross-component information between the luma and the chroma channels. In particular, luma component may include more detail information than the sub-sampled (original) chroma components. With use of the luma as the side information, some details of the chroma may be recovered based on the luma component. The up-sampling network may be specifically trained for such up-sampling.

Figure 6:
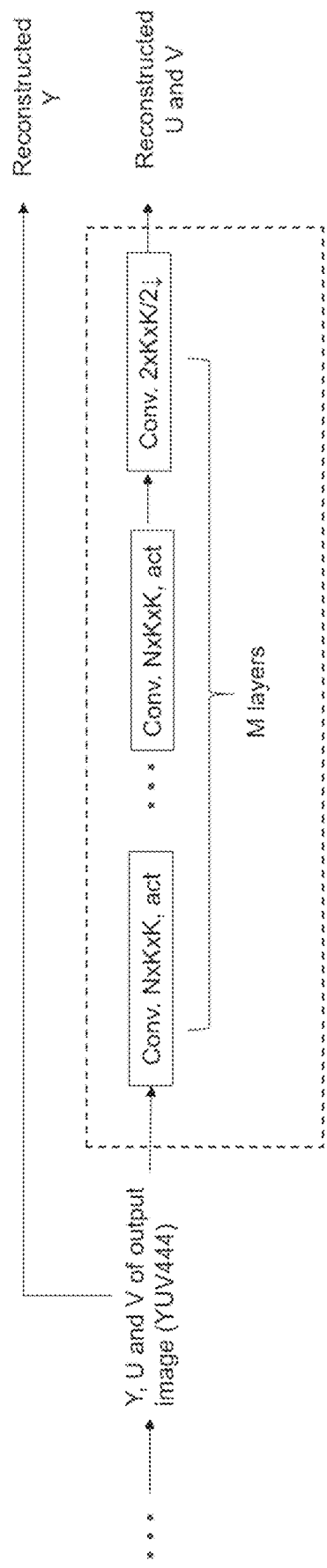
FIG. 6 shows a schematic drawing of the size-converting network for the (intermediate) chroma down-sampling on the decoder side of the VAE architecture, using the luma component as side information.

It should be noted that for the decoder side the first processing layer of the size-converting network may not need to perform an "adding operation" as opposed to the encoder side, where such kind of operation may be performed as shown in FIG. 5 (at least some kind of explicit combination operation may be employed for the size-equalizing network at the encoder). This is because the input to the first layer of the size-converting network of the decoder, including the luma Y and the intermediate chroma(s) U, V already have the same size as shown in FIG. 6. Rather, the three equal-sized channels may directly input to said first CNN layer without the need of a separate adding operation. This is not the case for the input to the first layer of the size-equalizing network of the encoder shown in FIG. 5. In this case, the chroma has first be up-sampled, followed by adding the up-sampled chroma and the luma. This is then fed into the CNN layer.

FIG. 6 shows an implementation example for the decoding side of the VAE structure, taking as its input the output of the foregoing encoding side of the VAE structure. As discussed, the respective input to the size-converting network has now 3 components with same sizes (i.e., YUV444). The first channel is directly used as the reconstructed luma component, and has the same size as the original luma component in the YUV420 format. Conv. 2×K×K/2↓ denotes the same as Conv N×K×K, but further down-samples (down-converts) the output by a factor of 2 both horizontally and vertically. This is indicated by the "2" and the down-arrow. As mentioned above, such arrangement may be advantageous to preserve cross-component information, e.g. to enhance the chroma with further details from luma which had originally higher resolution (dimensions) than chroma.

In general, the trained network using the luma at the decoder side of the VAE structure may be constructed in the same manner as without the luma, except for accounting of the additional luma as input. This is exemplified in FIG. 6, wherein the size-converting network is also designed with multiple convolutional layers and activation layers Conv. N×K×K, Act. Again, the last layer (Conv. 2×K×K/2↓) of the network down-samples the signal by a factor of 2 in both directions, horizontally and vertically, and outputs two channels. These two channels are used as the reconstructed U and V signal of the YUV420 format.

For example, when the color format is YUV 420, the size-converting network layer down-samples the intermediate chroma components, U and V, by a factor of 2 both horizontally and vertically. In another example, when the color format is YUV 422, the size-converting network layer down-samples the intermediate chroma components, U and V, by a factor of 2 horizontally. In either case, the final outputs have the same size as the original components of the input frame with color format YUV420 or YUV422, respectively.

In one exemplary implementation of the method, the down-sampling comprises removing, after each n-th line of samples of the intermediate chroma component, a line of samples. Therein, a line is a row and/or column and n is an integer equal to or greater than 1. This means that, for example, after each one (n=1) or two (n=2) row(s) and/or column(s) said line sample may be removed or deleted. Thus, the down-sampling of the intermediate chroma may be performed quickly by simply removing the respective line samples. Alternatively, the down-sampling may be performed, for example, by (possibly weighted) averaging sample values nearest neighboring their respective chroma sample.

Figure 12:
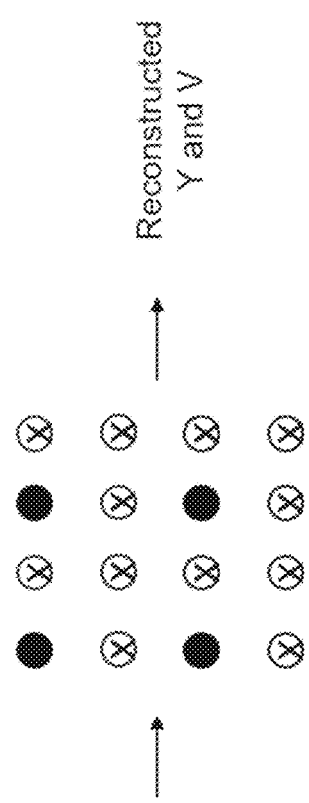
FIG. 12 shows another example for chroma down-sampling by removing sample values at the odd-row and odd columns corresponding to nearest neighbor samples in the chroma component.

Examples of the line sample removal are shown in FIG. 10 and FIG. 12. Note that the sample configurations of FIGS. 10 and 12 corresponds to the sample configurations of FIGS. 9 and 11, respectively, as a result of the up-sampling processing of the chroma component at the encoder side.

Specifically, FIGS. 10 and 12, show 4×4 samples of the intermediate chroma. The solid bullets refer to samples of the original chroma. The crossed-open circles refer to samples which may be non-zero values as a result of the chroma up-sampling processing (with and without the use of luma as side information) by the size-equalizing network on the encoding side and/or the chroma processing through the first layer(s) of the size-converting network on the decoding side.

In the examples shown in FIGS. 10 and 12, the size-converting network is simplified as a one-layer network (M=1). In FIGS. 10 and 12 (decoder side), the down-sampling of U and V is simplified so as to discard the odd row and the odd column samples in case of YUV420 color format. For YUV422, the odd column samples are removed. In either of these cases shown in FIGS. 10 and 12, the respective network is not a convolutional neural network, but can be understood as one layer of a fully-connected neural network (FCNN). This network itself is therefore not trainable However, it can be trained jointly with the VAE structure for better coding performance. Thus, the respective FCNN may refer also to a trained network.

However, this is a mere example of a trained network for size-converting having one layer. It is clear for those skilled in the art that the size-converting layer may have more than one layer, as shown throughout FIGS. 6 and 8. In this case, the size-converting network may be trained to perform the chroma up-sampling.

Note that the size-equalizing network at the encoder side shown in FIG. 5, and the size-converting network at the decoder side shown in FIG. 6 may be jointly trained with the VAE structure. This may further improve the encoding-decoding processing of sub-sampled chroma components in particular within a VAE framework. This includes, for example, the encoding-decoding performance and/or the quality of the reconstructed picture/image.

Alternatively, they may be trained separately and used as a pre-trained VAE network. In either case, the respective networks refer to trained networks. It should be noted that the up/down-sampling by a factor of two (sampling factor) is a non-limiting example, but is one of typical values used. In general, the sampling factor may be any integer equal to or larger than one. The sampling factor may be alternatively a fractional sampling factor given as a ratio e.g. p/q of two positive integers p and q.

Summarizing this part of the embodiment, a size-equalizing network (for up-sampling) and a size-converting network (for down-sampling) are used to adjust the sizes of sub-sampled chroma channels such that the three components of YUV420 have the same size. These may then be handled/processed by the existing VAE structures.

Moreover, as already mentioned, the present disclosure also provides devices which are configured to perform the steps of the methods described above.

Figure 15:
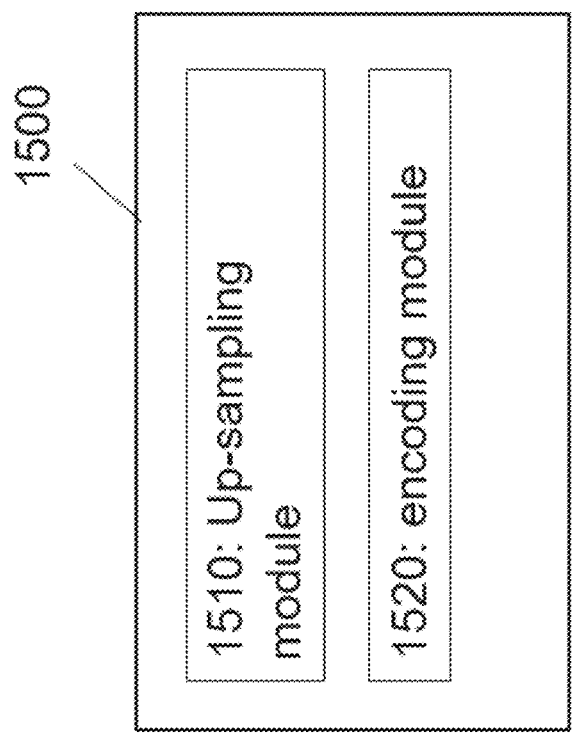
FIG. 15 shows a block diagram of an encoder, including an up-sampling module and an encoding module.

FIG. 15 shows an encoder 1500 for encoding a picture portion, the picture portion including a luma component and a chroma component with a resolution lower than a resolution of the luma component. The encoder comprises an up-sampling module 1510 configured to up-sample the chroma component to obtain an up-sampled chroma component matching a resolution of the luma component; and an encoding module 1520 configured to encode the luma component and the up-sampled chroma component into a bitstream.

In one implementation example, the encoder may comprise one or more processors; and a non-transitory computer-readable storage medium coupled to the one ore more processors and storing programming for execution by the one or more processors, wherein the programming, when executed by the one or more processors, configures the encoder to carry out the method referred to above.

Figure 16:
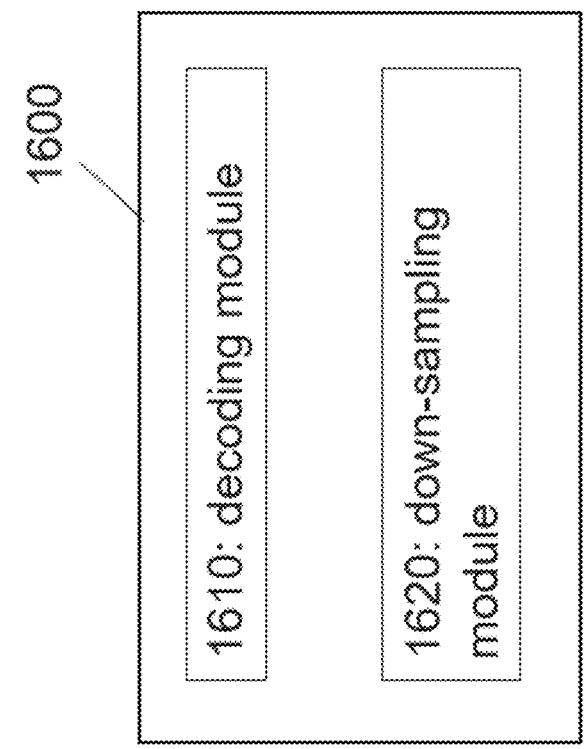
FIG. 16 shows a block diagram of a decoder, including a decoding module and a down-sampling module.

FIG. 16 shows a decoder 1600 for decoding a picture portion from a bitstream, the picture portion including a luma component, and a chroma component with a resolution lower than the resolution of the luma component. The decoder comprises a decoding module 1610 configured to decode the luma component and an intermediate chroma component matching the resolution of the chroma component from the bitstream; and a down-sampling module 1620 configured to down-sample the intermediate chroma component so as to obtain the chroma component of said picture portion.

In particular, the decoder may comprise one or more processors; and a non-transitory computer-readable storage medium coupled to the one or more processors and storing programming for execution by the one or more processors, wherein the programming, when executed by the one or more processors, configures the decoder to carry out the method referred to above.

According to an embodiment of the present disclosure, a computer program stored on a non-transitory medium comprising code which when executed on one or more processors performed steps of any of the methods referred to above.

Some embodiments of the present disclosure may provide the following advantages summarized as follows:

The sample information of the luma is fully preserved.
The spatial information of the luma is fully preserved.
The networks (i.e. trained networks) used for the size-equalizing and size-converting (both trained networks may be CNN) may be jointly trained with the VAE network structure. This may provide an advantage of further improving the results.
Flexibility in handling of a variety of other chroma sub-sampled formats by the VAE network structure, such as YUV422.
The cross-component information can be preserved.

Second Embodiment

The second embodiment may be combined with any of the exemplary implementations of the first embodiment. As discussed above, the first embodiment is directed toward handling of a chroma component subsampled in comparison to a luma component. Up-sampling of the chroma component makes such resized chroma component along with the luma component suitable for further processing within a trainable network based frame work, such as ANN or VAE. Thereby, the luma component may remain mostly unaffected, and hence the sample information as well as the spatial information of the luma may be preserved. This may be desirable for many applications where a high quality of the reconstructed picture (or portions thereof) is required. This means that a large resolution should be maintained, and therefore the encoding-decoding processing should not tamper the luma.

However, in other applications, a high resolution is not necessarily the most important target, but rather performing the encoding-decoding process more quickly. Moreover, a desired target may be a low bitrate, resulting in a lower resolution, e.g. as provided by luma down-sampling. Thus, it may be desirable to select among encoding-decoding processing providing either low resolution or high-resolution pictures.

This problem may be solved by the second embodiment, which is directed toward adaptive switching between down-sampling of luma and up-sampling of chroma when adapting the resolutions of two or more input channels to match. The luma down-sampling and chroma up-sampling may be also referred to as sampling modes. Which one of the two sampling modes may be performed is determined on the encoder-side, based on the luma and chroma channels, and signaled to and/or determined by the decoder side.

In particular, as further discussed below with reference to the various exemplary implementations and aspects of the present disclosure, the luma down-sampling matching the size (resolution) of the chroma and the chroma up-sampling matching the size (resolution) of the luma, is adaptively selected by the encoder. Which one of the sampling modes is selected by the encoder may be indicated in various ways, as will be further detailed below, and may include indication by and/or determining from the received bitstream. Depending on the manner by which one of the sampling modes (i.e. luma down-sampling or chroma up-sampling) is indicated, the decoder side then performs either a luma up-sampling or a chroma down-sampling to produce the reconstructed picture portion that has the same resolution as the picture portion input to the encoder (i.e. the same sub-sampling format as the input frame).

According to an embodiment of the present disclosure, a method is provided for encoding a picture portion. The picture portion includes a luma component and a chroma component with a resolution lower than a resolution of the luma component. The picture portion refers to a number of samples of an image and/or picture with said number being smaller than the total number of the samples of said image/picture. The picture portion may also include all samples of the picture. The term sample may also refer to a pixel. The picture portion may be a still or video picture. The terms picture, image, and picture portion may be used synonymously. The picture portion may include one or more chroma components. For example, a picture portion in luma-chroma format YUV420 includes two chroma components. U and V (also referred to as chroma channels). The chroma resolution of the picture portion may be lower than the resolution of the luma channel with respect to the whole picture or image. Alternatively, the chroma resolution may be lower than the resolution of the luma channel with reference to a part of the image. In this "partial" luma resolution case, the luma and chroma channel(s) relate to the same part of the picture. The part of the picture may also be referred to as a region of the picture.

Down-sampling luma is beneficial for small resolutions to save bitrate, while up-sampling chroma is beneficial for large resolution to preserve luma information. Thus, the adaptive switching enables a selection of the sampling mode in dependence on the demands and/or restrictions on bitrate or picture or image quality. Since in either case of the selected picture processing of the picture portion the processed luma-chroma components have a matched resolution, the output may be handled within a VAE framework or another framework allowing for an efficient encoding.

The method is illustrated in FIG. 31 and comprises a step 3110 for selecting as a picture processing of the picture portion one of:
- down-sampling the luma component so as to obtain a down-sampled luma component matching the resolution of the chroma component; and
- up-sampling the chroma component so as to obtain an up-sampled chroma component matching the resolution of the luma component.

The resolution is given with respect to the size (i.e. dimension) of the two-dimensional (2D) luma channel. However, it is noted that the resolution may be also given by the dimensions of a channel different from luma, such as chroma channel or another kind of channel such as depth channel or the like. Resolution is typically given by the number of samples along the x-y direction of the 2D luma and/or chroma channel, or by the total number of samples in the channel at one time instant (total number of samples in a picture).

Prior to the luma down-sampling and/or chroma up-sampling, the resolution of the luma component and/or the chroma component may be obtained, e.g. from a memory or a storage, where it may be stored together with the picture portion to be encoded. The picture portion may be a part of the picture or the entire picture. Thus, the picture portion may include one or more samples of luma and one or more samples of chroma. In some embodiments, the picture portion may be one of a plurality of picture portions forming a picture. They may be obtained by subdividing the picture into the picture portions. In general picture portions may have the same size or may have different sizes (dimensions).

The picture may be a part of a video (moving picture). The resolution of the respective channels may be provided in terms of the number of samples. Alternatively, the channel resolution may be provided in terms of a ratio with reference to the size of the picture, i.e. all the samples of said picture.

The method of FIG. 31 further includes a step 3120 for processing the picture portion according to the selected picture processing. In other words, the selected picture processing may be one of down-sampling luma or up-sampling chroma. Moreover, the method includes a step 3130 for generating a bitstream according to the selected picture processing, wherein the generating includes encoding the processed picture portion. The encoding of the picture portion may be performed by an autoencoder, e.g. by a variational autoencoder, VAE, or by another type of autoencoder. VAEs are known in the field for performing tasks related to picture encoding and decoding in an efficient manner, with a good compromise between needed bitrate and quality of the reconstructed picture.

The picture processing selecting one of luma down-sampling and chroma up-sampling provides in either case resized luma and chroma components having equal resolution (e.g. equal dimensions). Thus, irrespective of the selected picture processing, the equal-sized luma-chroma channels may be handled within a common framework, such as ANN framework, e.g. VAE.

This includes in particular sub-sampled chroma formats, such as YUV422, YUV420. The color formats may also include any other luma-chroma format where any of the channels may have a different size. The encoder part of the VAE shown in FIG. 2 may then process the respective equal-sized three-channel input in the manner as described before with reference to FIG. 2. Further, the selection of the picture processing allows to adaptively switch between luma down-sampling and chroma up-sampling. Hence, a low-resolution or high-resolution picture processing may be selected.

Figure 17:
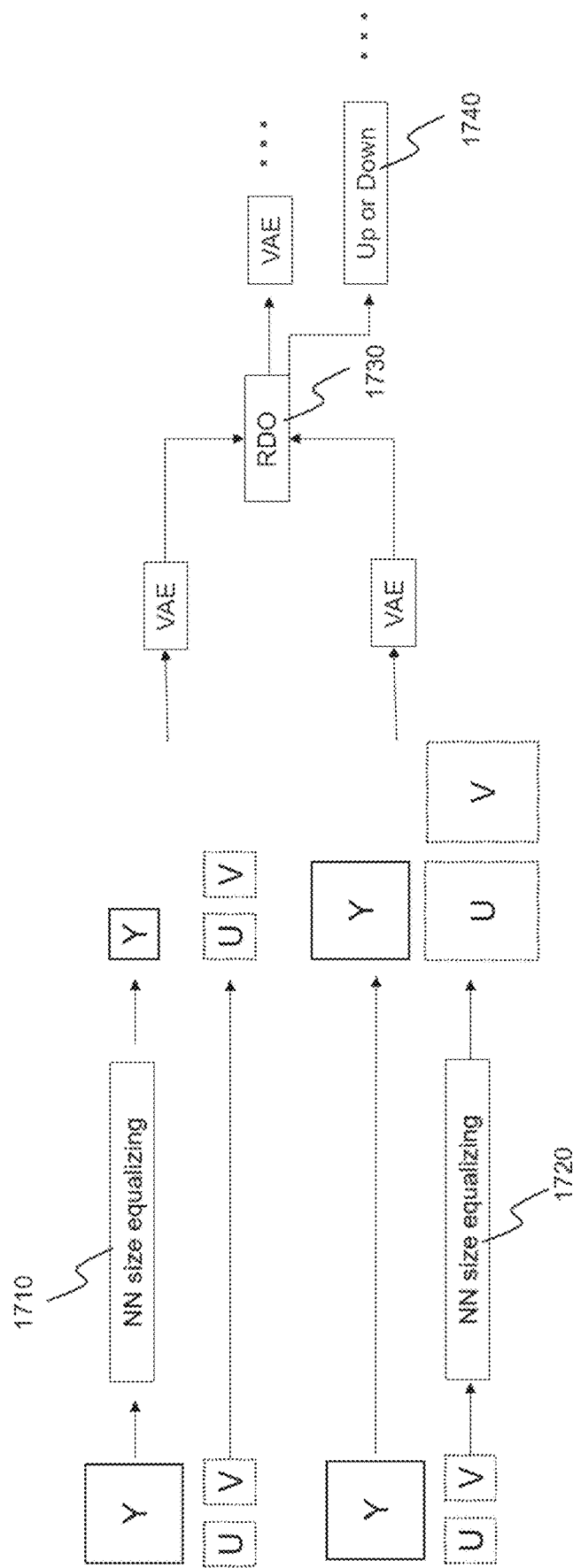
FIG. 17 shows a schematic of an encoder performing luma down-sampling (upper branch) without using the chroma component(s) and chroma up-sampling (lower branch) without using the luma component to determine a cost based on a rate distortion optimization (RDO) and its signaling in the bitstream.

FIG. 17. Illustrates an encoder side by an example of a YUV420 color format, in which case the chroma input U, V has a lower resolution than the lima component Y. As shown in FIG. 15, on the encoding side, the YUV input is subject to a size-equalizing processing. This includes on the one hand down-sampling 1710 of the luma component as shown in the upper branch of FIG. 17. The output in this example is the three YUV components having the same size. Here, the same size refers to the sizes (dimensions) of the chroma components U and V. On the other hand, the chroma components are up-sampled 1720 via a size-equalizing processing performed in the lower branch of FIG. 17. Again, the output is the three YUV components having the same size. Now, the same size refers to the luma component. After encoding the size equalized YUV of the upper and lower branch, for example, by a VAE, a cost in terms of a cost function is determined. This may, for example, be based on a rate-distortion-optimization (RDO) 1730. Which of the sampling modes (i.e. chroma up-sampling or luma down-sampling) is to be ultimately used depends on whether the processing of the upper branch or the lower branch provides the lower cost. In the example of FIG. 17, the lowest-cost sampling mode is indicated by a flag (indicator), encoded into the bitstream or signaled separately to the decoder. The various means of how to select the sampling mode based on the cost is discussed in detail below.

In the RDO, a weighted sum of rate and distortion is optimized. However, the present disclosure is not limited to cost minimization based on rate and disclosure. E.g., in addition or alternatively to rate and/or distortion, complexity may be considered in the cost function. Other cost parameters may be added or used instead of those mentioned above.

In one implementation of the method, the up-sampling and/or the down-sampling is performed by a trained network.

As already mentioned in embodiment 1, the trained network of the encoding side may be any kind of network suitable for down-sampling or up-sampling. This includes, for example, artificial neural networks (ANN) such as neural networks, convolutional neural networks (CNN) or the like. The trained network used for the luma down-sampling and/or chroma up-sampling may be also referred to as a size-equalizing network, since both networks provide as output a resized color (luma, chroma) components having a resolution matched with the resolution of the chroma channel (i.e. luma down-sampling 1710) or with the luma channel (i.e. chroma up-sampling 1720). In other words, after the processing by the size-equalizing network, the outputted Y, U, and V channels have the same resolution (i.e. size).

FIG. 19 and FIG. 20 show an implementation example for a size-equalizing network on the encoder side for the case of YUV420 color format. FIG. 19 shows a size-equalizing network performing luma down-sampling (upper branch), and FIG. 20 shows a size-equalizing network performing up-sampling of the two chroma U and V. In this example, the respective layers belong to a convolutional neural network (CNN).

The convolutional network layers shown in FIGS. 19 and 20 are defined in a similar manner as in embodiment 1 (e.g. FIGS. 5-8). In summary:

Conv N×K×K: denotes a convolutional network layer, having a convolution kernel of K×K, with K being a positive integer. A typical number of K is 3 or 5. However, K is not limited to these numbers, and may be set to another positive integer. In particular, 2 or larger values of K are possible. N is a positive integer and denotes the number of output channels of the convolutional neural network.

Act.: refers to an activation layer, which may be a non-linear activation function, for example, ReLU or GDN discussed before.

Conv N×K×K/2↑: denotes the same as Conv N×K×K, but the layer further up-samples (up-converts) the output by a factor of 2 both horizontally and vertically. This is indicated by the "2" and the up-arrow.

Conv. 2×K×K/2↓: denotes the same as Conv N×K×K, but further down-samples (down-converts) the output by a factor of 2 both horizontally and vertically. This is indicated by the "2" and the down-arrow.

Conv. N×K×K, Act. denotes a convolutional layer plus activation layer.

As shown in FIGS. 19 and 20, the color format is YUV420 for the picture portion to be encoded. This means that the luma size is w×h and the chroma size is w/2×h/2. However, as is clear to those skilled in the art, other formats (types of chroma subsampling) such as YUV422 or the like are feasible.

Luma Processing—The size-equalizing network for the luma processing in FIG. 19 comprises a first layer Conv. N×K×K/2↓ with a K×K kernel and N channels as output. This layer down-samples the luma component by a factor of 2, both horizontally and vertically. This is followed by a sequence of activation layers Act. and convolutional layers Conv. N×K×K, Act. with activation. The size equalizing network is terminated by a last layer which is a convolutional layer Conv. 1×K×K, and hence has as output one channel, i.e. the down-sampled luma component Y. The luma component is now resized having the same size (resolution) as the chroma components U and V. This processing is performed in the upper branch of FIG. 17 (1710).

Chroma Processing—The size-equalizing network for the chroma component processing in FIG. 20 comprises a first layer Conv N×K×K/2↑ with a K×K kernel and N channels as output. This layer up-samples the two chroma components U and V by a factor of 2, both horizontally and vertically. This is followed by a sequence of activation layers Act. and convolutional layers Conv. N×K×K, Act. with activation. The size equalizing network is terminated by a last layer which is a convolutional layer Conv. 2×K×K, and hence has as output two channels, i.e. the up-sampled chroma components U and V. The chroma components U and V are now resized having the same size (resolution) as the luma component Y. This processing is performed in the lower branch of FIG. 17 (1720). It is noted that in this case the luma component is preserved, with all the advantages as discussed in the FIRST EMBODIMENT.

As evident from FIGS. 19 and 20, in either case the output of the respective convolutional layer Conv. N×K×K/2↓ and Conv N×K×K/2↑ has N channels and are further processed with an activation layer (i.e. non-linear activation function for example ReLU or GDN). The resized luma and chroma (s) may also be referred to as intermediate luma and intermediate chroma(s), respectively. The respective equal-sized output luma-chroma(s) are then used as input to their respective VAEs of the upper and lower branch. The VAEs of the upper and lower branch deliver as a result coded bitstream which may then be reconstructed to obtain quality (loss). The quality (inverse proportional to distortion) and the rate (e.g. measured by the amount of bits in the bitstream) may then be used in the RDO 1730 to select the appropriate processing with which the VAE following the RDO may be performed.

The size-equalizing processing described above is not limited to YUV420 color format, but may be applied to other sub-sampled chroma formats, such as YUV422 or the like.

In the FIRST EMBODIMENT it was described that the chroma up-sampling on the encoder side may utilize the luma component as side information. This may be combined with the above processing of the chroma component(s) of the SECOND EMBODIMENT. Moreover, the same procedure may be applied also for the down-sampling of the luma on the encoder side in that chroma is used as a side information.

Figure 23:
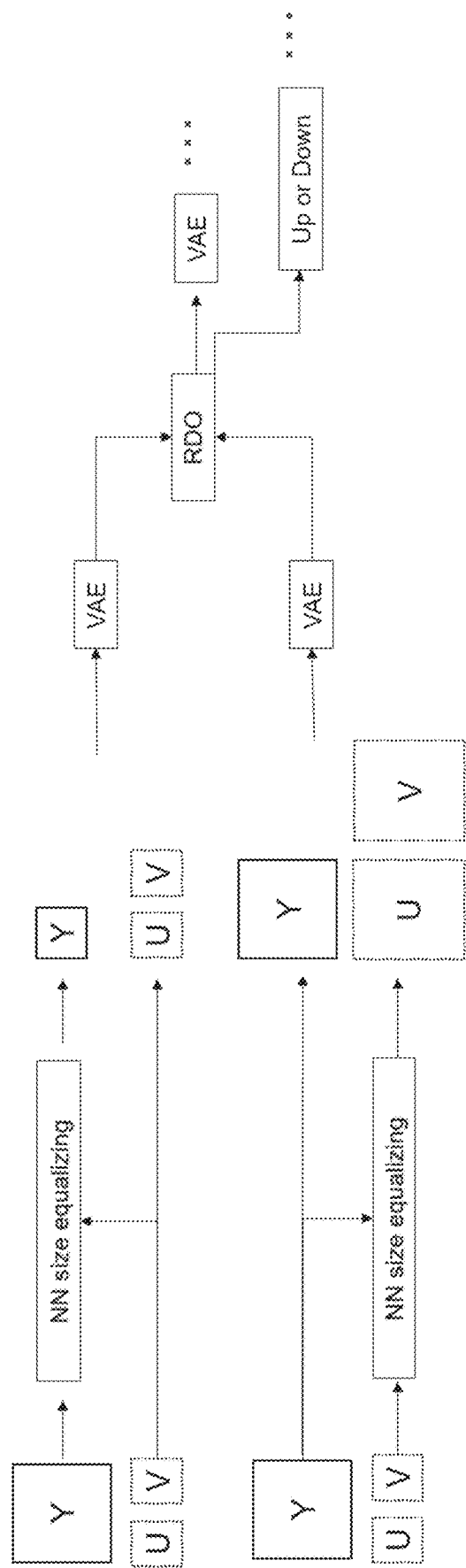
FIG. 23 shows a schematic drawing of an encoder performing luma down-sampling (upper branch) using the chroma component(s), and chroma up-sampling (lower branch) using the luma component to determine a cost based on a rate distortion optimization (RDO) and its signaling in the bitstream.

FIG. 23 illustrates this further for the encoder side, showing a similar encoder structure as in FIG. 17 and for the exemplary case where the selection of the picture processing of the picture portion may be signaled by a flag (indicator) encoded into the encoded bitstream. As FIG. 23 shows, the difference to the schematic of FIG. 17 consists in that the luma down-sampling (upper branch) exploits information on the chroma components U and V. Likewise, the chroma(s) up-sampling (lower branch) exploits information on the luma Y. Otherwise, the respective sampling processing of the luma and, respectively of the chroma(s) is performed in the same manner as discussed above with reference to FIG. 17.

Thus, irrespective of whether luma down-sampling and/or chroma up-sampling is performed, in either case cross-information is used for the respective sampling. This means that the correlation between the luma and chroma(s) is preserved.

Figures 25, 26:
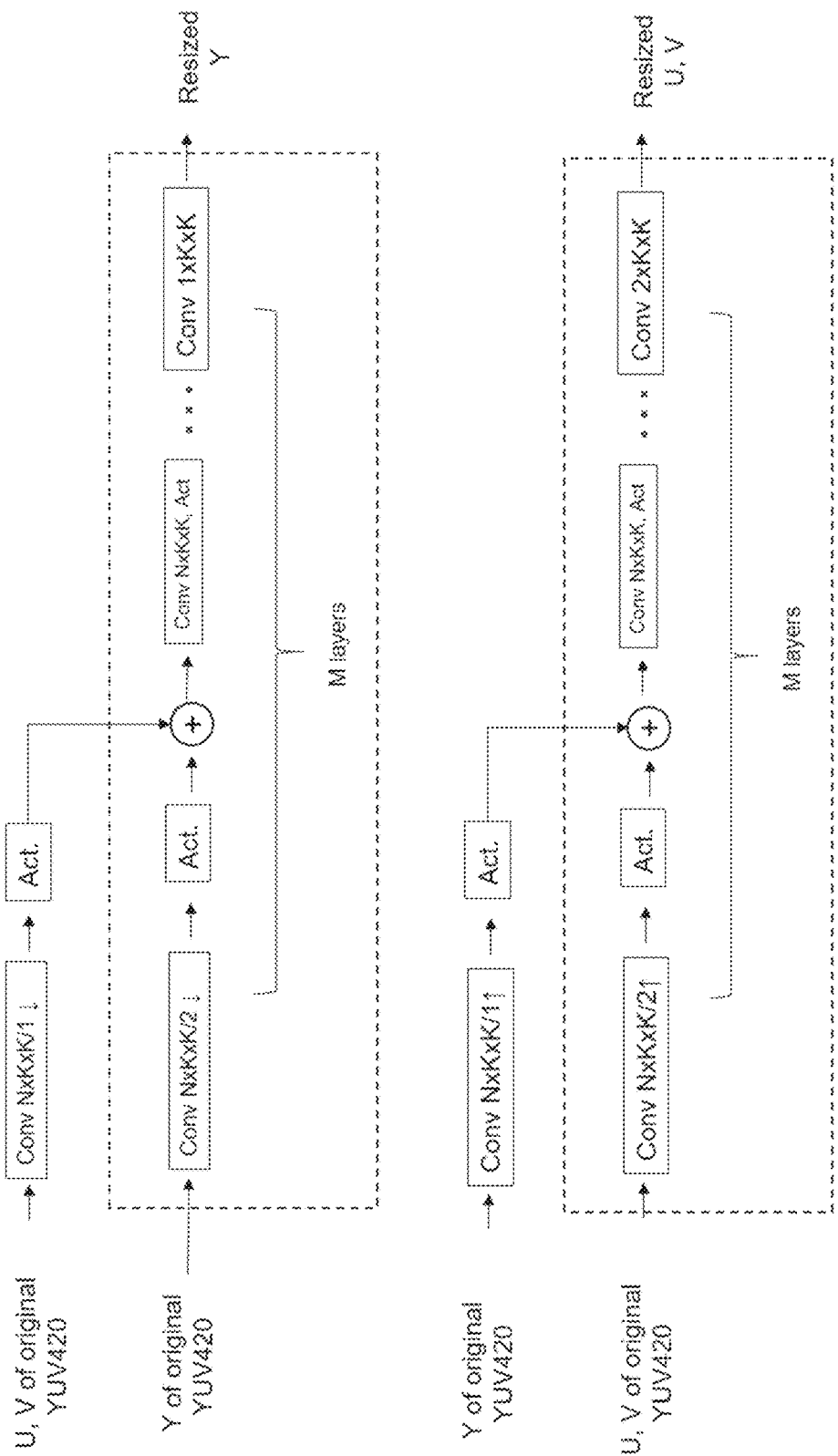
FIG. 25 shows a schematic drawing of a size-equalizing network for the luma down-sampling on the encoder side of the VAE architecture, using chroma component(s) as side information.
FIG. 26 shows a schematic drawing of a size-equalizing network for the chroma up-sampling on the encoder side of the VAE architecture, using the luma component as side information.

FIG. 25 and FIG. 26 show example implementations of the size-equalizing networks for the luma-down-sampling and the chroma up-sampling on the encoder side, respectively. As shown in FIGS. 25 and 26, the respective size-equalizing networks have the same design in terms of their sequence of how the convolutional layers and activation layers is arranged as the one shown in FIG. 19 and FIG. 20. The difference lies in that an additional layer is added so as to provide the chroma(s) in FIG. 25 or the luma in FIG. 26 to the respective size-equalizing networks. In case of FIG. 25, said added layer is a convolutional layer Conv N×K×K/1↑ for the chroma components, with a K×K kernel and N channels as output, which is input to an activation layer Act. In case of FIG. 26, said added layer is a convolutional layer Conv. N×K×K/1↓ for the luma, with a K×K kernel and N channels as output, which is input to an activation layer Act. In the examples shown in FIG. 25 and FIG. 26, the respective output signal is added to the output of the activation layer Act. of the size-equalizing network after the first convolutional layer Conv. N×K×K/2↓ and Conv N×K×K/2↑, respectively.

For example, the respective addition may be element-wise adding the chroma component(s) and the down-sampled luma component, and, respectively element-wise adding the luma component and the up-sampled chroma component(s). Thus, the chroma up-sampling using luma as side information as well as the luma down-sampling using the chroma as side information may be performed efficiently. Still, details which may be present in the luma originally having higher resolution, can be restored within the originally sub-sampled chroma. Similarly, details which may be present in the chroma originally having a lower resolution, can be restored within the original luma.

The joint (combined) processing of the luma and chroma component (in both luma down-sampling and/or chroma up-sampling processing) may not be limited to the adding operation. Alternatively, the chroma and the luma may be concatenated. This typically results in the concatenated luma-chroma compound having a larger size than each of the luma and chroma components. Other kind of combination operations may be used instead and/or combined with the adding or concatenating. Thereby, information of the luma and chroma is exploited for the chroma up-sampling and/or luma down-sampling by the respective size-equalizing networks.

As mentioned before, which one of the picture processing is performed on the encoding side may be determined in various ways. This is discussed next.

In one exemplary implementation of the method, the selecting includes evaluation of a cost function of rate and distortion. According to an implementation of the (encoding) method, the selecting further includes determining, according to said cost function, a cost for the intermediate down-sampled luma component and the chroma component, and respectively for the luma component and the intermediate up-sampled chroma-component. Moreover, in the selecting, the picture processing of the picture portion is selected, for which the determined cost is lower. Thus, the overall encoding of a luma component and a sub-sampled chroma component is performed efficiently by using a sampling mode (i.e. luma down-sampling or chroma up-sampling) for which the cost is lowest.

For example, the cost may be a loss specified in terms of a distortion between a reconstructed picture portion and the original picture portion and the bitrate. In this case, the loss may be express as:

Loss=Rate+$\lambda$ Distortion or

Loss=$\lambda$ Rate+Distortion.

Herein, $\lambda$ denotes a Lagrange multiplier, which is a number that may be pre-defined. The number may be determined empirically based on the desired application and/or result. As mentioned above, alternative or additional parameters of the cost function may be employed. Moreover, it is noted that the present disclosure does not necessarily include RDO. For example, the selection may be performed by a trained network (e.g. an ANN) trained for such selection beforehand. Various other approaches may also be possible.

The selecting may further include down-sampling the luma component, thereby obtaining an intermediate down-sampled luma component; and up-sampling the chroma component, thereby obtaining an intermediate up-sampled chroma component. In FIG. 17, after the RDO 1730, a VAE is applied to the color components matching in size after either the luma down-sampling or chroma up-sampling. However, this does not have to be the case. Rather, the bitstream generated by the VAE of the selected either upper (1710) or lower (1720) branch may be taken instead of employing the VAE again. In other words, the coded portion may be reused, thus saving some complexity.

FIG. 17 shows three VAEs. Applying the VAE three times may be complex and time consuming. Thus, in order to reduce complexity, in some exemplary implementations, the VAEs in the upper and lower branches are not complete networks. Rather, they may be replaced by models which do not really generate the bitstream, but rather estimate the rate and distortion. After it is estimated/selected which branch is better, a real VAE is employed after the RDO 1730 to generate the bitstream that will be sent (conveyed) to the decoder. It may be advantageous if the estimation of rate and distortion by the model VAE in the branches is faster than the VAE following the RDO. At the encoder side, both cases are possible (two vs three VAEs).

In one of the exemplary implementations, the determining of the costs includes encoding the intermediate down-sampled luma component and the chroma component into a first bit stream; and encoding the luma component and the intermediate up-sampled chroma component into a second bitstream. This is followed by determining the cost for the first bitstream and the second bitstream according to said cost function. Thus, the actual cost may be determined accurately as it is based on the encoded first and second bitstream. However, as mentioned above, the present disclosure is not limited to such an approach. Rather, instead of performing the encoding into the bitstream, the cost may be estimated by an estimation function. Moreover, the encoding in order to obtain rate does not have to be performed by actually generating the bitstream. For example, the cost may be estimated in terms of the number of quantized data and/or their distribution or by applying a trained network trained for such estimation, or by any conceivable manner.

According to an implementation example, the generating of the bitstream for carrying the encoded picture or video data includes encoding into the bitstream a selection indicator indicating the selected picture processing. This provides a low-complexity signaling of the picture processing that has been performed for the bitstream. For example, the selection indicator may have a length of one bit and may be capable of distinguish between two values, one representing luma down-sampling and the other one representing chroma up-sampling.

This is illustrated in FIG. 17. As discussed before, for a picture portion having a luma component and a sub-sampled chroma component, a sampling processing of luma down-sampling (upper branch) and a chroma up-sampling (lower branch) is performed. In either case, equal-sized luma-chroma components are provided and, for example, input to the VAE of the upper and lower branch, respectively. Both VAEs calculate for their respective luma-chroma input a cost, which may be based on the bitrate and distortion (RDO). Depending on which cost is lower, the respective picture processing is selected. Based on the selected picture processing, a bitstream is generated, but without encoding an indicator into the bitstream. The selection of said picture processing (i.e. luma down-sampling or chroma up-sampling at the encoder side) may be indicated by a selection indicator. Said indicator may, for example, be a flag. By inserting (may include encoding) the flag into the bitstream, the selected picture processing that has been performed on the encoding side may be signaled to the decoder in the bitstream. The decoder then parses the indicator from the bitstream and determines which picture processing to perform based on the indicator. In particular, such selection indicator can take a first value and a second value. The first value of such selection indicator may indicate that the luma has been down-sampled (1710) at the encoder and is thus to be up-sampled at the decoder. The second value of such selection indicator may indicate that the chroma has been up-sampled (1720) at the encoder and is thus to be down-sampled at the decoder. In FIG. 17, functional block "up or down" 1740 represents insertion of the selection indicator into the bitstream.

Alternatively, the selected picture processing may be indicated without an explicit indicator (e.g., a one bit flag) encoded into the bitstream.

According to another implementation example, the generating of the bitstream includes encoding into the bitstream an indication of a width W and/or a height H of the luma component. Thus, the width and height of the original picture portion may be signaled to the encoder. Such indication may specify the resolution of the luma component. If the ratio between the resolution of the luma and the chroma component is known, the chroma resolution may be determined accordingly, based on the signaled W and H. This signaling may be part of the picture or video coding. Typically, bitstream of an encoded picture or video includes indication of the dimensions of the picture or video.

Figure 29:
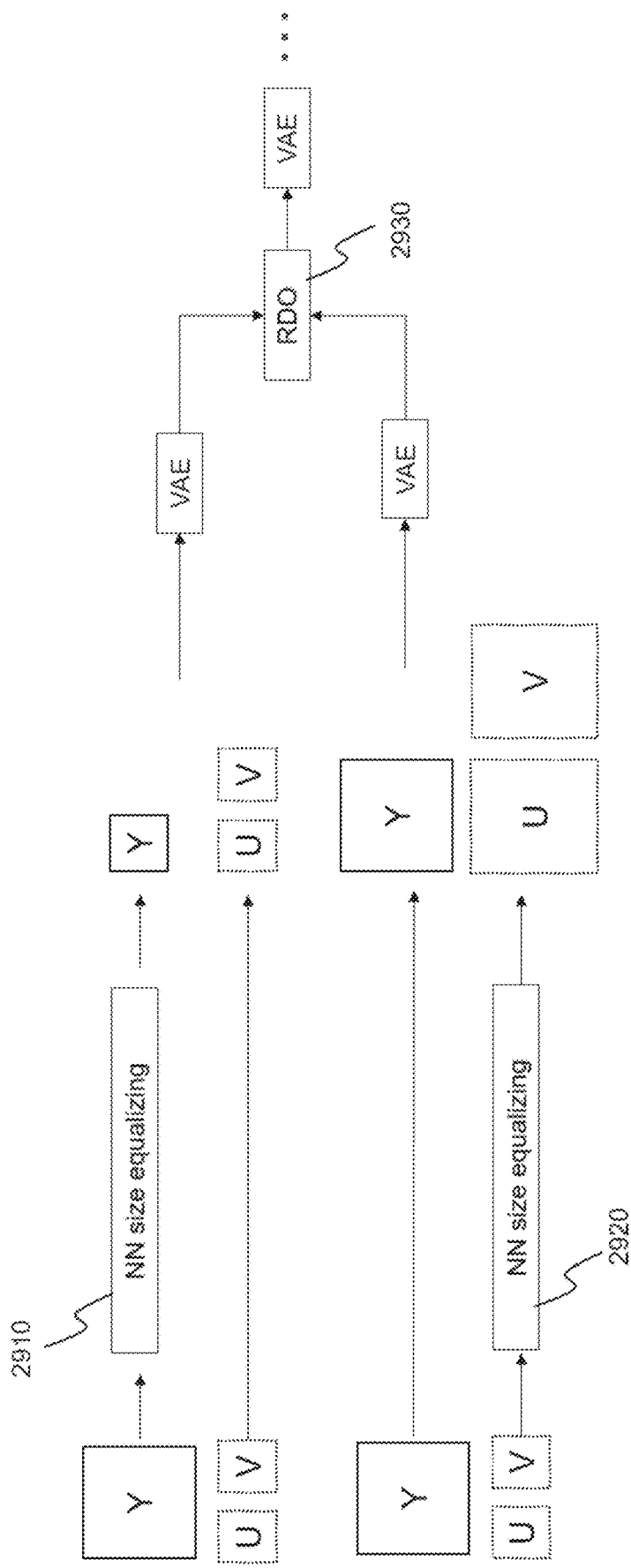
FIG. 29 shows a schematic of an encoder performing luma down-sampling (upper branch) without using the chroma component(s) and chroma up-sampling (lower branch) without using the luma component to determine a cost based on a rate distortion optimization (RDO), without signaling an indicator in the bitstream.

An exemplary implementation is illustrated in FIG. 29. Similarly to the example illustrated in FIG. 17, for a picture portion having a luma component and a chroma component with a lower resolution than the luma component (thus "sub-sampled" with regard to the luma component), a sampling processing of luma down-sampling (upper branch) 2910 and a chroma up-sampling (lower branch) 2920 is performed. The equal-sized luma-chroma components of the upper and lower branch are input to the VAE, respectively. Both VAEs calculate for their respective luma-chroma input a cost, which may be based on the bitrate and distortion (RDO) 2930. Depending on which cost is lower, the respective picture processing is selected. Based on the selected picture processing, a bitstream is generated. In this exemplary implementation, other than in FIG. 17 but without encoding a selection indicator (e.g. flag) into the bitstream. The decoder may then determine which picture processing to perform based on the bitstream, for example, on the width and height of the luma encoded into the bitstream. Alternatively or in addition, further parameters signaled in the bitstream, e.g. for coding purposes may be used to derive, at the decoder, which processing (luma up-sampling or chroma down-sampling) is to be applied. Such parameters may be predefined and known at the encoder and the decoder, so that the encoder and the decoder use them consistently for the selection of the processing.

According to an embodiment of the present disclosure, a method is provided for reconstructing a picture portion from a bitstream. Such method may be applied at the decoder side. As described above with reference to embodiment 1, the picture portion includes a luma component and a chroma component having a resolution lower than a resolution of the luma component. The picture portion refers to a number of samples of an image and/or picture with said number being smaller than the total number of the samples of said image/picture. The picture portion may also include all samples of the image or picture. The picture may be a still picture or video (sequence of pictures). The picture portion may include one or more chroma components. For example, a picture portion in luma-chroma format YUV420 includes two chroma components U and V (also referred to as chroma channels). The chroma resolution may be lower than the resolution of the luma channel (in the picture portion or in the entire picture). The luma and chroma components of the picture part are typically spatially correlated as they refer to the same picture area.

The method is illustrated in FIG. 32 and comprises a step S3210 for decoding a luma component and a chroma component having the same resolution from the bitstream. As mentioned above, the resolution may be given by the size (i.e. dimension) of the two-dimensional (2D) luma channel. The decoding of the processed picture portion from the bitstream may be performed by an autoencoder such as the variational autoencoder, VAE. VAEs are known in the field for performing tasks related to image or picture encoding and decoding in a very efficient manner, with a good compromise between needed bitrate and quality of the reconstructed picture. However, the present disclosure is not limited to the application of autoencoders. In general, any encoder may be applied, including, for instance, encoders which use trained networks (e.g. ANN or any ML/DL based networks) only for some of the decoder operations or functions.

The method further includes a step S3220 for determining based on the bitstream, as a picture processing, one of
- up-sampling the decoded luma component and obtaining a reconstructed picture portion including said decoded chroma component and the up-sampled luma component; and
- down-sampling the decoded chroma component and obtaining a reconstructed picture portion including said decoded luma component and the down-sampled chroma component.

The determination may be performed by parsing from the bitstream a selection indicator for indicating the processing to be applied. However, as mentioned above, the selection indication does not have to be explicitly signaled in some embodiments. Rather, it may be derived from other parameters in the bitstream, relating to the encoded picture or video data.

Moreover, the method includes a step S3230 for obtaining said picture portion according to the determined picture processing. Thus, the picture portion encoded in the bitstream may be processed by the decoder part of the same type of trained network such as the VAE shown in FIG. 2, since the encoded luma and chroma components have the same size. Moreover, the picture processing determining of one of luma up-sampling and chroma down-sampling provides in either case resized luma or chroma components such that they have different size corresponding to the components input for the encoding (original picture components). This means that the picture portion is reconstructed to its original color format, with the chroma having a lower resolution than the chroma. Thus, irrespective of the determined picture processing, the encoded equal-sized luma-chroma channels may be handled within a common VAE framework. Further, the determining of the picture processing allows to adaptively switch between luma up-sampling and chroma down-sampling. This ensures that in any case the picture portion with its original color format is reconstructed. Hence, the adaptive switching enables a selection of a low-resolution or high-resolution picture processing, e.g. based on some optimization criteria, such as RDO or the like.

Figure 18:
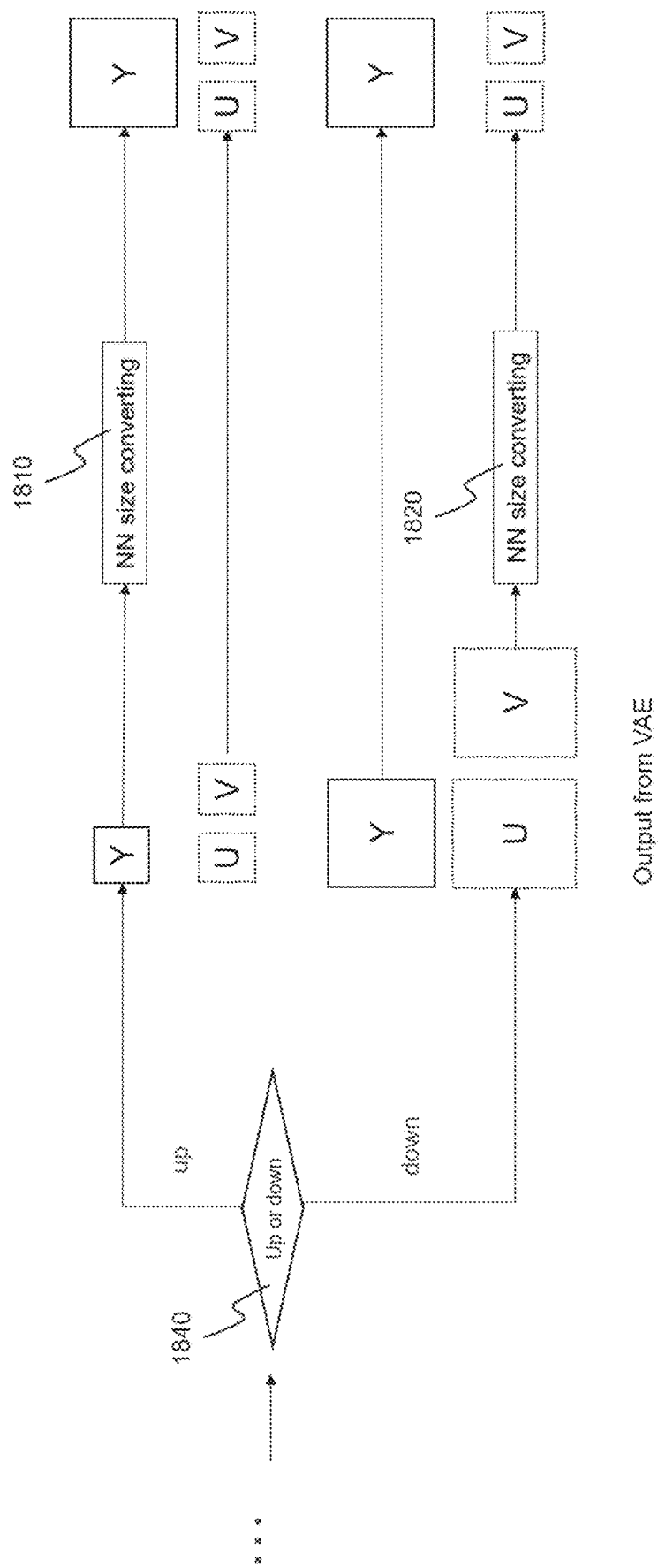
FIG. 18 shows a schematic of a decoder performing either luma up-sampling (upper branch) without using the chroma component(s), or chroma down-sampling (lower branch) without using the luma component depending on an indicator parsed from the encoded bitstream.

FIG. 18 illustrates the decoder side and its operation. Referring to the example of FIG. 17 where the sampling mode is indicated by a flag (indicator) encoded into the bitstream, the flag is parsed from the bitstream at the decoder side. Depending on the value of the flag (i.e. whether it indicates down-conversion (luma) or up-conversion (chroma) at the encoder side) in the functional block 1840, either the luma is up-converted 1810 or the chroma is down-converted 1820 in the respective upper and lower branch. This means that, depending on the indication by the flag, the luma-chroma components of the input bitstream have either the size of the chroma(s) or the size of the luma of the originally coded picture. In both cases, the respective up and/or down-sampling processing may be performed by a size conversion processing and provides as output the reconstructed frame in its original format. However, as shown in FIG. 18, the upper branch 1810 performs luma up-sampling and the lower branch chroma component (U and/or V) down-sampling 1820. The respective size conversion may be performed by corresponding size converting networks. As in case of FIG. 17, the indication of the sampling mode by an encoded flag is an example allowing the decoder to determine which sampling mode to perform for the reconstruction of the original picture portion. The various means of how to determine on the decoder side which sampling mode to perform may be performed by other ways as discussed below. Moreover, it is noted that in these examples, the resized color components (channels) match the size of the originally coded picture. However, this is not limiting for the present disclosure. For some applications, it may be beneficial to provide color components with dimensions differing from the dimensions of the originally coded picture.

In an implementation example, the up-sampling and/or the down-sampling is performed by a trained network. The trained network of the encoding side may be any kind of network suitable for down or up-sampling. This includes, for example, artificial neural networks (ANN) such as neural networks, convolutional neural networks (CNN) or the like. The trained network at the decoder may be any re-sizing network which adapts the size of the channels input to it according to the desired resolution. The result may be the channels having mutually different dimensions (size) such as dimensions of the originally encoded picture or other desired dimensions.

Figure 21:
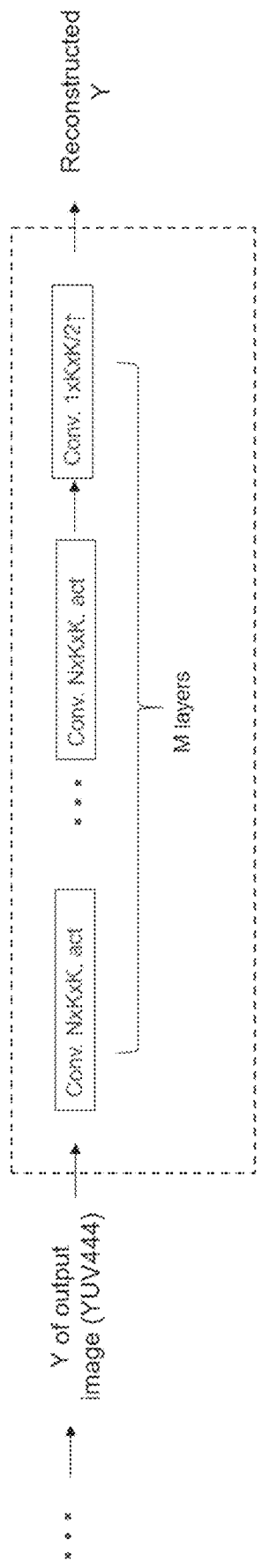
FIG. 21 shows a schematic drawing of the size-converting network for the (intermediate) luma up-sampling on the decoder side of the VAE architecture, without using the chroma component(s) as side information.
Figure 22:
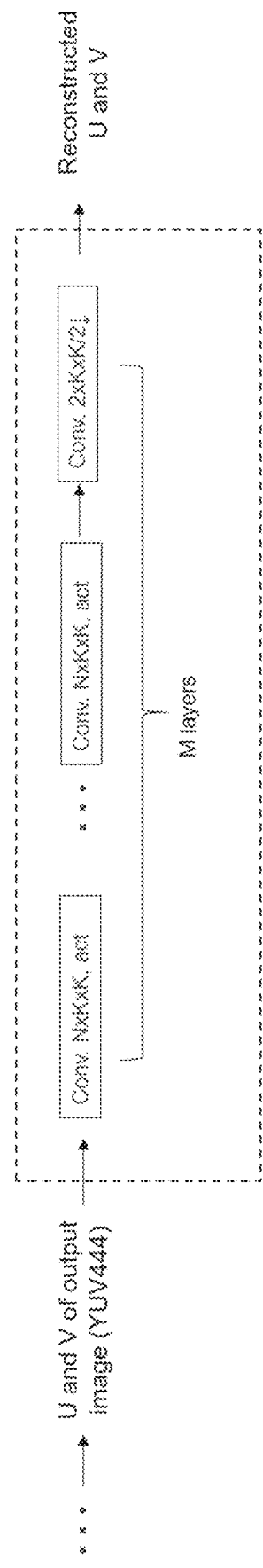
FIG. 22 shows a schematic drawing of the size-converting network for the (intermediate) chroma(s) down-sampling on the decoder side of the VAE architecture, without using the luma component as side information.

FIG. 21 and FIG. 22 show an implementation example for a size-converting network on the decoder side for the case of YUV444 color format, with the luma and chroma components U and V having the same size. FIG. 21 shows a size-converting network performing luma up-sampling (upper branch corresponding to 1810). FIG. 22 (corresponding to 1820) shows a size-converting network performing down-sampling of the two chroma U and V. In this example, the respective layers can be seen as layers of a convolutional neural network.

With reference to FIG. 5, the convolutional network layers shown in FIGS. 21 and 22 are defined in a similar manner. Accordingly, the same terminology and/or notation applies here as well. As shown in FIGS. 21 and 22, the input color format is YUV444 for the picture portion to be decoded from the bitstream. This means that the luma and chroma components decoded from the bitstream have the same size (i.e. resolution).

Luma Processing (upper branch 1810 in FIG. 18, and in FIG. 21): The size-converting network for the luma processing consists of a sequence of convolutional layer plus activation layer pairs, Conv. N×K×K, Act. The size converting network is terminated by a last layer being a convolutional layer Conv 1×K×K/2↑, which up-samples the luma component by a factor of two, both horizontally and vertically. The output is one channel, i.e. the reconstructed luma component having the same size as the original luma.

Chroma Processing (lower branch 1820 in FIG. 18, and in FIG. 22): The size-converting network for the chroma components processing similarly consists of a sequence of convolutional layers plus activation layer, Conv. N×K×K. Act. The size converting network is terminated by a last layer being a convolutional layer Conv. 2×K×K/2↓, which down-samples the two chroma components by a factor of two, both horizontally and vertically. The output are two channels, i.e. the reconstructed two chroma components having the same size as their original chroma components. It is noted that in this case the luma component may be preserved, with all the advantages as discussed in the FIRST EMBODIMENT.

Since the input luma-chroma components to the size-converting network(s) on the decoding side have the same resolution (i.e. size), they may be efficiently processed within an existing same framework such as ANN architecture with the same input size. Thus, a picture portion with any color format having sub-sampled chroma(s) may be reconstructed using the same network architecture as applied to luma. Thus also enables preserving the cross-component correlation information in the processing of different components (channels).

In the FIRST EMBODIMENT it was described that the chroma down-sampling at the decoder side may utilize the luma component as side information. This may be combined with the above processing of the chroma component(s) of the SECOND EMBODIMENT. Moreover, the same procedure may be applied also for the up-sampling of the luma on the decoder side in that chroma is used as a side information.

Figure 24:
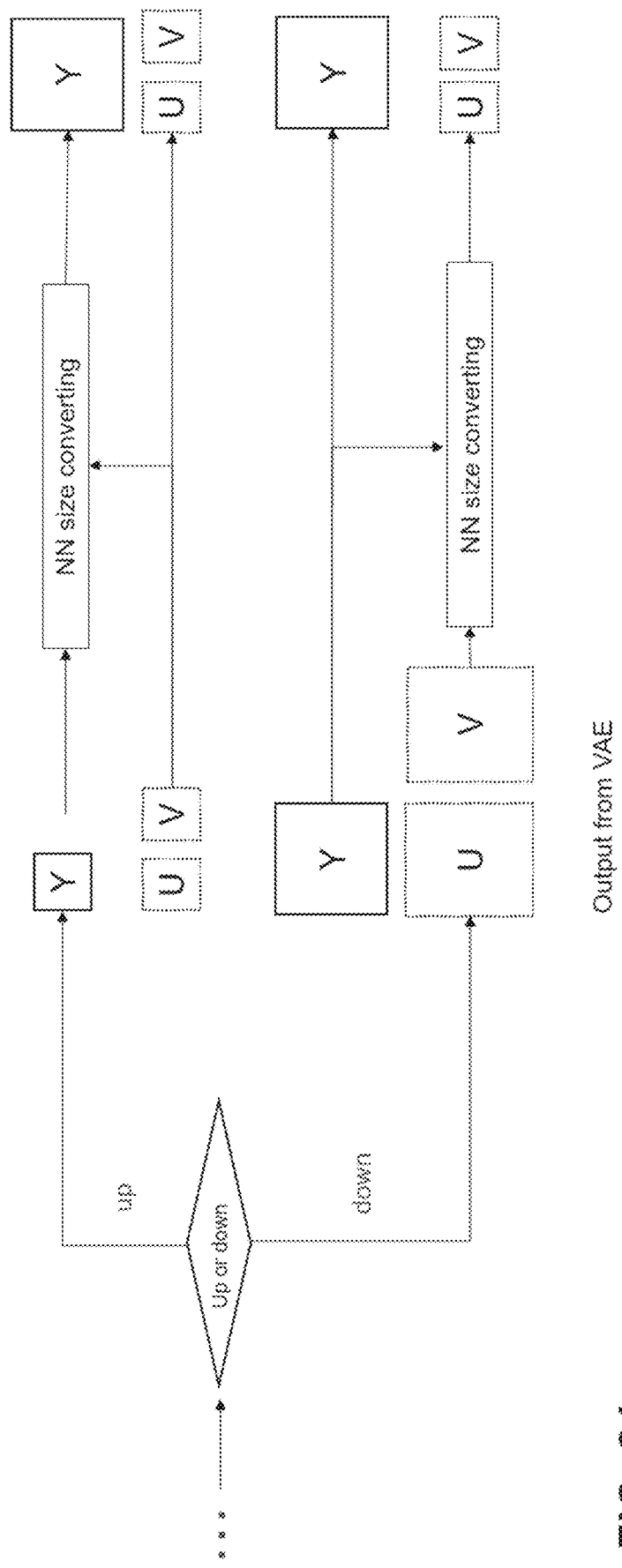
FIG. 24 shows a schematic drawing of a decoder performing either luma up-sampling (upper branch) using the chroma component(s), or chroma down-sampling (lower branch) using the luma component depending on an indicator parsed from the encoded bitstream.

FIG. 24 illustrates this further for the decoder side, showing a similar decoder structure as in FIG. 18 and for the exemplary case where the selection of the picture processing of the picture portion may be signaled by a flag (indicator) encoded into the encoded bitstream. As FIG. 24 shows, the difference to the schematic of FIG. 18 consists in that the luma up-sampling (upper branch) exploits information on the chroma components U and V. Likewise, the chroma(s) down-sampling (lower branch) exploits information on the luma Y. Otherwise, the respective sampling processing of the luma and, respectively of the chroma(s) is performed in the same manner as discussed above with reference to FIG. 18.

Thus, irrespective of whether a luma up-sampling and/or chroma down-sampling is performed, in either case cross-information is used for the respective sampling. This means that the correlation between the luma and chroma(s) may be exploited to reconstruct the channels. The same may be applied to channels of other color spaces or generally to any channels not limited to color channels, such as depth or motion or other additional information related to picture.

Figure 27:
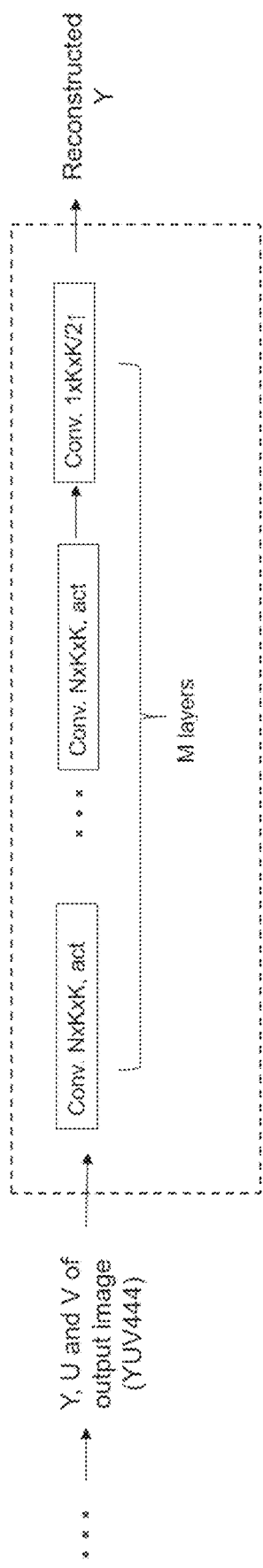
FIG. 27 shows a schematic drawing of the size-converting network for the (intermediate) luma up-sampling on the decoder side of the VAE architecture, using the chroma component(s) as side information input to the network.
Figure 28:
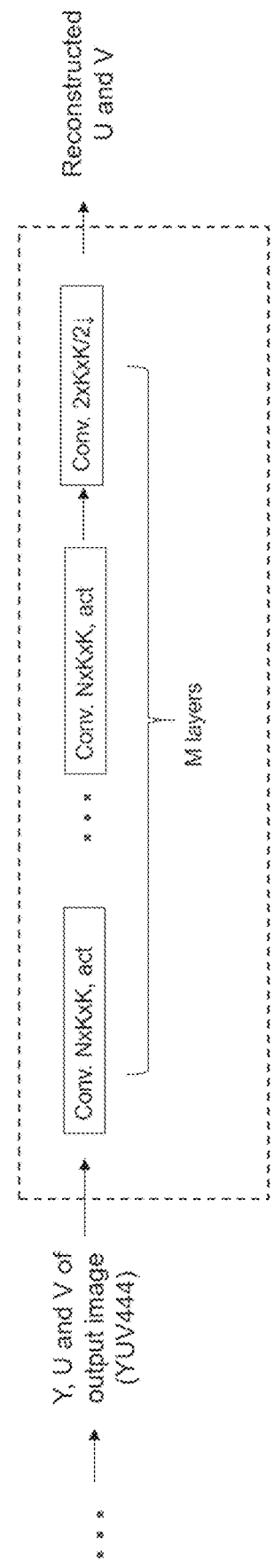
FIG. 28 shows a schematic drawing of the size-converting network for the (intermediate) chroma(s) down-sampling on the decoder side of the VAE architecture, using the luma component as side information input to the network.

FIG. 27 and FIG. 28 show example implementations of the size-converting networks for the luma up-sampling and the chroma down-sampling on the decoder side, respectively. As shown in FIGS. 27 and 28, the size-converting networks have the same design in terms of their sequence of how the convolutional layers and activation layers are arranged as the one shown in FIG. 21 and FIG. 22. The difference lies, for the case of FIG. 27 in that the chroma components U and V are directly input to the first convolutional layer Conv. N×K×K, Act., together with the down-sampled luma. Similarly, for the case of FIG. 28, the luma is directly input to the first convolutional layer, Conv. N×K×K, Act., together with the up-sampled chroma components U and V. This means that, for the decoder side, the first processing layer of the size-converting network may not need to perform an adding operation as opposed to the encoder side, where such kind of operation may be performed as shown in FIG. 25 and FIG. 26. The combination (joining or joint processing) in the size-equalizing network at the encoder served for exploiting the cross-component correlation. Reversing such processing is not necessary at the decoder side, because the input to the first layer of the size-converting network of the decoder, including the luma and chroma components, already have the same size obtained at the encoder as illustrated in FIG. 24.

As mentioned before, which one of the picture processing is performed on the decoding side may be determined in various ways. This is discussed next.

In one exemplary implementation, the determining of the processing to be applied further includes decoding from the bitstream a selection indicator indicating a picture processing; and determining as said picture processing the processing indicated by the selection indicator. This allows for an efficient signaling of the picture processing. Accordingly, the decoding side may determine quickly which picture processing has been used on the encoder side (i.e. luma down-sampling or chroma up-sampling) based on a simple indicator included in the bitstream. The selection indicator has been described above with reference to encoder side. As mentioned, it can be an indicator which can take at least a first value indicating up-sampling of luma (at the decoder side, this corresponds to the down-sampling of luma at the encoder side) and a second value indicating down-sampling of chroma(s) (at the decoder side, corresponding to up-sampling the chroma(s) at the encoder side). It is noted that the selection indicator may generally take one of more than two values. For example, it may take a third value indicating that no resizing is to be performed and/or a fourth value indicating that more than one components are to be resized, or even further specifying how (by which ration or to which desired resolution) the resizing should take place. This applies to both encoder side and decoder side, since the encoder and the decoder should have the same understanding (interpretation or semantics) of the selection indicator. On the other hand, providing a one-bit flag (indicator) which can take only one of two values (the first value and the second value) may be efficient, as it does not introduce high additional signaling overhead.

The decoder side operation is illustrated in FIG. 18. As discussed beforehand, the decoder receives a bitstream having a luma and a chroma component of the same size. This is a result of the picture processing on the encoder side. In case of where a selection indicator (flag e.g., RDO) is encoded in the bitstream, the decoder parses the bitstream and determines which one of the picture processing to perform based on the selection indicator. The decoder then performs up-sampling the luma component if the flag indicates that the luma has been subject to down-sampling on the encoder side. In turn, the decoder performs down-sampling of the chroma components if the flag indicates that the chroma components have been subject to up-sampling on the encoder side. In either case, the picture portion in its original size is reconstructed.

The determining in some embodiments may (in addition to other exemplary implementation or alternatively thereto) include decoding from the bitstream a width W and/or a height H of the luma component of the picture portion. This allows determining the picture processing based on the width and height of the luma channel of the picture portion. In other words, the channel carrying important information of the picture portion is used as a reference for said determining.

Moreover, according to an exemplary implementation, the determining may further include determining whether the width W and the height H are same as a respective width $\hat{W}$ and height $\hat{H}$ of the decoded luma component. If, as a result of the determining, W and H are same as $\hat{W}$ and $\hat{H}$, the decoded chroma component is down-sampled. Therein "same" means that W and H and respectively $\hat{W}$ and $\hat{H}$ have the same dimensions, e.g. number of samples in the width direction (i.e. along x horizontally) and the height direction (i.e. along y vertically). In other words, each of W and H match their respective counterparts $\hat{W}$ and $\hat{H}$. In this exemplary case, the chroma has been up-sampled at the encoding side (high resolution result). However, as mentioned above, the matching may be also achieved by down-sampling the luma at the encoder. The decoder then performed the reverse operation, e.g. up-samples the luma or down-samples the chroma to obtain the original resolution of the picture before encoding. By deriving the processing to be applied from the width and height it is possible to save rate by not including an explicit selection indicator. The width and height of the picture or picture portion is typically already signaled within the set of parameters for configuring the encoding/decoding of the picture or picture portion.

It is noted that this picture processing of the picture portion on the encoding side and decoding side, i.e. chroma up-sampling (encoder) and chroma down-sampling (decoder), correspond to the processing of the FIRST EMBODIMENT as far as the sampling processing (up/down) is concerned.

In the above example, if the W and H of the original picture did not match respectively $\hat{W}$ and $\hat{H}$ of the picture decoded from the bitstream, chroma was down-sampled as it was assumed that the encoder up-sampled the chroma. This may be a default functionality.

However, the present disclosure is not limited thereto. The default functionality may include instead the up-sampling of luma at the decoder side, assuming that the encoder down-sampled the luma.

Accordingly, if, as the result of the determining, any of W and H are not same as $\hat{W}$ and/or $\hat{H}$, the decoded luma component is up-sampled. Therein "not the same" means that W and/or H and respectively $\hat{W}$ and/or $\hat{H}$ do not have the same number of samples in the width direction (i.e. along x horizontally) and/or the height direction (i.e. along y vertically). In other words, any of W and H does not match their respective counterpart $\hat{W}$ and/or $\hat{H}$. In this case, the luma has been down-sampled at the encoding side (low resolution result).

Thus, the picture processing may be easily determined on the encoding side by a simple comparison of the W and H of the luma with the respective width $\hat{W}$ and height $\hat{H}$ of the decoded luma. The information on the (decoded) chroma may not be used. This reduces overhead in the determining of the picture processing.

It is noted that the above mentioned down-sampling of chroma or up-sampling of luma may be both applicable at the decoder. For example, the decoder and the encoder may have a rule according to which it is decided, which of the two processing types is used. The rule may be a decision based on some conditions depending on some syntax elements (encoding parameters) such as the width and the height and/or a quality parameter or other parameters.

In another exemplary implementation, the determining of the processing to be applied includes determining a size S of the bitstream. The size S may be in any units such as bits, bytes, words etc. The determining includes further decoding, from the bitstream, a latent representation $\hat{y}$ of the picture portion, with the latent representation having a width $w_{\hat{y}}$ and/or height $h_{\hat{y}}$. Further, the picture processing is determined based on comparing a function of the size of the bitstream and the width $w_{\hat{y}}$ and height $h_{\hat{y}}$ with a pre-defined threshold T. This allows determining of the picture processing based on the latent representation $\hat{y}$. The latent representation may be based on a feature map. Thus, the picture processing determining is more accurate as it utilizes the latent representation along with a feature map. According to an implementation example, the determining includes determining whether a ratio of the size S and $w_{\hat{y}}*h_{\hat{y}}$ is equal to or larger than the pre-defined threshold ("*" here refers to multiplication). If, as a result of the determining, the ratio is equal to or larger than the pre-defined threshold, the decoded chroma component is down-sampled. In this case, the chroma has been up-sampled at the encoding side (high resolution result). It is noted that this picture processing of the picture portion on the encoding side and the decoding side, i.e. chroma up-sampling (encoder) and chroma down-sampling (decoder), may correspond to the processing of the FIRST EMBODIMENT as far as the sampling processing (up/down) is concerned.

If, as the result of the determining of the processing to be applied, the ratio is smaller than the pre-defined threshold, in an exemplary implementation, the decoded luma component is up-sampled. In this case, the luma has been down-sampled at the encoding side (low resolution result).

Thus, the picture processing may be easily determined on the encoding side by simply thresholding the ratio of the bitstream size and the size $w_{\hat{y}}*h_{\hat{y}}$ of the latent space. This makes the picture processing determining more efficient and fast since only the bitsteam and the latent space are used. This reduces further the overhead in the determining of the picture processing.

Figure 30:
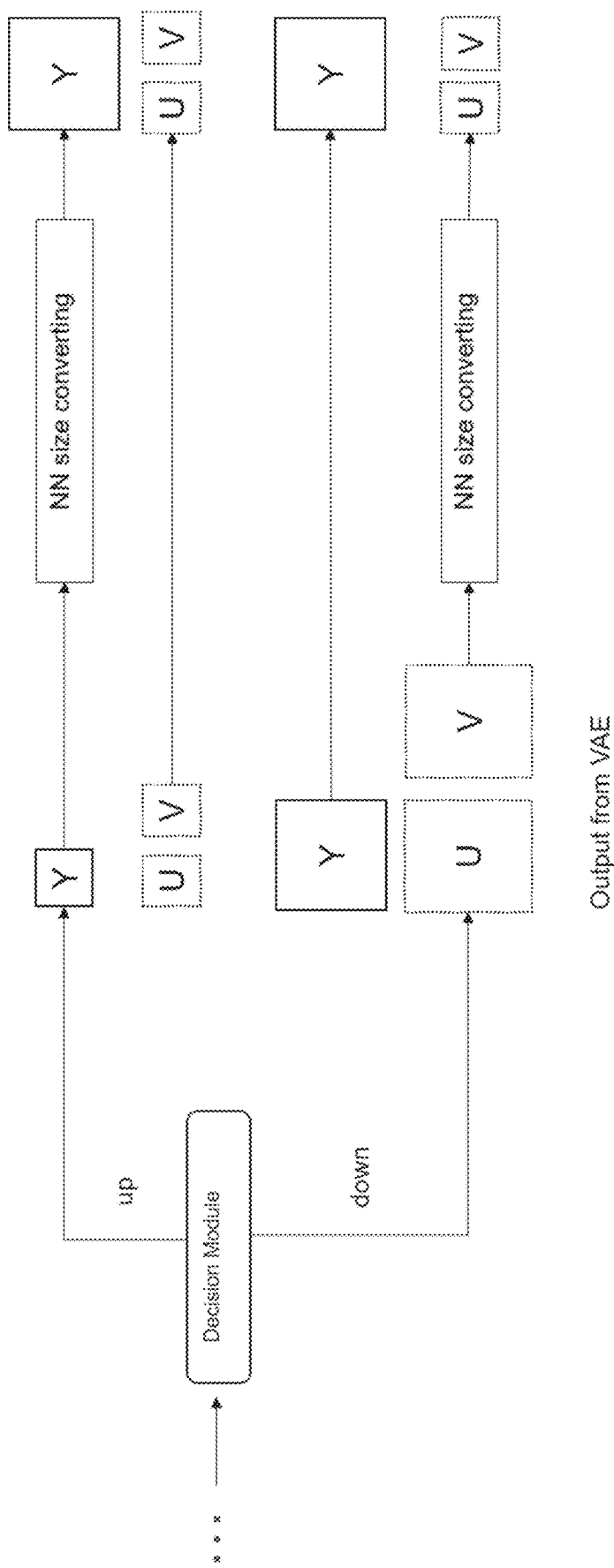
FIG. 30 shows a schematic of a decoder performing either luma up-sampling (upper branch) without using the chroma component(s), or chroma down-sampling (lower branch) without using the luma component, depending on a result of a decision module on a sampling mode.

This is illustrated in FIG. 30. In this case, the decoder determines from the bitstream which picture processing to perform. Said determining may, for example, be performed by a decision module, which analyzes the bitstream. For example, when the width W and height H of the luma component of the picture portion is encoded into the bitstream, the decoder parses W and H from the bitstream. Further, the luma and chroma components are decoded from the bitstream. Thus, the width $\hat{W}$ and height $\hat{H}$ of the decoded luma component are known or may be determined on the decoder side. This may be, for example, also performed by the decision module. Said module then compares (e.g. sample wise) W and H with the respective width $\hat{W}$ and height $\hat{H}$ of the decoded luma component. If $W=\hat{W}$ and $H=\hat{H}$, the decoded chroma component is down-sampled. Otherwise, if any of these equalities is not true, the decoded luma component is up-sampled.

Alternatively or in addition, the determining module may determine the picture processing based on the size S of the bitstream and the latent space representation $\hat{y}$. The decision module may then compare the size S with the width $w_{\hat{y}}$ and/height $h_{\hat{y}}$ using a comparing function in conjunction with a predefined threshold. For example, the comparing function may consist in taking a ratio $R=S/w_{\hat{y}}*h_{\hat{y}}$, and determining whether R is equal to or larger than the pre-defined threshold.

If yes, i.e. $R>=T$, the decoded chroma component is down-sampled. In this case, the chroma has been up-sampled at the encoding side (high resolution result). If not (i.e. R>T), the decoded luma component is up-sampled. In this case, the luma has been down-sampled at the encoding side (low resolution result). According to an implementation example, the determining includes decoding a latent representation $\hat{y}$ from the bitstream. Moreover, the picture processing is determined as an output of a classifying neural network which is fed with the decoded latent representation. The output is one of a first class and a second class, with the first class indicating up-sampling of the decoded luma component and the second class indicating down-sampling of the decoded chroma component. This allows performing the picture processing determining in a flexible manner by use a neural network, employing classification. Moreover, it may be combined with classification of features for said determining, and hence allows to determine the picture processing more accurately. Moreover, the up-sampling or down-sampling at the decoder side may be performed without parsing any side information from the bitstream, which reduces the bitrate costs.

Such a neural-network-based determining may be also performed by the decision module, win which case said module decides upon the picture processing based on a classification result. The classification may be performed, for example, by a residual neural network (ResNet) using as input the reconstructed latent space y. The sampling processing, i.e. the chroma up-sampling on the encoder side and the chroma down-sampling on the decoder side may be performed in a similar manner as already discussed in the FIRST EMBODIMENT. This is repeated for completeness.

For example, the chroma up-sampling (encoding side) may include inserting, after each n-th line of samples of the chroma component, a line of samples. Therein, a line refers to a row and/or column, and n is an integer equal to or greater than 1. This means that, for example, after each one (n=1) or two (n=2) rows and/or columns said line sample may be inserted. This allows a further adaptation of the chroma up-sampling by inserting line samples at specific rows and/or columns. A similar processing may be applied to luma at the decoder side.

Alternatively, the chroma up-sampling (encoding side) may include inserting, after each n-th line of samples of the chroma component, a line of samples with value zero. This may be referred to as zero-filling. This is a simple manner of performing the up-sampling by merely setting the respective line samples to zero. Hence, no further signaling and/or processing overhead is needed. A similar processing may be applied to luma at the decoder side.

This is exemplified in FIG. 9, showing 4×4 samples of the up-sampled chroma. The solid bullets refer to samples of the original chroma. The open circles refer to samples having a zero value. In this example, the zero-valued samples are inserted after each of the first row and column of the chroma component. Further, in this example, the size-equalizing network are simplified to a one-layer network (M=1) with no further layers after the "addition" operation of FIG. 5. In FIG. 9 (encoder side), the up-sampling of U and V is simplified as filling zeros in the each row and column for the case of YUV420 color format. In case of YUV422 format, the filling of zeros is for each column). In this case, the network is not a convolutional neural network, but can be understood as a one layer of a fully-connected neural network (FCNN). This network itself is therefore not trainable However, it can be trained jointly with the VAE structure for better coding performance. Thus, the respective FCNN may refer also to a trained network.

In another implementation, the chroma up-sampling may be performed by inserting, after each n-th line of samples of the chroma component, a line of samples with a value equal to their respective nearest neighbor sample in the chroma component. The inserting of the value may, for example, be performed by copying the chroma value to the respective neighbor samples. As in case of the zero-filling mentioned above, this allows a further adaptation of the chroma up-sampling by inserting line samples at specific rows and/or columns. Further, using values for the inserted line samples with reference to the nearest neighbor sample of the chroma, the accuracy of the chroma up-sampling Is more accurate since neighboring information (as reflected by the neighbor chroma sample value) with reference to the original chroma is employed.

This is exemplified in FIG. 11, showing 4×4 samples of the up-sampled chroma. Again, the solid bullets refer to samples of the original chroma. The open circles refer now to samples having a value in accordance with their respective chroma neighbor sample. In FIG. 11, the inserting of the chroma value to its respective neighbor samples is indicated by arrows. In this example, the sample values are inserted after each of the first row and column of the chroma component. Further, in this example, the size-equalizing network are simplified to a one-layer network (M=1) with no further layers after the "addition" operation of FIG. 5. In FIG. 11 (encoder side), the up-sampling of U and V is simplified as nearest-neighbor sample up-sampling in each row and column as shown for the YUV420 format in FIG. 11. In case of YUV422 format, the nearest-neighbor sample up-sampling is for each column. In the above examples for the chroma up-sampling, the network is not a convolutional neural network, but can be understood as a one-layer of a fully-connected network. This network itself is therefore not trainable, but it can be trained jointly with the VAE structure for better coding performance. Thus, the respective FCNN may refer also to a trained network.

However, this is a mere example of a trained network for size-equalizing having one layer. It is clear for those skilled in the art that the size-equalizing layer may have more than one layer, as shown throughout FIGS. 5 and 7. In this case, the size-equalizing network may be trained to perform the chroma up-sampling.

A likewise picture processing of up-sampling the luma on the decoding side may be performed, at least in terms of filling each n-th line by some additional samples. However, it may be advantageous to perform luma up-sampling by using an interpolation filter, i.e. determining value of the added luma samples as a function of neighboring samples, e.g. as an average or a weighted average, or the like. It may be advantageous to perform the luma up-sampling by using a trained (pre-trained) network such as ML/CL based network or the like.

For example, the chroma down-sampling (decoder side) may be performed by removing, after each n-th line of samples of the intermediate chroma component, a line of samples. Therein, a line is a row and/or column and n is an integer equal to or greater than 1. This means that, for example, after each one (n=1) or two (n=2) rows and/or columns said line (row and/or column) may be removed (deleted). Thus, the down-sampling of the intermediate chroma may be performed quickly by simply removing the respective line samples.

Examples of the line sample removal are shown in FIG. 10 and FIG. 12. Note that the sample configurations of FIGS. 10 and 12 correspond to the sample configurations of FIGS. 9 and 11, respectively, as a result of the up-sampling processing of the chroma component at the encoder side. Specifically, FIGS. 10 and 12, show 4×4 samples of the intermediate chroma. The solid bullets refer to samples of the original chroma. The crossed-open circles refer to samples which may be non-zero values as a result of the chroma up-sampling processing (with and without the use of luma as side information) by the size-equalizing network on the encoding side and/or the chroma processing through the first layer(s) of the size-converting network on the decoding side.

In the examples shown in FIGS. 10 and 12, the size-converting network is simplified as a one-layer network (M=1). In FIGS. 10 and 12 (decoder side), the down-sampling of U and V is simplified so as to discard the odd row and the odd column samples in case of YUV420 color format. For YUV422, the odd column samples are removed. In either of these cases shown in FIGS. 10 and 12, the respective network is not a convolutional neural network, but can be understood as one layer of a fully-connected neural network (FCNN). This network itself is therefore not trainable n this example. However, it can be trained jointly with the VAE structure for better coding performance. Thus, the respective FCNN may refer also to a trained network.

However, this is a mere example of a trained network for size-converting having one layer. It is clear for those skilled in the art that the size-converting layer may have more than one layer, as shown throughout FIGS. 6 and 8. In this case, the size-converting network may be trained to perform the chroma up-sampling.

Note that the size-equalizing network at the encoder side shown in FIG. 5, and the size-converting network at the decoder side shown in FIG. 6 may be jointly trained with the VAE structure. This may further improve the encoding-decoding processing of sub-sampled chroma components in particular within a VAE framework. This includes, for example, the encoding-decoding performance and/or the quality of the reconstructed picture/image.

Alternatively, they may be trained separately and used as a pre-trained VAE network. In either case, the respective networks refer to trained networks or pre-trained networks. A likewise picture processing of down-sampling the luma on the encoding side may be performed. In general, the training may be performed beforehand, i.e. before the network is used in the inference phase for encoding, up-sampling, decoding or the like.

Moreover, as already mentioned, the present disclosure also provides devices which are configured to perform the steps of the methods described above.

Figures 33, 34:
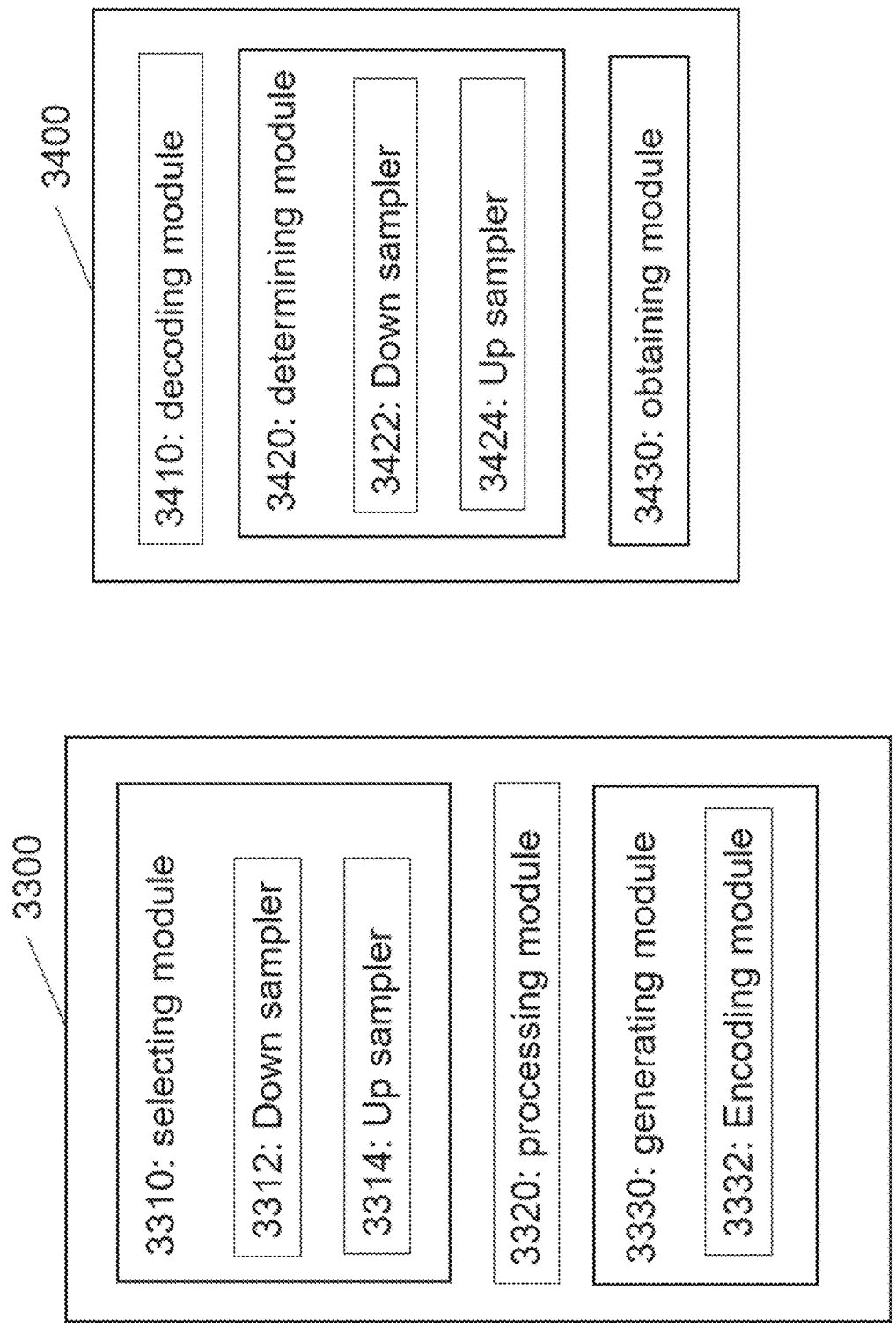
FIG. 33 shows a block diagram of an encoder, including a selecting module, a processing module, and a generating module. The selecting module may further include a down-sampler (luma) and an up-sampler (chroma).
FIG. 34 shows a block diagram of a decoder, including a decoding module, a determining module, and an obtaining module. The determining module may further include a down-sampler (chroma) and an up-sampler (luma).

FIG. 33 shows an encoder 3300 for encoding a picture portion. The picture portion includes a luma component and a chroma component with a resolution lower than a resolution of the luma component. The encoder comprises a selecting module 3310 configured to select as a picture processing of the picture portion one of down-sampling the luma component so as to obtain a down-sampled luma component matching the resolution of the chroma component; and up-sampling the chroma component so as to obtain an up-sampled chroma component matching the resolution of the luma component. Moreover, the encoder comprises a processing module 3320 configured to process the picture portion according to the selected picture processing. The encoder further comprises a generating module 3330 configured to generate a bitstream according to the selected picture processing, wherein the generating includes encoding the processed picture portion.

In one implementation example, the encoder may comprise one or more processors; and a non-transitory computer-readable storage medium coupled to the one or more processors and storing programming for execution by the one or more processors, wherein the programming, when executed by the one or more processors, configures the encoder to carry out the method referred to above.

FIG. 34 shows a decoder 3400 for reconstructing a picture portion from a bitstream. The picture portion includes a luma component and a chroma component having a resolution lower than a resolution of the luma component. The decoder comprises a decoding module 3410 configured to decode a luma component and a chroma component having the same resolution from the bitstream. Moreover, the decoder comprises a determining module 3420 configured to determine from the bitstream, as a picture processing, one of: up-sampling the decoded luma component and obtaining a reconstructed picture portion including said decoded chroma component and the up-sampled luma component, and down-sampling the decoded chroma component and obtaining a reconstructed picture portion including said decoded luma component and the down-sampled chroma component. The decoder further comprises an obtaining module 3430 configured to obtain said picture portion according to the determined picture processing.

In one implementation example, the decoder may comprise one or more processors; and a non-transitory computer-readable storage medium coupled to the one or more processors and storing programming for execution by the one or more processors, wherein the programming, when executed by the one or more processors, configures the decoder to carry out the method referred to above.

According to an embodiment of the present disclosure, a computer program stored on a non-transitory medium comprising code which when executed on one or more processors performed steps of any of the methods referred to above.

Some of the embodiments of the present disclosure may provide advantages which may be summarized as follows:

- The luma sample information is fully preserved.
- The luma spatial information is fully preserved.
- The size-equalizing CNN and size-converting CNN can be jointly trained with the VAE network structure. The joint training may further improve the results. Alternatively, the size-equalizing CNN and size-converting CNN may also be trained separately from VAE.
- Other kind of chroma sub-sampled formats (for example YUV422) may be handled by VAE network structure.
- The cross-component luma-chroma information may be preserved.
- Adaptive switching between luma down-sampling for small resolutions to save bitrate and chroma up-sampling for large resolution to preserve luma information.

Some Exemplary Implementations in Hardware and Software

Figure 35:
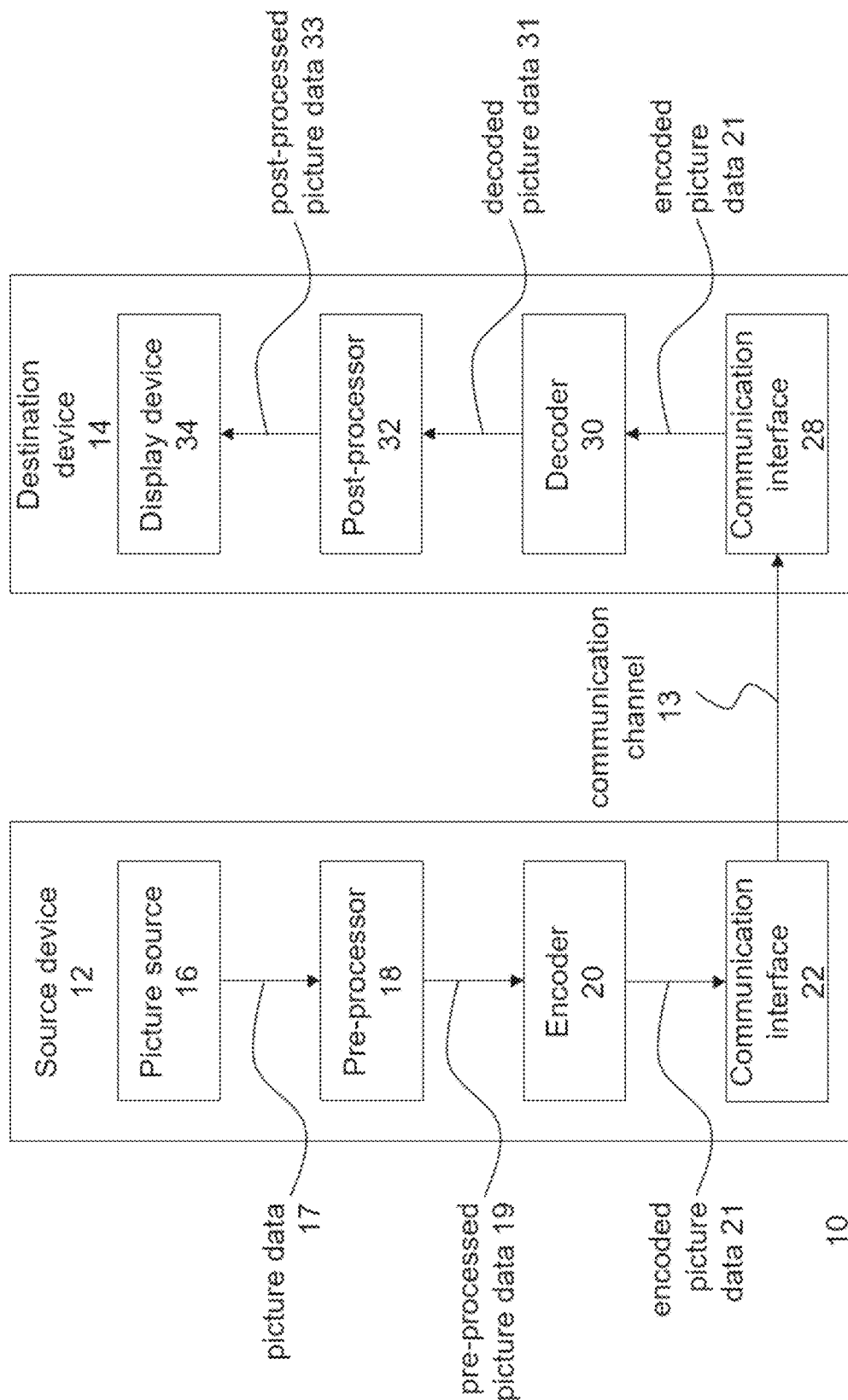
FIG. 35 is a block diagram showing an example of a video coding system configured to implement embodiments of the invention.

The corresponding system which may deploy the above-mentioned encoder-decoder processing chain is illustrated in FIG. 35. FIG. 35 is a schematic block diagram illustrating an example coding system, e.g. a video, image, audio, and/or other coding system (or short coding system) that may utilize techniques of this present application. Video encoder 20 (or short encoder 20) and video decoder 30 (or short decoder 30) of video coding system 10 represent examples of devices that may be configured to perform techniques in accordance with various examples described in the present application. For example, the video coding and decoding may employ neural network such as the one shown in FIGS. 2A to 2C which may be distributed and which may include the above-mentioned bitstream encoded preceded by chroma up-sampling (embodiment 1) or evaluating whether to up-sample chroma or down-sample luma (embodiment 2).

As shown in FIG. 35, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22. It is noted that embodiments 1 and 2 of the present disclosure as well as their exemplary implementations discussed above relating to encoding may be performed as a part of the encoder 20. However, alternatively it is conceivable to perform these embodiments are performed by the pre-processor 18. Similarly, at the decoder side, embodiments 1 and 2 of the present disclosure as well as their exemplary implementations discussed above relating to decoding may be performed as a part of the decoder 30. However, alternatively it is conceivable to perform these embodiments are performed by the post-processor 32.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component. It is noted that the pre-processing may also employ a neural network (such as in any of FIGS. 1 to 7). As mentioned above, the pre-processing may include processing by the neural network (trained network) to up-sample chroma (embodiment 1 and/or embodiments 2) or to down-sample luma (embodiment 2).

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 35 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission. The decoder 30 is configured to receive the encoded picture data 21 and provide decoded picture data 31 or a decoded picture 31 (e.g., employing a neural network based on one or more of FIGS. 1 to 7).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 35 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 35 may vary depending on the actual device and application.

Figure 36:
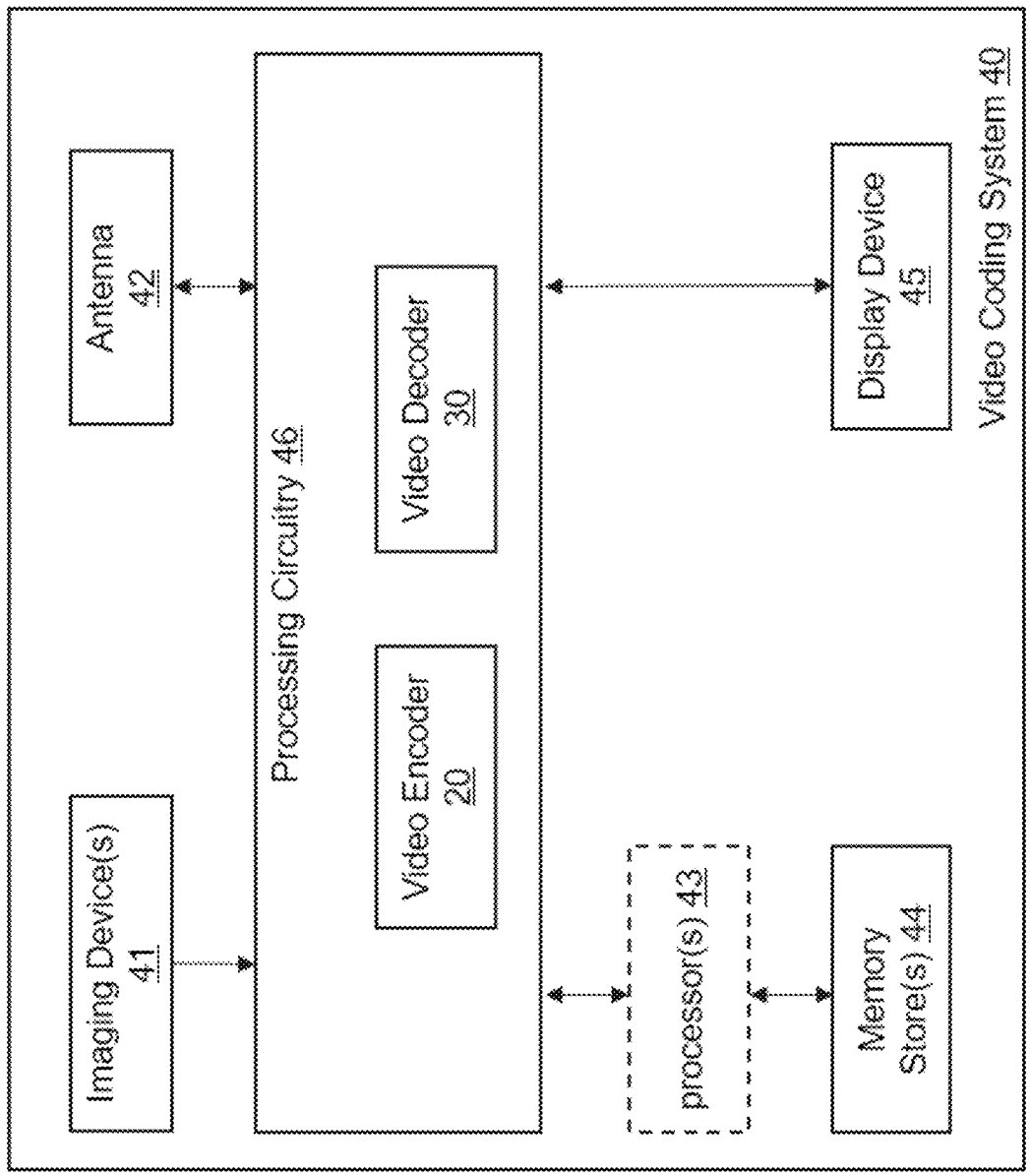
FIG. 36 is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules including the neural network such as the one shown in any of FIGS. 2A to 2C or its parts. The decoder 30 may be implemented via processing circuitry 46 to embody the various modules as discussed with respect to FIGS. 2A to 2C and/or any other decoder system or subsystem described herein. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 36.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 35 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 37:
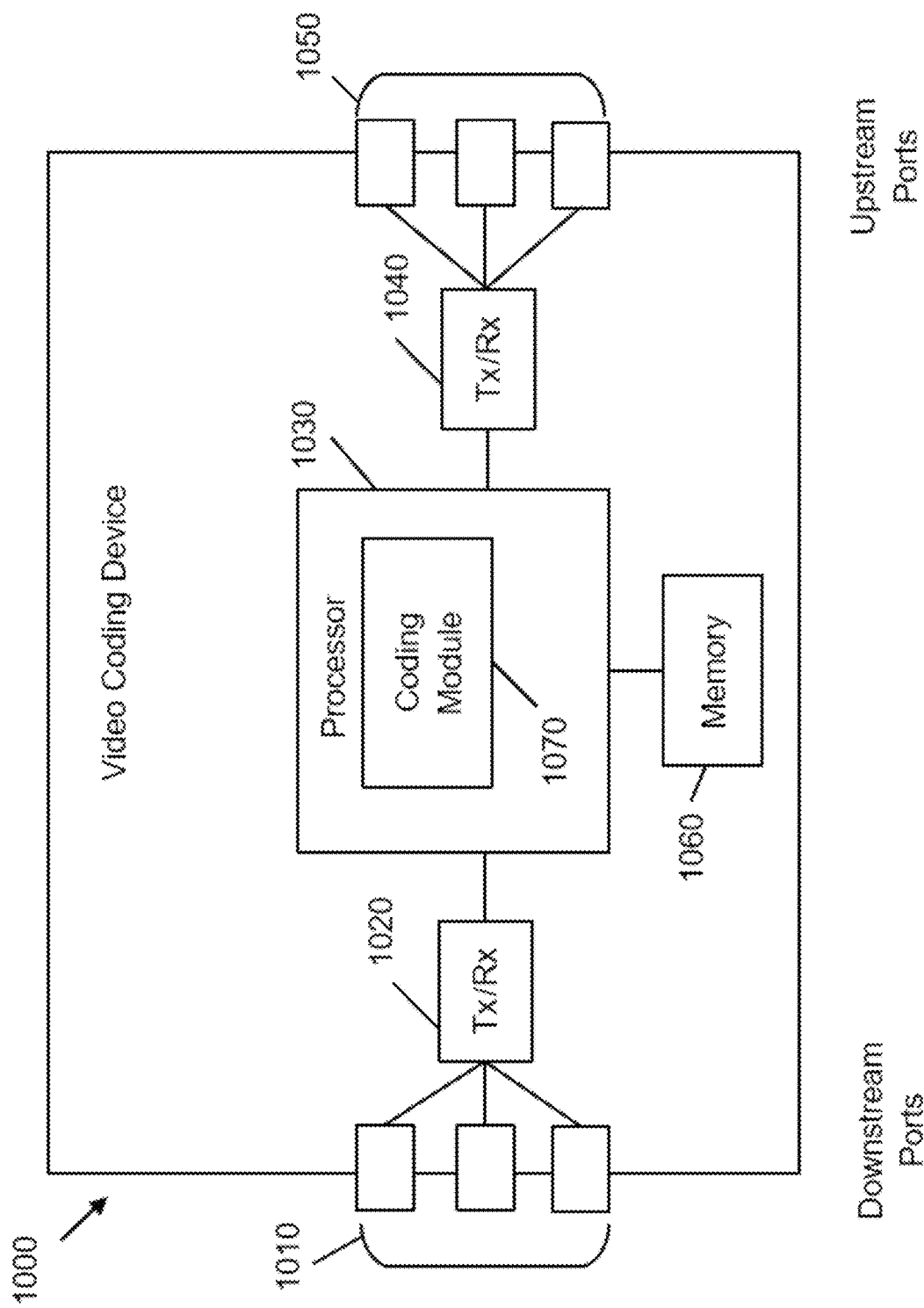
FIG. 37 is a block diagram illustrating an example of an encoding apparatus or a decoding apparatus.

FIG. 37 is a schematic diagram of a video coding device 1000 according to an embodiment of the disclosure. The video coding device 1000 is suitable for implementing the disclosed embodiments as described herein. In an embodiment, the video coding device 1000 may be a decoder such as video decoder 30 of FIG. 35 or an encoder such as video encoder 20 of FIG. 35.

The video coding device 1000 comprises ingress ports 1010 (or input ports 1010) and receiver units (Rx) 1020 for receiving data; a processor, logic unit, or central processing unit (CPU) 1030 to process the data; transmitter units (Tx) 1040 and egress ports 1050 (or output ports 1050) for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), FPGAs, ASICs, and DSPs. The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various coding operations. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The memory 1060 may comprise one or more disks, tape drives, and solid-state drives and may be used as an overflow data storage device, to store programs when such programs are selected for execution, and to store instructions and data that are read during program execution. The memory 1060 may be, for example, volatile and/or non-volatile and may be a read-only memory (ROM), random access memory (RAM), ternary content-addressable memory (TCAM), and/or static random-access memory (SRAM).

Figure 38:
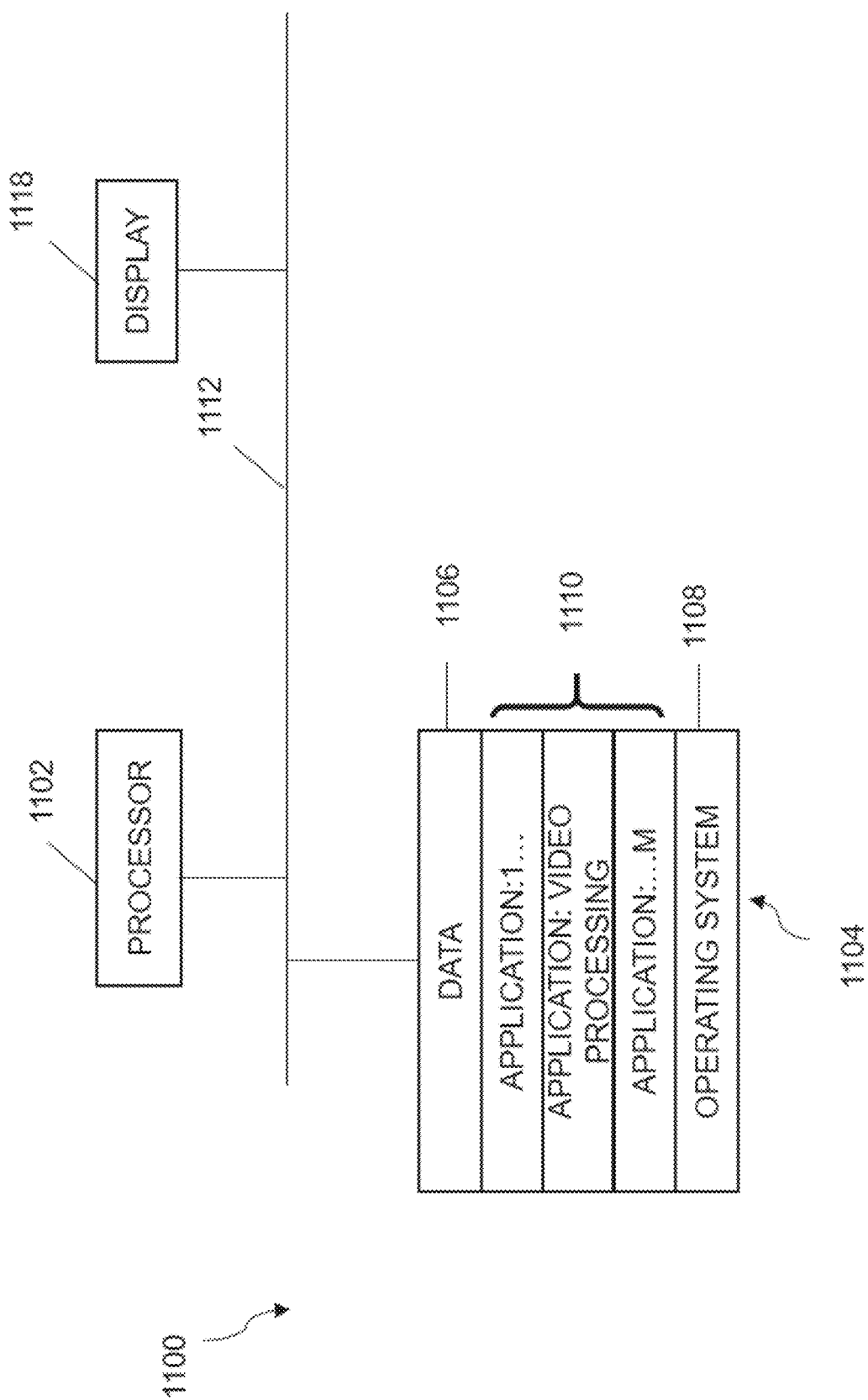
FIG. 38 is a block diagram illustrating another example of an encoding apparatus or a decoding apparatus.

FIG. 38 is a simplified block diagram of an apparatus 800 that may be used as either or both of the source device 12 and the destination device 14 from FIG. 35 according to an exemplary embodiment.

A processor 1102 in the apparatus 1100 can be a central processing unit. Alternatively, the processor 1102 can be any other type of device, or multiple devices, capable of manipulating or processing information now-existing or hereafter developed. Although the disclosed implementations can be practiced with a single processor as shown, e.g., the processor 1102, advantages in speed and efficiency can be achieved using more than one processor.

A memory 1104 in the apparatus 1100 can be a read only memory (ROM) device or a random access memory (RAM) device in an implementation. Any other suitable type of storage device can be used as the memory 1104. The memory 1104 can include code and data 1106 that is accessed by the processor 1102 using a bus 1112. The memory 1104 can further include an operating system 1108 and application programs 1110, the application programs 1110 including at least one program that permits the processor 1102 to perform the methods described here. For example, the application programs 1110 can include applications 1 through N, which further include a video coding application that performs the methods described herein.

The apparatus 1100 can also include one or more output devices, such as a display 1118. The display 1118 may be, in one example, a touch sensitive display that combines a display with a touch sensitive element that is operable to sense touch inputs. The display 1118 can be coupled to the processor 1102 via the bus 1112.

Although depicted here as a single bus, the bus 1112 of the apparatus 1100 can be composed of multiple buses. Further, a secondary storage can be directly coupled to the other components of the apparatus 1100 or can be accessed via a network and can comprise a single integrated unit such as a memory card or multiple units such as multiple memory cards. The apparatus 1100 can thus be implemented in a wide variety of configurations.

SUMMARY OF SOME EXEMPLARY EMBODIMENTS

Some embodiments of the present disclosure provide methods and apparatuses for encoding and decoding of picture portions having as an input a luma component and a down-sampled chroma component. Accordingly, the chroma component is up-sampled to match the luma component and the encoding by the trained network is applied to the components having a matching size. This may provide for a more efficient encoding and decoding, as the trained network with a similar design (input dimensions, resolution) may be applied. The spatial correlation between the luma and chroma may also be preserved in this way.

According to an aspect of the present disclosure, a method is provided for encoding a picture portion, the picture portion including a luma component and a chroma component with a resolution lower than a resolution of the luma component, the method comprising: up-sampling the chroma component to obtain an up-sampled chroma component matching a resolution of the luma component; and encoding the luma component and the up-sampled chroma component into a bitstream.

This provides as output an equal-sized luma-chroma output. Thus, said output may then be handled by a trained network (e.g. within machine learning framework) with a similar structure, and in particular same input resolution. If the resolution for all color components is the same, the machine-learning framework is then able to utilize cross-color correlation in a same way in all sample locations. In that process, the luma channel may remain unaffected, in which case there is no quality loss.

In some exemplary implementations, the up-sampling of the chroma component is based on a sample of the luma component. This may allow performing the up-sampling based on the content of luma component.

According to an exemplary implementation of the method, the up-sampling further includes processing the chroma component by a trained network. Coding which employs trained networks may provide for an improved performance thanks to a possibility of training such network with the desired data.

In one implementation example, the processing by the trained network includes inputting, to the trained network, the luma component and the chroma component, and outputting, from the trained network, the up-sampled chroma component. The use of the luma component as an input of this trained network may preserve the cross-component information between the luma and the chroma channels.

According to one example, the trained network comprises at least two processing layers, a first layer among the at least two processing layers performs up-sampling based on the input chroma component, and a second layer among the at least two processing layers performs processing of an output of said first layer together with the luma component. A combined processing may allow an improved exploiting of the correlation between the luma and chroma and may enable a common network design for a plurality of components.

In one implementation example of the method, the processing of the output of the first layer together with the luma component includes element-wise adding the luma component and the up-sampled chroma component. Thus, the chroma up-sampling using luma as side information may be performed efficiently, since the luma contains more information, for example about shape of the objects. Still, details which may be present in the luma originally having higher resolution, can be restored within the originally sub-sampled chroma.

In one example, the up-sampling comprises inserting, after each n-th line of samples of the chroma component, a line of samples, wherein a line is a row and/or column and n is an integer equal to or greater than 1. This exemplary implementation enables for a low-complexity and effective up-sampling inserting every second row or every second column with some predefined value.

According to an example, the up-sampling comprises inserting, after each n-th line of samples of the chroma component, a line of samples with value zero, wherein a line is a row and/or column and n is an integer equal to or greater than 1. This is a simple manner of performing the up-sampling by merely setting the respective line samples to zero.

According to a further implementation example of the method, the up-sampling comprises inserting, after each n-th line of samples of the chroma component, a line of samples with a value equal to their respective nearest neighbor sample in the chroma component, wherein a line is a row and/or column and n is an integer equal to or greater than 1. This allows a further adaptation of the chroma up-sampling by considering the content of the neighboring samples at specific rows and/or columns. Further, using values for the inserted line samples with reference to the nearest neighbor sample of the chroma, the accuracy of the chroma up-sampling may be increased since neighboring information (as reflected by the neighbor chroma sample value) with reference to the original chroma is employed.

According to an example, the encoding is performed by a variational autoencoder, VAE. VAEs may be advantageous for performing tasks related to image (picture) encoding and decoding in a very efficient manner, with a good compromise between needed bitrate and quality of the reconstructed image or picture.

According to an aspect of the present disclosure, a method is provided for decoding a picture portion from a bitstream, the picture portion including a luma component, and a chroma component with a resolution lower than the resolution of the luma component, the method comprising: decoding the luma component and an intermediate chroma component matching the resolution of the chroma component from the bitstream; and down-sampling the intermediate chroma component so as to obtain the chroma component of said picture portion. Thus, the original chroma component (i.e. the sub-sampled chroma) may be reconstructed from the intermediate chroma component. In particular, the picture portion with the original luma-chroma format may be reconstructed with a high quality. Thus, the decoder is able to provide as output the reconstructed picture portion in a chroma format, with the chroma having a lower resolution (i.e. size) than the luma. Further, the luma information and the spatial information of Y is mostly preserved as the luma is not down-sampled. In general, the advantages provided at the decoding side may be similar to those provided at the encoder side by the corresponding additional features of the respective encoding methods.

According to an exemplary implementation, the down-sampling further includes processing the intermediate chroma component by a trained network. By providing a bitstream based on the up-sampled chroma, the decoding side may reconstruct a picture (still or video picture) with higher quality and/or lower rate. Trained networks may provide for an adaptive and efficient coding and thus to an improved quality at the same rate or improved rate at the same quality.

For example, the processing by the trained network includes inputting, to the trained network, the intermediate chroma component, and outputting, from the trained network, the chroma component. Therefore, the trained network may be designed with a similar resolution at the input for luma and chroma, thus lowering complexity, and may provide a low processing overhead. For example, it may not be necessary to use luma as side information for recovering chroma in some embodiments.

According to an implementation example of the method, the trained network comprises at least two processing layers, wherein a first layer among the at least two processing layers performs processing of the input intermediate chroma component; and a second layer among the at least two processing layers performs down-sampling of an output of said first layer. This exemplary network architecture may enable for obtaining the original resolution based on the bitstream generated using up-sampled chroma.

In another example, the down-sampling of the intermediate chroma component is based on a sample of the luma component. Thus, the down-sampling of the chroma channel may take into account content of the luma channel.

According to an implementation example of the method, the processing by the trained network includes inputting, to the trained network, the luma component.

For example, the first layer performs processing of the intermediate chroma component together with the luma component. Thus, the cross-component information between the luma and the chroma channel(s) is preserved.

In a further example of the method, the down-sampling comprises removing, after each n-th line of samples of the intermediate chroma component, a line of samples, wherein a line is a row and/or column and n is an integer equal to or greater than 1. Thus, the down-sampling of the intermediate chroma may be performed quickly by simply removing the respective line samples.

For example, the decoding is performed by a variational autoencoder, VAE. Thus, the decoding may be performed efficiently, with a good compromise between required bitrate and/or quality of the reconstructed picture.

According to an aspect of the present disclosure, an encoder is provided for encoding a picture portion, the picture portion including a luma component, and a chroma component with a resolution lower than a resolution of the luma component, the encoder comprising a processing circuitry configured to perform steps of the encoding method referred above.

According to an aspect of the preset disclosure, a decoder is provided for decoding a picture portion from a bitstream, the picture portion including a luma component, and a chroma component with a resolution lower than the resolution of the luma component, the decoder comprising a processing circuitry configured to perform steps of the decoding method referred above.

According to an aspect of the present disclosure, provided is a computer program stored on a non-transitory medium comprising code which when executed on one or more processors performs steps of any of the methods referred above.

According to an aspect of the present disclosure, an encoder is provided for encoding a picture portion, the picture portion including a luma component, and a chroma component with a resolution lower than a resolution of the luma component, the encoder comprising: one or more processors; and a non-transitory computer-readable storage medium coupled to the one or more processors and storing programming for execution by the one or more processors, wherein the programming, when executed by the one or more processors, configures the encoder to carry out the encoding method referred above.

According to an aspect of the present disclosure, a decoder is provided for decoding a picture portion from a bitstream, the picture portion including a luma component, and a chroma component with a resolution lower than the resolution of the luma component, the decoder comprising: one or more processors; and a non-transitory computer-readable storage medium coupled to the one or more processors and storing programming for execution by the one or more processors, wherein the programming, when executed by the one or more processors, configures the decoder to carry out the decoding method referred to above.

According to an aspect of the present disclosure, an encoder is provided for encoding a picture portion, the picture portion including a luma component and a chroma component with a resolution lower than a resolution of the luma component, the encoder comprising: an up-sampling module configured to up-sample the chroma component to obtain an up-sampled chroma component matching a resolution of the luma component; and an encoding module configured to encode the luma component and the up-sampled chroma component into a bitstream.

According to an aspect of the present disclosure, a decoder is provided for decoding a picture portion from a bitstream, the picture portion including a luma component, and a chroma component with a resolution lower than the resolution of the luma component, the decoder comprising: a decoding module configured to decode the luma component and an intermediate chroma component matching the resolution of the chroma component from the bitstream; and a down-sampling module configured to down-sample the intermediate chroma component so as to obtain the chroma component of said picture portion.

The embodiments provide for an efficient encoding and/or decoding of a picture portion having a luma component and an up-sampled chroma component. In other words, the picture portion to be encoded and/or decoded may have different luma-chroma formats, i.e. different size of the luma and chroma channel.

It is noted that the present disclosure is not limited to a particular framework. Moreover, the present disclosure is not restricted to image or video compression, and may be applied to object detection, image generation, and recognition systems as well.

The invention can be implemented in hardware and/or software.

For the purpose of clarity, any one of the foregoing embodiments may be combined with any one or more of the other foregoing embodiments to create a new embodiment within the scope of the present disclosure.

Summarizing, the present disclosure relates to video encoding and decoding, and in particular to handling of chroma subsampled formats in deep-learning-based video (de) coding. Corresponding apparatuses and methods enable the processing for encoding and decoding of a respective picture portion that includes a luma component and a chroma component with a resolution lower than the luma component. In order to handle such different sized luma-chroma channels, the chroma component is up-sampled such that the obtained up-sampled chroma component has a resolution matching the one of the luma component. The luma and the up-sampled chroma component are then encoded into a bit stream. To reconstruct the picture portion, the luma component and an intermediate chroma component matching the resolution of the luma component are decoded from the bitstream, followed by down-sampling the intermediate chroma component. Thus, sub-sampled chroma formats may be handled by an autoencoder/autodecoder framework, while preserving the luma channel.

Furthermore, the present disclosure relates to picture or video encoding and decoding. A picture portion includes a luma component and a chroma component with a resolution lower than a resolution of the luma component. In order to obtain matching resolution of the luma component and the chroma component, a selection is performed between a down-sampling processing of the luma component and an up-sampling processing of the chroma component. Then, the selected processing is applied to a picture portion. The bitstream is then generated based on the selected processing, and includes encoding the processed picture portion. The selection between chroma up-sampling and luma down-sampling enables adaption of the input picture portion for the desired application. For example, some applications may aim at reducing complexity or bitrate in which case the luma down-sampling may be more favorable, whereas other application may aim at higher quality in which case chroma up-sampling may be more favorable.

The invention claimed is:

1. A method for encoding a picture portion, implemented by an encoder, the picture portion including a luma component and a chroma component with a resolution lower than a resolution of the luma component, the method comprising:
  selecting, as a picture processing of the picture portion, one of:
    down-sampling the luma component so as to obtain a down-sampled luma component matching the resolution of the chroma component; or
    up-sampling the chroma component so as to obtain an up-sampled chroma component matching the resolution of the luma component;
  wherein the selecting further includes evaluation of a cost function of rate and distortion;
  wherein the selecting further includes:
    down-sampling the luma component, thereby obtaining an intermediate down-sampled luma component;
    up-sampling the chroma component, thereby obtaining an intermediate up-sampled chroma component; and
    determining, according to the cost function, a cost for the intermediate down-sampled luma component and the chroma component, respectively for the luma component and the intermediate up-sampled chroma-component;
  wherein in the selecting, the picture processing of the picture portion is selected, for which the determined cost is lower;
  processing the picture portion according to the selected picture processing; and
  generating a bitstream according to the selected picture processing, wherein the generating includes encoding the processed picture portion.

2. The method according to claim 1, wherein the determining includes:
  encoding the intermediate down-sampled luma component and the chroma component into a first bit stream;

encoding the luma component and the intermediate up-sampled chroma component into a second bitstream; and determining the cost for the first bitstream and the second bitstream according to the cost function.

3. The method according to claim 1, wherein the generating of the bitstream includes encoding into the bitstream a selection indicator indicating the selected picture processing.

4. The method according to claim 1, wherein the generating of the bitstream includes encoding into the bitstream an indication of a width W and/or a height H of the luma component.

5. The method according to claim 1, wherein the up-sampling and/or the down-sampling is performed by a trained network.

6. The method according to claim 1, wherein the encoding of the processed picture portion is performed by a variational autoencoder (VAE).

7. A method for reconstructing a picture portion from a bitstream, implemented by a decoder, the picture portion including a luma component and a chroma component having a resolution lower than a resolution of the luma component, the method comprising:

decoding a luma component and a chroma component having the same resolution from the bitstream; and determining from the bitstream, as a picture processing, one of:

up-sampling the decoded luma component and obtaining a reconstructed picture portion including the decoded chroma component and the up-sampled luma component; or down-sampling the decoded chroma component and obtaining a reconstructed picture portion including the decoded luma component and the down-sampled chroma component; and wherein the determining further includes:

decoding from the bitstream a width W and/or a height H of the luma component of the picture portion;

determining whether the width W and the height H are same as a respective width $\hat{W}$ and height $\hat{H}$ of the decoded luma component;

down-sampling the decoded chroma component, if as a result of the determining W and H are same as $\hat{W}$ and $\hat{H}$; and up-sampling the decoded luma component, if as the result of the determining any of W and H are not same as $\hat{W}$ and/or $\hat{H}$; and obtaining the picture portion according to the determined picture processing.

8. The method according to claim 7, wherein the determining further includes:

decoding from the bitstream a selection indicator indicating a picture processing; and determining as the picture processing the processing indicated by the selection indicator.

9. The method according to claim 7, wherein the determining includes:

determining a size S of the bitstream;

decoding, from the bitstream, a latent representation $\hat{y}$ of the picture portion, the latent representation having a width $w_{\hat{y}}$ and/or height $h_{\hat{y}}$; and determining the picture processing based on comparing a function of the size of the bitstream and the width $w_{\hat{y}}$ and/height $h_{\hat{y}}$ with a pre-defined threshold T.

10. The method according to claim 9, wherein the determining includes:

determining whether a ratio of the size S and $w_{\hat{y}}*h_{\hat{y}}$ is equal to or larger than the pre-defined threshold;

down-sampling the decoded chroma component, if as a result of the determining the ratio is equal to or larger than the pre-defined threshold; and up-sampling the decoded luma component, if as the result of the determining the ratio is smaller than the pre-defined threshold.

11. The method according to claim 7, wherein the determining includes:

decoding a latent representation $\hat{y}$ from the bitstream; and determining the picture processing as an output of a classifying neural network fed with the decoded latent representation, wherein the output is one of a first class and a second class, the first class indicating up-sampling of the decoded luma component and the second class indicating down-sampling of the decoded chroma component.

12. The method according to claim 7, wherein the up-sampling and/or the down-sampling is performed by a trained network.

13. The method according to claim 7, wherein the decoding of the processed picture portion is performed by a variational auto encoder (VAE).

14. A non-transitory computer-readable medium storing computer instructions, that when executed by one or more processors, cause the one or more processors to perform the steps of:

selecting, as a picture processing of the picture portion, one of:

down-sampling the luma component so as to obtain a down-sampled luma component matching the resolution of the chroma component; or up-sampling the chroma component so as to obtain an up-sampled chroma component matching the resolution of the luma component;

wherein the selecting further includes evaluation of a cost function of rate and distortion;

wherein the selecting further includes:

down-sampling the luma component, thereby obtaining an intermediate down-sampled luma component;

up-sampling the chroma component, thereby obtaining an intermediate up-sampled chroma component; and determining, according to the cost function, a cost for the intermediate down-sampled luma component and the chroma component, respectively for the luma component and the intermediate up-sampled chroma-component;

wherein in the selecting, the picture processing of the picture portion is selected, for which the determined cost is lower;

processing the picture portion according to the selected picture processing; and generating a bitstream according to the selected picture processing, wherein the generating includes encoding the processed picture portion.

15. An encoder for encoding a picture portion, the picture portion including a luma component and a chroma component with a resolution lower than a resolution of the luma component, the encoder comprising:

one or more processors; and a memory coupled to the one or more processors and storing programming instructions, that when executed by the one or more processors, cause the encoder to select, as a picture processing of the picture portion, one of:
  down-sampling the luma component so as to obtain a down-sampled luma component matching the resolution of the chroma component; or
  up-sampling the chroma component so as to obtain an up-sampled chroma component matching the resolution of the luma component;
  wherein the selecting further includes evaluation of a cost function of rate and distortion;
  wherein the selecting further includes:
    down-sampling the luma component, thereby obtaining an intermediate down-sampled luma component;
    up-sampling the chroma component, thereby obtaining an intermediate up-sampled chroma component; and
    determining, according to the cost function, a cost for the intermediate down-sampled luma component and the chroma component, respectively for the luma component and the intermediate up-sampled chroma-component;
  wherein in the selecting, the picture processing of the picture portion is selected, for which the determined cost is lower;
process the picture portion according to the selected picture processing; and
generate a bitstream according to the selected picture processing, wherein the bitstream is generated by encoding the processed picture portion.

16. A decoder for reconstructing a picture portion from a bitstream, the picture portion including a luma component and a chroma component having a resolution lower than a resolution of the luma component, the decoder comprising:
  one or more processors; and
  a memory coupled to the one or more processors and storing programming instructions, that when executed by the one or more processors, cause the decoder to
  decode a luma component and a chroma component having the same resolution from the bitstream; and
  determine from the bitstream, as a picture processing, one of:
    up-sampling the decoded luma component and obtaining a reconstructed picture portion including the decoded chroma component and the up-sampled luma component; or
    down-sampling the decoded chroma component and obtaining a reconstructed picture portion including the decoded luma component and the down-sampled chroma component; and
  wherein the determining further includes:
  decoding from the bitstream a width W and/or a height H of the luma component of the picture portion;
  determining whether the width W and the height H are same as a respective width $\hat{W}$ and height $\hat{H}$ of the decoded luma component;
  down-sampling the decoded chroma component, if as a result of the determining W and H are same as $\hat{W}$ and $\hat{H}$; and
  up-sampling the decoded luma component, if as the result of the determining any of W and H are not same as $\hat{W}$ and/or $\hat{H}$; and
  obtain the picture portion according to the determined picture processing.

17. A non-transitory computer-readable medium storing computer instructions, that when executed by one or more processors, cause the one or more processors to perform the steps of:
  decoding a luma component and a chroma component having the same resolution from the bitstream; and
  determining from the bitstream, as a picture processing, one of:
    up-sampling the decoded luma component and obtaining a reconstructed picture portion including the decoded chroma component and the up-sampled luma component; or
    down-sampling the decoded chroma component and obtaining a reconstructed picture portion including the decoded luma component and the down-sampled chroma component; and
  wherein the determining further includes:
  decoding from the bitstream a width W and/or a height H of the luma component of the picture portion;
  determining whether the width W and the height H are same as a respective width $\hat{W}$ and height $\hat{H}$ of the decoded luma component;
  down-sampling the decoded chroma component, if as a result of the determining W and H are same as $\hat{W}$ and $\hat{H}$; and
  up-sampling the decoded luma component, if as the result of the determining any of W and H are not same as $\hat{W}$ and/or $\hat{H}$; and
  obtaining the picture portion according to the determined picture processing.

18. The non-transitory computer-readable medium according to claim 14, wherein the determining includes:
  encoding the intermediate down-sampled luma component and the chroma component into a first bit stream;
  encoding the luma component and the intermediate up-sampled chroma component into a second bitstream; and
  determining the cost for the first bitstream and the second bitstream according to the cost function.

19. The non-transitory computer-readable medium according to claim 14, wherein the generating of the bitstream includes encoding into the bitstream a selection indicator indicating the selected picture processing.

20. The non-transitory computer-readable medium according to claim 14, wherein the generating of the bitstream includes encoding into the bitstream an indication of a width W and/or a height H of the luma component.

21. The non-transitory computer-readable medium according to claim 15, wherein the encoder further comprises a trained network, and the up-sampling and/or the down-sampling is performed by the trained network.

22. The non-transitory computer-readable medium according to claim 15, wherein the encoder further comprises a variational autoencoder (VAE), and the encoding of the processed picture portion is performed by the VAE.

* * * * *